US009552399B1

(12) United States Patent
Browning et al.

(10) Patent No.: US 9,552,399 B1
(45) **Date of Patent: *Jan. 24, 2017**

(54) DISPLAYING INFORMATION ABOUT DISTRIBUTED GROUP DISCUSSIONS

(71) Applicant: Blab, Inc., Seattle, WA (US)

(72) Inventors: Randolph Browning, Mercer Island, WA (US); David Aaron Snelling, Bellevue, WA (US); Stefan Nicholas Papp, Seattle, WA (US); Bernhard G. Zimmermann, Seattle, WA (US); James Robert Young, Jr., Marysville, WA (US); Trinity Alana Harrison, Seattle, WA (US); Benjamin Ralph Bressler, Sammamish, WA (US)

(73) Assignee: Blab, Inc., Seattle, WA (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/201,650

(22) Filed: Mar. 7, 2014

Related U.S. Application Data

(60) Provisional application No. 61/775,379, filed on Mar. 8, 2013.

(51) Int. Cl.
*G06F 17/30* (2006.01)

(52) U.S. Cl.
CPC ................................ *G06F 17/30554* (2013.01)

(58) Field of Classification Search
USPC .................................................. 707/737–738
See application file for complete search history.

(56) References Cited

U.S. PATENT DOCUMENTS

| | | | | |
|---|---|---|---|---|
| 8,176,046 | B2 | 5/2012 | Druzgalski et al. | |
| 8,261,193 | B1 | 9/2012 | Alur et al. | |
| 8,285,598 | B2 | 10/2012 | Mesaros | |
| 8,312,056 | B1 | 11/2012 | Peng et al. | |
| 8,321,792 | B1 | 11/2012 | Alur et al. | |
| 8,364,171 | B2 | 1/2013 | Busch | |
| 8,380,607 | B2 | 2/2013 | Bollen et al. | |
| 8,732,584 | B2 * | 5/2014 | Lee ........................ | G06Q 10/10 715/733 |
| 2005/0102619 | A1 * | 5/2005 | Hijikata ................. | G06Q 10/10 715/254 |

(Continued)

*Primary Examiner* — Hanh Thai
(74) *Attorney, Agent, or Firm* — Seed IP Law Group LLC

(57) ABSTRACT

Techniques are described for analyzing user-supplied information, including to predict future aspects of additional information that will be supplied by users. The analyzed information may include distributed group discussions involving numerous users and occurring via user comments and other content items supplied to social networking site(s) and/or other computer-accessible sites. The techniques further include displaying information to users about analyzed and/or predicted information for one or more categories and/or topics or other attributes, to reflect corresponding constituent content items for those categories/topics/attributes for one or more time periods—the information display may further occur in a real-time or near-real-time manner with respect to corresponding events or activities to which the information corresponds (such as within seconds, minutes or hours), and may display information about total quantity of constituent content items, rate of change in total quantity, aggregate sentiment, etc.

42 Claims, 31 Drawing Sheets
(11 of 31 Drawing Sheet(s) Filed in Color)

Example Real-Time and Predicted Comment Group Conversation Information

(56) References Cited

U.S. PATENT DOCUMENTS

2010/0100537 A1 4/2010 Druzgalski et al.
2011/0276681 A1* 11/2011 Lee .................. G06F 17/30899 709/224
2011/0302006 A1 12/2011 Avner et al.
2011/0313842 A1 12/2011 Avner et al.
2011/0314007 A1 12/2011 Dassa et al.
2011/0320373 A1* 12/2011 Lee ........................ G06Q 50/01 705/319
2012/0011158 A1 1/2012 Avner et al.
2012/0016948 A1 1/2012 Sinha
2012/0117475 A1* 5/2012 Lee ........................ G06Q 10/10 715/733
2012/0143694 A1 6/2012 Zargahi et al.
2012/0150645 A1 6/2012 Mandyam et al.
2012/0166278 A1 6/2012 MacGregor et al.
2012/0323908 A1 12/2012 Herbert, Jr. et al.
2013/0036107 A1 2/2013 Benyamin et al.
2013/0198204 A1* 8/2013 Williams .......... G06F 17/30283 707/748
2014/0012927 A1* 1/2014 Gertzfield ............. G06Q 50/01 709/206
2014/0278676 A1* 9/2014 Burka ................ G06Q 10/1093 705/7.19

* cited by examiner

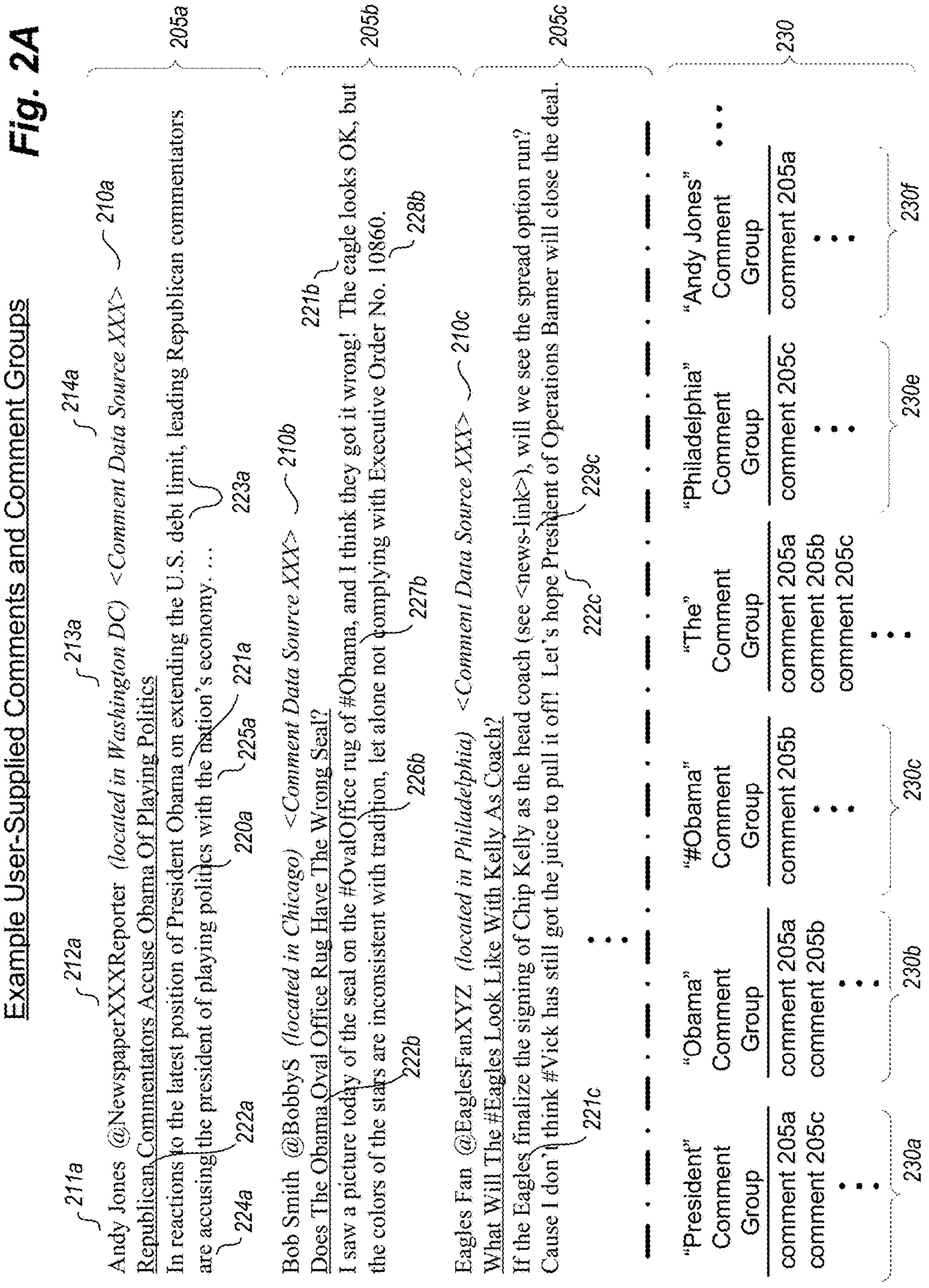
Example User-Supplied Comments and Comment Groups
Fig. 2A
Andy Jones @NewspaperXXXReporter (located in Washington DC) <Comment Data Source XXX>
Republican Commentators Accuse Obama Of Playing Politics
In reactions to the latest position of President Obama on extending the U.S. debt limit, leading Republican commentators
are accusing the president of playing politics with the nation's economy. ...
Bob Smith @BobbyS (located in Chicago) <Comment Data Source XXX>
Does The Obama Oval Office Rug Have The Wrong Seal?
I saw a picture today of the seal on the #OvalOffice rug of #Obama, and I think they got it wrong! The eagle looks OK, but
the colors of the stars are inconsistent with tradition, let alone not complying with Executive Order No. 10860.
Eagles Fan @EaglesFanXYZ (located in Philadelphia) <Comment Data Source XXX>
What Will The #Eagles Look Like With Kelly As Coach?
If the Eagles finalize the signing of Chip Kelly as the head coach (see <news-link>), will we see the spread option run?
Cause I don't think #Vick has still got the juice to pull it off! Let's hope President of Operations Banner will close the deal.
211a
212a
213a
214a
210a
220a
221a
222a
223a
224a
225a
205a
210b
221b
222b
226b
227b
228b
205b
210c
221c
222c
229c
205c
"President" Comment Group
comment 205a
comment 205c
"Obama" Comment Group
comment 205a
comment 205b
"#Obama" Comment Group
comment 205b
"The" Comment Group
comment 205a
comment 205b
comment 205c
"Philadelphia" Comment Group
comment 205c
"Andy Jones" Comment Group
comment 205a
230
230a
230b
230c
230e
230f

Example Supplemental Comments and Comment Groups 241a  244a
Andy Jones  <*Comment Data Source YYY*>  240a
Thanks to everyone for the comments on my Twitter post about #Obama and the U.S. debt limit! I plan to solve the Euro problems next ...

⋮

245a

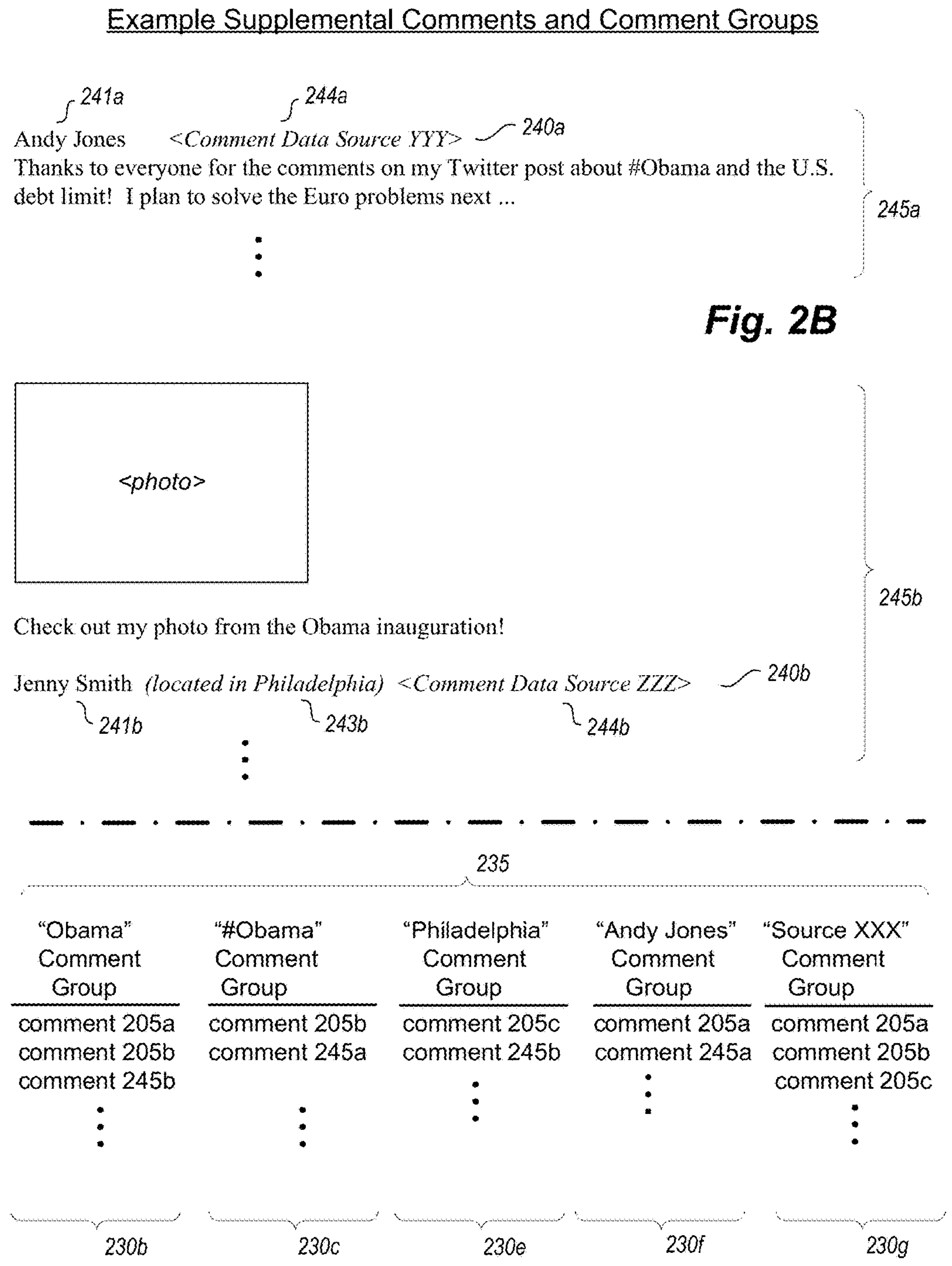

*Fig. 2B*

<photo>

245b

Check out my photo from the Obama inauguration!

Jenny Smith *(located in Philadelphia)* <*Comment Data Source ZZZ*>  240b
241b  243b  244b

⋮

235

| "Obama" Comment Group | "#Obama" Comment Group | "Philadelphia" Comment Group | "Andy Jones" Comment Group | "Source XXX" Comment Group |
|---|---|---|---|---|
| comment 205a | comment 205b | comment 205c | comment 205a | comment 205a |
| comment 205b | comment 245a | comment 245b | comment 245a | comment 205b |
| comment 245b | | | | comment 205c |
| ⋮ | ⋮ | ⋮ | ⋮ | ⋮ |

230b  230c  230e  230f  230g

Example Category Information

Fig. 2C

| "President Obama" Category Comments ("President" "Obama" "White House") | "NFL" Category Comments ("NFL" "football") | . . . |
|---|---|---|
| comment 205a | ⋮ | |
| comment 205b | | |
| comment 205c | | |
| comment 245a | | |
| comment 245b | | |
| ⋮ | | |
| 250a | 250b | |

250

| "President Obama" Category Comment Groups | Comment Group Frequency |
|---|---|
| "the" comment group | 9,923 |
| "naked" comment group | 2,882 |
| ⋮ | |
| 255a | |
| "Obama" comment group | 1,231 |
| "President" comment group | 982 |
| "democrat" comment group | 337 |
| "inauguration" comment group | 304 |
| "debt limit" comment group | 190 |
| "Washington DC" comment group | 132 |
| "republican" comment group | 109 |
| "Chicago" comment group | 101 |
| 255b | |
| ⋮ | |
| "eagle" comment group | 12 |
| "Chip Kelly" comment group | 5 |
| ⋮ | |

255 number of associated comments : 10,000
average comment group frequency : 92.3
maximum threshold: 1383.2 minimum threshold: 47.5

260

*Fig. 2D*
260
260a
Prior 30-Minute Time Periods
Quantity Of Comments
265
265a
265b

Example Time Window Quantification And Prediction

Example Prediction Template Generation

Example Quantification Information For Example Comment Group

1000

| | | 1003a total # of content items | 1003b # at loc 1 | 1003c # at loc 2 | | 1003d # from source 1 | 1003e # from source 2 | | 1003f # from author 1 | 1003g # from author 2 | | 1003h sentiment (1 to 3) | 1003i most influential author | |
|---|---|---|---|---|---|---|---|---|---|---|---|---|---|---|
| 1001a | time period N | 4783 | 235 | 42 | ... | 2345 | 423 | ... | 23 | 4 | ... | 3 | user 1 | ... |
| 1001b | time period N+1 | 5792 | 239 | 83 | | 2388 | 827 | | 23 | 8 | | 3 | user 1 | |
| 1001c | time period N+2 | 6795 | 227 | 233 | | 2268 | 1673 | | 22 | 16 | | 3 | user 1 | |
| 1001d | time period N+3 | 7799 | 207 | 255 | | 2077 | 2123 | | 19 | 21 | | 2 | user 1 | |
| 1001e | time period N+4 | 8033 | 149 | 233 | | 1523 | 1987 | | 15 | 20 | | 2 | user 2 | |
| 1001f | time period N+5 | 7802 | 94 | 211 | | 927 | 1973 | | 9 | 19 | | 1 | user 3 | |
| | ⋮ | | | | | | | | | | | | | |

Fig. 2F

Example Encoded Summary Information For Example Comment Group

| | | 1103a encoding scheme 1 | 1103b encoding scheme 2 | 1103c encoding scheme 3 | |
|---|---|---|---|---|---|
| 1101a | time period N | 25313 | 2111 | 23jaK | ... |
| 1101b | time period N+1 | 25312 | 2111 | 22laG | |
| 1101c | time period N+2 | 35312 | 3112 | 32y8j | |
| 1101d | time period N+3 | 34221 | 3222 | 31-ad | |
| 1101e | time period N+4 | 33223 | 3222 | 300ds | |
| 1101f | time period N+5 | 33132 | 3324 | 30ljs | |
| | ⋮ | ⋮ | ⋮ | ⋮ | |

Encoding Scheme 1 a) total quantity (0-3) – (0: <500, 1: 500-2000, 2: 2001-6000, ... )
b) percent quantity change from prior TP (0-9) – (9: > 900%, ... )
c) sentiment (1-3)
d) 1st highest quantity source
e) 2nd highest quantity source

Encoding Scheme 2 a) total quantity (0-9) - 0: < 100, 1: 100-400, ...
b) highest quantity source
c) highest quantity user
d) highest quantity location

...

Example Aggregation of Encoded Summary Information

1200

```
Aggregation from TP (time period) N to TP N-5 (encoding scheme 1): 25313 25312 35312 34221 33223 33132
```

Fig. 2H

Example Prediction Templates Using Aggregations of Encoded Summary Information

1200

```
             25313  25312  35312  34221  33223  33132
-------------------------------------------------------------------------
1301                                              1301a  1301b
Template 1: 25276  25276  33167  34169  32169  31173  | 30313 2a312 2a312 2b221 1b221 1a222
   matching YY---  YY---  Y----  YY---  Y----  Y----

1302
Template 2: 15313  25314  35312  34212  23223  23221  | 23313 12212 03312 12221 12221 11212
   matching -YYYY  YYYY-  YYYYY  YYY--  -YYY-  -YYY-

1303
Template N: 23313  22312  32312  31221  31221  30222  | 23313 22312 32312 31221 31221 30222 30132
      23313 22312 32312 22312 32312 22312 32312 23313 ...
1304
Template X: 3313  2312  3312  4221  4221  5222        | 6313 5312 4312 4221 5221 4222 3132
```

Fig. 2I

Example Predicted Information For Example Comment Group

1400

| | | 1403a total quantity (0-3) | 1403b percent quantity change (0-9) | 1403c sentiment (1-3) | 1403d 1st highest quantity source | 1403e 2nd highest quantity source |
|---|---|---|---|---|---|---|
| 1401a | time period N | 2 | 5 | 3 | 1 | 3 |
| 1401b | time period N+1 | 2 | 5 | 3 | 1 | 2 |
| 1401c | time period N+2 | 3 | 5 | 3 | 1 | 2 |
| 1401d | time period N+3 | 3 | 4 | 2 | 2 | 1 |
| 1401e | time period N+4 | 3 | 3 | 2 | 2 | 3 |
| 1401f | time period N+5 | 3 | 3 | 1 | 3 | 2 |
| 1401g | time period N+6 | 2 | 3 | 3 | 1 | 3 |
| 1401h | time period N+7 | 1 | 2 | 2 | 1 | 2 |
| 1401i | time period N+8 | 0 | 3 | 3 | 1 | 2 |
| 1401j | time period N+9 | 1 | 2 | 2 | 2 | 1 |
| 1401k | time period N+10 | 1 | 2 | 2 | 2 | 1 |
| 1401l | time period N+11 | 1 | 1 | 2 | 1 | 2 |
| | ⋮ | ⋮ | ⋮ | ⋮ | ⋮ | ⋮ |

| | | |
|---|---|---|
| 1301g | time period N+6 | 3 |
| 1301h | time period N+7 | 2 |
| 1301i | time period N+8 | 2 |
| 1301j | time period N+9 | 2 |
| 1301k | time period N+10 | 1 |
| 1301l | time period N+11 | 1 |
| | ⋮ | ⋮ |

*Fig. 2J*

Example Encoding Value Representation Information

| 1505 | 1510 | 1505 | 1510 | 1505 | 1510 | 1505 | 1510 |
|---|---|---|---|---|---|---|---|
| 0 | 0 | G | 16 | W | 32 | m | 48 |
| 1 | 1 | H | 17 | X | 33 | n | 49 |
| 2 | 2 | I | 18 | Y | 34 | o | 50 |
| 3 | 3 | J | 19 | Z | 35 | p | 51 |
| 4 | 4 | K | 20 | a | 36 | q | 52 |
| 5 | 5 | L | 21 | b | 37 | r | 53 |
| 6 | 6 | M | 22 | c | 38 | s | 54 |
| 7 | 7 | N | 23 | d | 39 | t | 55 |
| 8 | 8 | O | 24 | e | 40 | u | 56 |
| 9 | 9 | P | 25 | f | 41 | v | 57 |
| A | 10 | Q | 26 | g | 42 | w | 58 |
| B | 11 | R | 27 | h | 43 | x | 59 |
| C | 12 | S | 28 | i | 44 | y | 60 |
| D | 13 | T | 29 | j | 45 | z | 61 |
| E | 14 | U | 30 | k | 46 | - | 63 |
| F | 15 | V | 31 | l | 47 | _ | 63 |

*Fig. 2K*

Example Real-Time and Predicted Comment Group Conversation Information
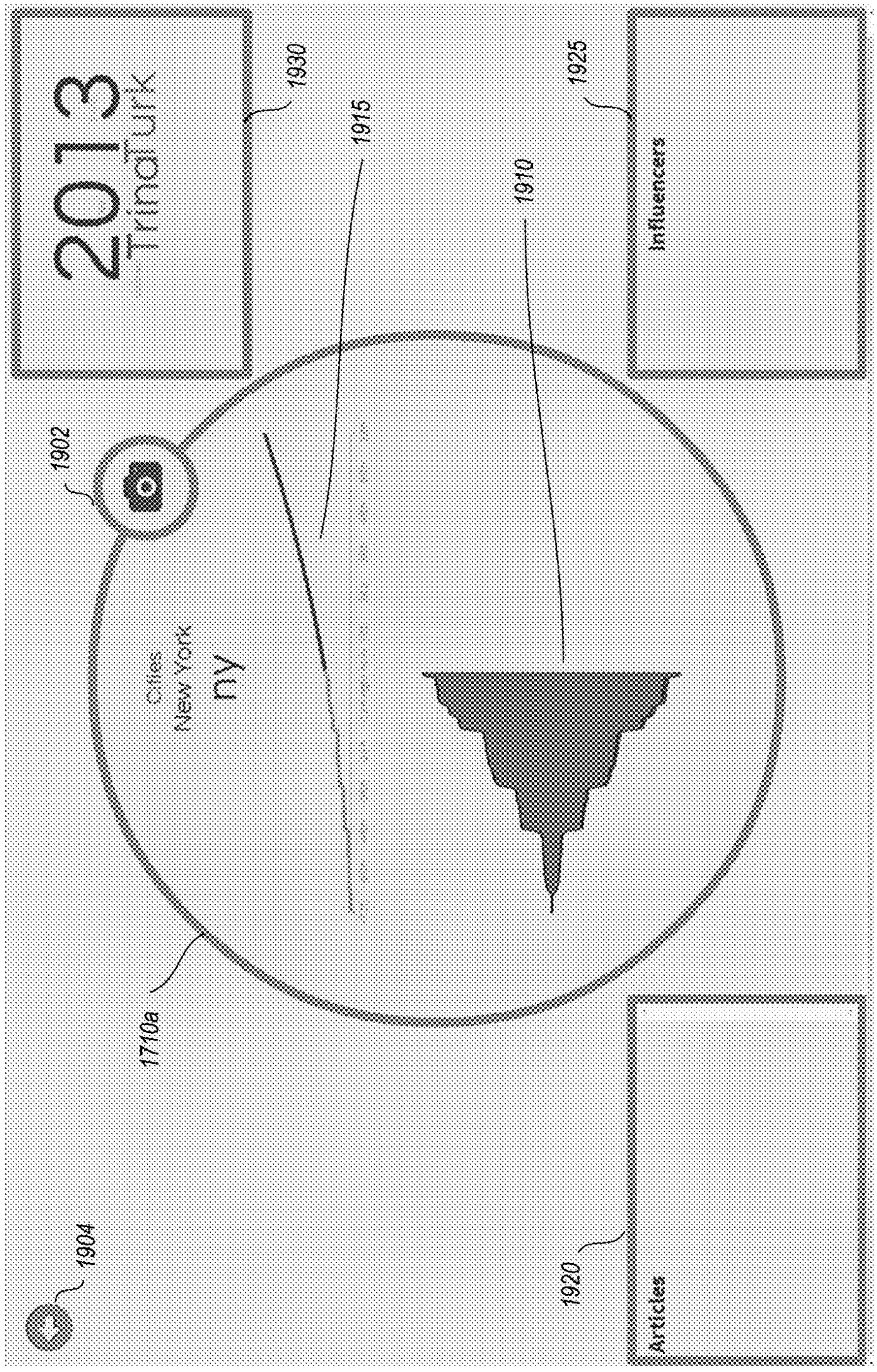
*Fig. 2-O*

Example Real-Time and Predicted Comment Group Conversation Information

Example Real-Time and Predicted Comment Group Conversation Information

Example Real-Time and Predicted Comment Group Conversation Information

DISPLAYING INFORMATION ABOUT DISTRIBUTED GROUP DISCUSSIONS

CROSS-REFERENCE TO RELATED APPLICATIONS

This application claims the benefit of U.S. Provisional Patent Application No. 61/775,379, filed Mar. 8, 2013 and entitled "Displaying Information About Distributed Group Discussions," which is hereby incorporated by reference in its entirety.

TECHNICAL FIELD

The following disclosure relates generally to techniques for displaying information corresponding to user-supplied information, such as to display information about assessments of distributed group discussions and/or about predicted future aspects of the discussions.

BACKGROUND

Discussions of current topics of interest by various distributed users are increasingly occurring via social networking sites and other computer-accessible sites that are available to the users, whether by users replying to and commenting on information supplied by other users, or by various users independently submitting information that in aggregate reflects topics of interest. In some situations, a particular distributed group discussion may occur between a particular selected subset of users (e.g., users that are members of a common group, club, service, etc.), while in other situations a distributed group discussion may include any user with access to one or more sites via which that discussion occurs.

Information about discussions that have occurred and/or are occurring may have value to various types of entities. However, various problems exist with obtaining and disseminating such information in a timely manner, including due to the distributed nature of the discussions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2K illustrate examples of analyzing distributed group discussions and predicting further aspects of the discussions.

FIGS. 2L-2V illustrate examples of displaying information about analyzed aspects of distributed group discussions and about further predicted aspects of the discussions.

DETAILED DESCRIPTION

Figure 1:
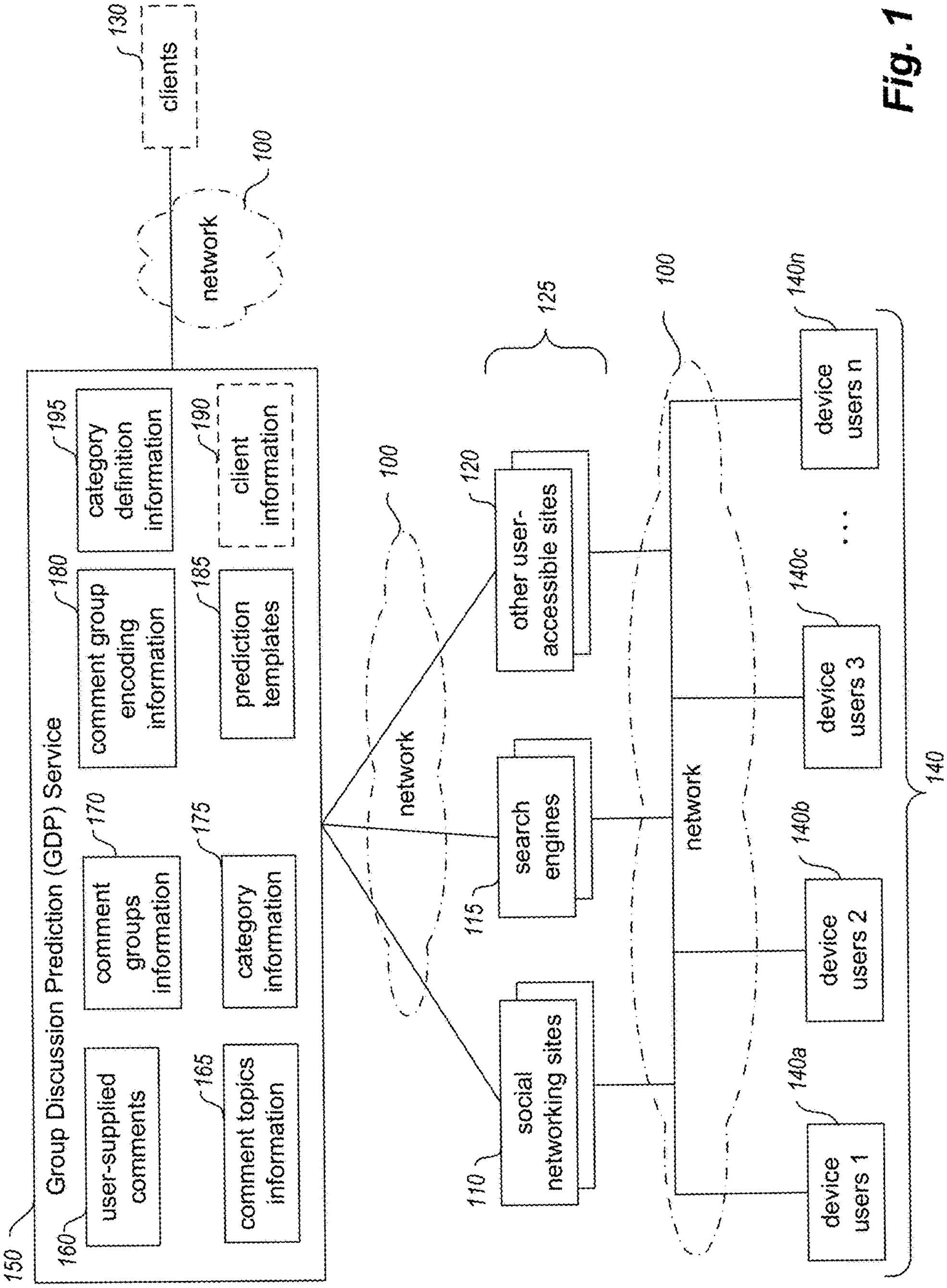
FIG. 1 is a network diagram illustrating an example embodiment of a service that analyzes distributed group discussions and predicts further aspects of the discussions.

Techniques are described for analyzing user-supplied information in various ways, including in some embodiments to predict future aspects of additional related information that is expected to be supplied by users, such as during one or more future time periods. In at least some embodiments, the user-supplied information that is analyzed corresponds to distributed group discussions that involve numerous users and occur via user comments made to one or more computer-accessible sites, such as one or more social networking services. The analysis of user-supplied information may, in at least some embodiments, include determining particular topics that are being discussed for a specified category during one or more periods of time, quantifying an amount of user interest in particular topics and the category during the period of time from the discussion, and predicting future amounts of user interest in the particular topics and the category as part of an expected future discussion during one or more future period of times. As one illustrative example, millions of user Twitter tweets, user posts to social networking sites, and other user-supplied comments or other content items may be analyzed over a prior window of time (e.g., the last 72 hours) in a real-time or near-real-time manner, and changes in information corresponding to particular topics and categories of interest may be automatically predicted for a future span of time (e.g., the next 24 hours), with various types of further actions then being taken based on the predicted information. Additional details related to analyzing user-supplied information in particular manners are described below, and some or all of the described techniques are performed in at least some embodiments by automated operations of a Group Discussion Prediction ("GDP") system.

The user comments and other user-supplied information that are obtained and analyzed may have various forms in various embodiments, such as to reflect information that is supplied by human users and made available to other users. For example, the user-supplied information may, in at least some embodiments, include posts and other user submissions to sources of such user-supplied information (generally referred to as "comment data sources" herein) that include one or more social networking services or sites, such as tweets to the Twitter service, and/or posts to Facebook, MySpace, Google+, LinkedIn, etc. In addition, in at least some embodiments and situations, the user-supplied information may include comments or other content items submitted to various other types of computer-accessible sites that may act as comment data sources, such as Instagram, Pinterest, Flickr, Picasa, YouTube, 43 Things, etc. In other embodiments and situations, any type of user-supplied information that is made available to one or more other users may be analyzed and used, including in text form, audio form and/or video form, such as user emails, SMS ("Short Message Service") messages, Internet chat messages, telephone voice messages and other audio recordings, video recordings, search engine searches, news articles and other news releases, commerce-related submissions (e.g., user wish lists or gift registries, user shopping carts, etc.), Wiki-based submissions (e.g., to Wikipedia), etc., and is generally referred to herein as a "user-supplied comment" or "user comment."

By gathering such user-supplied information during one or more time periods of interest, information may be assessed about distributed group discussions that occur during those time periods, including for discussions in which users actively review and respond to comments of others, and more generally for discussions that occur via various user comments that each reflects independent thoughts or opinions of a user that is not in response to any other particular user comment of another user. Such assessed information may correspond to one or more selected factors about one or more distributed group discussions, including one or more of the following factors for user comments or other content items being supplied with respect to one or more topics of interest: a quantity of user comments or other content items for the topic(s) that are supplied during a time period (or another measure of distributed user interest in those topics rather than content item quantity); subsets of such an overall quantity (or other measure of distributed user interest) supplied during a time period for the topic(s) that are associated with particular geographic locations or geographic areas, and/or with particular author users, and/or with particular content item data sources; changes in assessed values for one or more such factors between two or more time periods; etc. In addition, such assessed information corresponding to one or more selected factors for the topic(s) may be used to predict future information about user comments or other content items that will be supplied for the topic(s), such as predicted future values for a particular one or more of the selected factors for each of one or more future time periods, or instead for other types of predicted future information. Additional details related to assessing values for factors of interest and using such information to make corresponding predictions are included below.

In some embodiments, a variety of types of information may be displayed or otherwise provided to users or other entities about analyzed information and/or predicted information for one or more categories and/or topics or other attributes of interest, such as to reflect constituent content items that are associated with those categories, topics and/or attributes for one or more time periods—in at least some such embodiments, the information display or other providing may occur in a real-time or near-real-time manner with respect to corresponding events or activities to which the information corresponds (such as within seconds, minutes or hours of such events or activities). A display of information may, for example, indicate multiple categories, and visually indicate information about relative or absolute values for respective categories based on each of multiple selected factors, such as based on use of one or more of the following information for a displayed representation of a category: size, horizontal location, vertical location, color, an associated halo (or shadow), horizontal movement, vertical movement, displayed tags or other visual indicators, etc. —as one example, such information may be provided for a current time period and/or next future time period and for selected factors that include total quantity of constituent content items, rate of change in total quantity, and aggregate sentiment. A display of information may, for example, indicate multiple comment groups that each represents an associated topic or other attribute of constituent content items in the comment group (whether instead of or in addition to one or more category indicators), and visually indicate information about relative or absolute values for respective comment groups based on each of multiple selected factors, such as based on use of one or more of the following information for a displayed representation of a category: size, horizontal location, vertical location, color, an associated halo, horizontal movement, vertical movement, displayed tags or other visual indicators, etc. —as one example, such information may be provided for a current time period and/or next future time period and for selected factors that include total quantity of constituent content items, rate of change in total quantity, and aggregate sentiment. Additional details related to such display of information about analyzed aspects of distributed group discussions and/or about further predicted aspects of the discussions is included herein, including with respect to FIGS. 2L-2V.

FIG. 1 is a network diagram illustrating an example embodiment of a service that analyzes distributed group discussions and predicts further aspects of the discussions. In particular, an example embodiment of a GDP (Group Discussion Prediction) Service 150 is illustrated, such as may be provided by a GDP system (not shown) executing on one or more configured computing systems (not shown). One or more client entities 130 may optionally use devices (not shown) to interact with the GDP service 150 over one or more networks 100, such as to provide information about categories or other information of interest, and/or to receive corresponding predicted information and/or other analyzed information from the GDP service 150. The GDP service 150 may store any information received from such clients in various manners, such as to store any received category definition information 195, and any other received client information 190.

FIG. 1 further illustrates various users 140 who each have one or more associated client devices, which the users use to interact with one or more comment data sources 125 over one or more networks 100, such as by supplying user comments or other content items (not shown) to those comment data sources. In this example, the comment data sources 125 include one or more social networking sites 110, one or more search engines 115, and one or more other user-accessible sites 120. Such comment data sources may have various forms in various embodiments, and the resulting user comments or other user-supplied content items may similarly have various forms in various embodiments, as discussed in greater detail elsewhere. After users 140 have provided user comments or other user-supplied content items to comment data sources 125, the GDP service 150 may interact with the comment data sources 125 over one or more networks 100 to obtain corresponding content items, and to store such information 160 for subsequent analysis.

As part of the operation of the GDP service 150, it may further analyze the user-supplied content items to identify particular topics and other attributes of the content items, and to store corresponding information 165. The content item information 160 and topics information 165 may further be used to create corresponding comment groups, and to store corresponding information 170. The GDP service 150 may also use the comment group information 170 to determine particular topics that are associated with a particular category during one or more periods of time, such as based on the created comment groups associated with those topics, and then store corresponding category information 175. The GDP service 150 may further quantify the user-supplied content items included in a particular comment group and/or associated with a particular category, and use such information for one or more time periods to predict expected additional content items that will be received over one or more later time periods, with corresponding information being stored with the comment group information 170 and/or the category information 175—in some embodiments, the quantified information for one or more of the comment groups and/or categories about constituent content items for a time period may include encoded summary information for that time period, such as with respect to one or more encoding schemes specified in the comment group encoding information 180. As part of performing the prediction, the GDP service 150 may use one or more defined prediction templates from information 185, and may further generate and store such prediction templates for later use based on actual content items that are received—in some embodiments, the prediction template information may include an aggregation of encoded summary information for constituent content items that are part of a comment group and/or category for each of multiple time periods (e.g., consecutive time periods during a time window of interest), such as to be matched to aggregated encoded summary information from the comment group information 170 and/or the category information 175. In addition, the GDP service 150 may further take a variety of types of automated actions based on analyzed and/or predicted information, such as in accordance with client instructions or other client-specified criteria. Additional details related to operation of the GDP service in particular embodiments are included herein.

The one or more networks 100 may, for example, be a publicly accessible network of linked networks, possibly operated by various distinct parties, such as the Internet. In other embodiments, at least one of the network(s) 100 may be a private network, such as, for example, a corporate or university network that is wholly or partially inaccessible to non-privileged users. In still other embodiments, at least one of the network(s) 100 may include one or more private networks with access to and/or from the Internet. In the illustrated embodiment, the GDP service 150 may include one or more modules that perform particular operations, as discussed in greater detail with respect to FIG. 3, and the GDP service 150 and any such modules may each include software instructions that execute on one or more computing systems (not shown) to configure those computing systems to perform some or all of the described techniques.

Thus, user-supplied information of interest may be obtained in various manners in various embodiments, including by the GDP service or system accessing a particular comment data source to retrieve information from that comment data source (e.g., periodically, when the data is needed for analysis, etc.). For example, a GDP service may obtain information from a particular comment data source in various manners, such as via an API ("application programming interface") provided by that data source, by retrieving information stored in a database or other storage mechanism, by scraping one or more Web pages of a Web site provided by the comment data source, etc. The GDP service may further obtain some or all of the available data from a particular comment data source, such as for one or more particular users and/or time periods, for all users and/or time periods, for users and/or information that meet specified criteria (e.g., publicly available information that does not have privacy restrictions), etc. In other embodiments and situations, at least some comment data sources may perform actions to supply at least some user-supplied information to the GDP service, such as in response to one or more prior requests of the GDP service (e.g., via an RSS, or Really Simple Syndication, feed, or other subscription request of the GDP service). In addition, in some embodiments and situations, at least some user-supplied comments may be received directly from a user that supplied them to one or more comment data sources, such as if a mobile application executing on a client device of the user also sends the comments to the GDP service. Furthermore, in some embodiments and situations, information that was initially supplied to one or more comment data sources may be available to the GDP service from another source, such as from an aggregator service that combines information from multiple comment data sources. In other embodiments, other types of user-supplied information may be obtained and/or other types of comment data sources may be used, and additional details are included below about obtaining user-supplied information of interest to analyze.

Once user-supplied information has been obtained for a particular time period, the user-supplied information may be analyzed in various manners. In some embodiments, the analysis includes analyzing user comments or other user-supplied content items to create corresponding comment groups for the time period. For example, each user-supplied content item may be analyzed to identify any topics of interest in the content, such as terms or phrases, hashtags, links to other data, or other n-grams, and optionally for topics that are determined to be of sufficient importance or relevance to the content item (e.g., by using a TF-IDF, or term frequency-inverse document frequency, analysis, or other content analysis technique). In addition, each user-supplied content item may be analyzed to identify any other types of attributes of interest that are associated with the content item (e.g., in the contents of the content item, in metadata associated with the content item, etc.), such as a location of where the content item was submitted from, an author user who generated or otherwise supplied the content item, a comment data source from which the content item was obtained, any n-grams from metadata associated with the content item, etc. After topics or other attributes of interest are identified, a comment group is created for each such topic or other attribute (or for a selected subset, such as to reflect a percentage or fixed quantity of the most relevant topics or other attributes) for a time period, with the created comment group including any analyzed content items from the time period that include the associated attribute for the comment group. In addition, in at least some embodiments, if additional user-supplied content items are available that were not used in the initial analysis (e.g., from one or more additional or supplemental comment data sources), additional such user-supplied content items that were supplied during the time period are retrieved, and additional content items that include the topic or other associated attribute for each created comment group are added to that comment group. Thus, each created comment group may be considered to represent its associated topic or other associated attribute for that time period. In other embodiments, information about content items may be analyzed and grouped in other manners, and additional details are included below about analyzing user comments or other user-supplied content items to create corresponding comment groups for a time period.

The analysis of user-supplied information for a time period may also include determining current topics that correspond to a particular content category for the time period. For example, a definition for a category of interest may be supplied or otherwise determined, such as to include one or more terms or other attributes corresponding to the category. User-supplied content items for the time period that include one or more of the definition terms or other definition attributes for the category are then identified (e.g., content items having one of the definition attributes, or all of the definition attributes, or a minimum defined quantity or percentage of the definition attributes), and the created comment groups to which those identified content items belong are then determined, with those determined comment groups being candidates to be associated with the content category for the time period. At least some of the determined comment groups are then excluded in some embodiments and situations, such as to remove comment groups that are under-inclusive or over-inclusive with respect to the subject matter relevant to the content category. The topics or other attributes associated with the remaining determined comment groups may then be identified as being the current topics for the content category during the time period. In at least some embodiments, the determination of candidate comment groups to exclude includes determining, for each candidate comment group, the frequency that its included user-supplied content items are in the identified content items for the content category. An average frequency and a standard deviation may then be determined across the candidate comment groups and used to establish lower and/or upper boundaries for the content category, such as to define a minimum exclusion threshold that is the average frequency minus half the standard deviation, and/or to define a maximum exclusion threshold that is the average frequency plus half the standard deviation. In other embodiments, comment groups to include for a content category may be determined in manners other than based on frequency of included user-supplied content items, and additional details are included below about determining current topics that correspond to a particular content category for a time period.

The analysis of user-supplied information for a time period may further include predicting information about expected additional content items that will be supplied by users for a comment group and/or content category, such as during each of one or more future time periods of interest. For example, the analysis may include quantifying information about the user-supplied content items included in the comment group and/or associated with the content category for the time period, such as based on a quantity of such user-supplied content items, or more generally for each of one or more selected factors of interest. In some situations, the quantification is further performed for particular subsets of the user-supplied content items included in the comment group and/or associated with the content category for the time period, such as to correspond to an intersection of that comment group and/or content category with a particular geographical location (for those content items supplied from each of one or more geographical locations), to correspond to an intersection of that comment group and/or content category with a particular author user (for those content items supplied by each of one or more author users), to correspond to an intersection of that comment group and/or content category with a particular comment data source (for those content items supplied to each of one or more comment data sources), etc. Such quantification information for the constituent content items supplied during the time period may then be combined with other corresponding quantification information for other related time periods, such as for all of the time periods during a sliding time window of interest (e.g., for every 30-minute time period during a 72-hour time window), and used to generate a histogram or other aggregation of that combined quantification information. In some embodiments, the quantification of information for a time period includes summarizing and encoding information about multiple selected factors for the constituent content items supplied during the time period, and the aggregation of that combined quantification information that is generated for multiple time periods during a time window of interest includes a succession of the encoded summary information for the selected factors for each of multiple successive time periods during the time window. The aggregated quantification information may then be used to generate predicted information about expected additional content items that will be supplied by users for the comment group or content category (or particular intersection) corresponding to the aggregated quantification information, such as with respect to one or more of the selected factors that are quantified and optionally summarized and encoded.

For example, a non-exclusive list of types of information that may be predicted with respect to a corresponding selected factor for a comment group and/or a category include the following: a predicted amount (or change) in total quantity of the comments included in the comment group and/or associated with the category (or particular intersection) in one or more future time periods; a predicted direction of increase or decrease in the quantity of the comments included in the comment group and/or associated with the category (or particular intersection) in one or more future time periods; a predicted change in which topics or other attributes will be associated with the category in one or more future time periods; a predicted amount (or change) of influence of one or more author users who supply content items included in the comment group and/or associated with the category (or particular intersection) in one or more future time periods; a predicted amount (or change) of one or more types of sentiment in the content items included in the comment group and/or associated with the category (or particular intersection) in one or more future time periods; a predicted amount (or change) of comments from one or more geographical locations that are included in the comment group and/or associated with the category (or particular intersection) in one or more future time periods; a predicted direction of increase or decrease in the quantity of the comments from one or more geographical locations that are included in the comment group and/or associated with the category (or particular intersection) in one or more future time periods; a predicted amount (or change) of comments from one or more comment data sources that are included in the comment group and/or associated with the category (or particular intersection) in one or more future time periods; a predicted direction of increase or decrease in the quantity of the comments from one or more data sources that are included in the comment group and/or associated with the category (or particular intersection) in one or more future time periods; etc.

In some embodiments and situations, the generating of the prediction information includes performing trend prediction based on the aggregated quantification information for a comment group and/or category (or particular intersection), such as by doing a $2^{nd}$ degree polynomial least squares fit to the quantification information in the generated histogram or other aggregation (e.g., using weighting to reflect time and/or one or more other factors for the quantification information in the generated histogram or other aggregation), and using the resulting trend line to determine the predicted information. In other embodiments and situations, the generating of the prediction information includes matching a generated histogram or aggregation of encoded summary information or other quantification aggregation to a portion of a defined prediction template (e.g., to an initial subset of an additional histogram that is based on quantified information for prior actual user-supplied content items that have been received), and using an additional portion of the defined prediction template (e.g., a later subset of the additional histogram, a later portion of the aggregation of encoded summary information, etc.) to indicate the predicted information. In other embodiments, other types of information may be quantified and used to generate prediction information for a comment group and/or content category (or particular intersection), and additional details are included below about predicting information about expected additional content items that will be supplied by users for a comment group and/or content category (or particular intersection).

The analysis of user-supplied information for a time period may further include generating a prediction template that reflects actual user-supplied content items that are received over time for a comment group and/or content category, such as for later use in predicting information about expected additional content items that will be supplied by users. For example, a histogram or aggregation of encoded summary information or other aggregation of quantification information that is generated to reflect user-supplied content items received for a comment group and/or a content category (or particular intersection) may be analyzed to determine if the histogram or aggregation of encoded summary information or other quantification aggregation is successful in predicting other expected content items that will be received in other situations. In addition, or alternatively, trend prediction information that is generated based on a generated histogram or aggregation of encoded summary information or other quantification aggregation for a comment group and/or a content category may be analyzed to determine if the corresponding predicted information reflects later user-supplied content items that are actually received for the comment group or content category. When a generated histogram or aggregation of encoded summary information or other quantification aggregation and/or corresponding trend prediction information is found to be successful in predicting other user-supplied content items, it may be put into use as a prediction template in predicting additional future user-supplied content items that will be received, such as to further evaluate its performance. In other embodiments, prediction templates may be generated in other manners, and additional details are included below about generating a prediction template for later use in predicting information about expected additional content items that will be supplied by users.

After the analysis of user-supplied information for one or more time periods is performed, various types of resulting automated actions may be taken, such as based on analyzed information about the user-supplied content items that have already been received and/or based on predictions about additional user-supplied content items that are expected to be received. For example, information from the analysis may be provided to one or more clients of the GDP service, such as users or other entities who pay fees to receive information about specified content categories of interest. In addition, in some embodiments and situations, information from the analysis is used by the GDP service to take automated actions to supply additional content items that correspond to a comment group or category of interest (e.g., additional comments that are generated by the GDP service and made available to users), or to otherwise supply information corresponding to the comment group or category (e.g., initiating or changing related Internet-based advertising or other advertising), optionally in accordance with instructions or other criteria specified by one or more clients of the GDP service—such additional information may, in some situations, alter or otherwise affect future direction of a particular distributed group discussion, such as by including additional supplemental information to further support particular topics and conversations, by including additional information to refute or otherwise alter a discussion about particular topics, etc. In other embodiments, various other types of actions may be taken by the GDP service in appropriate circumstances, and additional details are included below about taking automated actions based on information generated from the analysis of user-supplied information for one or more time periods.

In addition, other types of analysis of user-supplied information for one or more time periods may be performed in at least some embodiments, such as to generate additional types of information related to distributed group discussions. As a first example, information about users who supply content items in one or more comment groups and/or associated with one or more categories during one or more time periods may be analyzed, such as to determine particular author users who have a high or low amount of influence within the comment groups or categories (e.g., relative to other author users for the same or other comment groups and/or categories), such as to be able to direct how a discussion evolves or changes. As a second example, information about content items in one or more comment groups and/or associated with one or more categories during one or more time periods may be analyzed, such as to perform a sentiment analysis with respect to contents of the content items (e.g., by using term/symbol list matching; topic decomposition and subspace projection; Bayesian classification or other classification techniques, such as using training data from human-annotated sentiment assignments of particular user comments; etc.). Such additional types of discussion-related information for one or more comment groups and/or one or more categories over one or more time periods may be used in various manners, including to encode summary information about one or more such additional types of discussion-related information for one or more corresponding selected factors, to take some or all of the same types of automated actions as discussed above, or instead to take other types of automated actions. In other embodiments, various other types of analyses may be performed by the GDP service to generate various other types of additional discussion-related information, and additional details are included below about performing analyses with respect to author user influence and/or sentiment analysis.

For illustrative purposes, some embodiments are described below in which specific types of user-supplied information is analyzed to provide particular types of resulting information related to distributed group discussions in specific ways, including to predict various types of information about expected future user-supplied information that will be received. However, it will be understood that such information related to distributed group discussions may be generated in other manners and using other types of input data in other embodiments, that the described techniques may be used in a wide variety of other situations for other types of data, that other types of information related to distributed group discussions may similarly be generated and used in various ways, and that the invention is thus not limited to the exemplary details provided.

FIGS. 2A-2K illustrate examples of analyzing distributed group discussions and predicting further aspects of the discussions, such as by an example embodiment of the GDP service (not shown). While particular example types of user comments, comment groups and categories are discussed, it will be appreciated that the details are provided for illustrative purposes, and that the described techniques may be used with a variety of other types of user-supplied information.

In particular, FIG. 2A illustrates several example user comments 205, along with information about some corresponding initial comment groups 230 that may be created based at least in part on these user comments. In this example, the user comments 205 include comments supplied by different users to a single comment data source (referred to in this example as "comment data source XXX"), such as the Twitter social networking service, although user-supplied information from multiple sources may be obtained and analyzed when creating initial comment groups in some embodiments. In addition, in this example, the illustrated user comments are submitted during a single time period (e.g., within a 30-minute time period), although particular timing information is not illustrated.

In particular, in this example, a first user comment 205*a* is shown, which includes various metadata 210*a* and other content (which in this example includes a title and accompanying textual content). The metadata 210*a* that is available to the GDP service in this example includes an author user name 211*a*, an author user source-specific identifier 212*a*, information 213*a* about a geographical location from which the comment was supplied, and information 214*a* about the comment data source to which the user comment was supplied—at least some such information may not be displayed to other users, however, such as the geographical location information 213*a* and/or the comment data source information 214*a*. In this example, an analysis of the user comment may identify a variety of topics or other attributes that may be used for subsequent analysis, including in some embodiments and situations to treat each word or phrase in the contents as a topic, and to include each of the indicated types of metadata information 211*a*, 212*a*, 213*a* and 214*a* as a comment attribute. Examples of topics that may be used from the comment's contents include words in the title (e.g., "republican" 222*a*), words in the content body (e.g., "president" 220*a*, "Obama" 221*a*, "are" 224*a*, "the" 225*a*, etc.), and phrases (e.g., "debt limit" 223*a*). In other embodiments, a subset of the words/phrases and other attributes may be selected using one or more of a variety of types of information analysis techniques, such as to eliminate words that are too common to be useful in identifying the subject matter of the comment (e.g., "the", "of", etc.), and to ignore differences in capitalization, hyphenation, stemming, etc.

The user comments 205*b* and 205*c* similarly include metadata 210 and other contents, and include various types of information that may be used as topics or other attributes for those comments. For example, user comment 205*b* includes the term "Obama" 222*b* in a manner similar to term 221*a* of comment 205*a*, as well as various other terms (e.g., "eagle" 221*b* and "10860" 228*b*). Comment 205*b* is also illustrated as including two in-line metadata hashtags that may be used as topics for the comment, which in this example are "#OvalOffice" 226*b* and "#Obama" 227*b*. In some embodiments and situations, terms such as "Obama" and "#Obama" may be grouped together and treated as the same topic, while in the illustrated embodiment the terms are handled separately. User comment 205*c* similarly includes various terms, which in this example includes a user-selectable link 229*c* (e.g., an HTML hyperlink)—in some embodiments, such links and/or associated metadata for the links (e.g., terms that are included as part of the link, tags or other metadata associated with the link, etc.) may be used as topics, and in some embodiments contents of such a link may be retrieved and analyzed for use as contents and/or metadata of user comment 205*c* in a manner similar to other inline contents, while in other embodiments one or more both such types of information may not be used. In some embodiments, a user comment may further have additional information supplied by other users that may similarly be used as a topic or attribute for the comment (e.g., hashtags, such as #president or #funny; other types of tags, such as "funny" or "like" or "useful" or "©"; etc.), although such types of additional information are not illustrated in this example. It will be appreciated that the identification of topics or other attributes for one or more user comments may be performed in a variety of manners in various embodiments. For example, in some embodiments the analysis is performed in a language-neutral manner (e.g., when extracting n-grams from the contents of a user comment), and thus the user comments may include comments in multiple languages—in some such embodiments, translation capabilities may further be employed to translate at least some user comments into one or more target languages before the identification of topics or other attributes for those user comments. As one non-exclusive example of a particular set of techniques for identifying at least some topics or other attributes for at least some user comments, the following steps may be employed: n-grams are extracted from comment title and body text by first converting the text to a collection of n-grams (e.g., bi-grams or tri-grams); the n-grams containing predefined common words in at least some positions are removed from consideration; a most significant set of X n-grams are then selected based on scoring (e.g., via a pointwise mutual information, or PMI, algorithm), with X being a configurable predefined number or otherwise being determined based on the available data (e.g., a specified percentage); and changes in significance of the n-grams are tracked as more comments containing them are identified.

After the topics and other attributes are identified for a variety of user comments being analyzed, comments groups may be created for each of some or all of the topics and other attributes. A few example comment groups 230 are illustrated, along with information about particular example comments included in each comment group. For example, the "President" comment group 230*a* is based on the term "president", and includes at least comments 205*a* and 205*c*, since those comments include terms 220*a* and 222*c*, respectively, that match the term (but does not include comment 205*b* in this example, despite its contents being related to the president of the United States, since the term "president" is not included in comment 205*b*). Comment groups 230*b* and 230*c* correspond to the terms "Obama" and "#Obama", respectively, and the comment group based on the term "the" reflects that most or all comments may include such common terms. Comment groups 230*e* and 230*f* provide examples of comment groups corresponding to comment attributes that may be from metadata rather than contents of at least some user comments, such as for comment group 230*e* corresponding to a particular geographical location (in this example, the city of "Philadelphia") and including any comments supplied from that geographical location (with other comment groups, not shown, corresponding to other geographical locations), and for comment group 230*f* corresponding to a particular author user (in this example, user "Andy Jones") and including any comments supplied by that author user (with other comment groups, not shown, corresponding to other author users). It will be appreciated that geographical locations and users may be represented in a variety of manners in various embodiments, including at differing degrees of specificity (e.g., to represent geographical locations by individual addresses, GPS coordinates, neighborhoods, cities, regions, counties, states, countries, etc.; and to represent users via legal names, source-specific login names or screen names or other identifiers, numeric or other unique identifiers, etc.). While not illustrated here, comment groups may also be created for each of multiple distinct comment data sources, to include comments supplied to those comment data sources.

FIG. 2B continues the example of FIG. 2A, and in particular illustrates additional user comments and corresponding information for some of the created comment groups 230. In particular, after user comments are analyzed for a time period and initial user comment groups are created, those user comment groups may in some embodiments and situations be supplemented to include information about additional related user comments, such as from one or more additional supplemental comment data sources.

In the example of FIG. 2B, additional user comments are obtained from two additional comment data sources, referred to in this example as "comment data source YYY" (as shown in information 244*a*) and "comment data source ZZZ" (as shown in information 244*b*). For example, comment data source YYY may include primarily textual comments, in a manner similar to that comment data source XXX (e.g., posts to the Facebook social networking service), while the comment data source ZZZ may include primarily non-textual comments that include some textual tags or other commentary (e.g., images posted to the Pinterest or Instagram social networking sites). Various other types of comments and content items may be analyzed in other embodiments, as discussed in greater detail elsewhere.

In this example, the additional user comment 245*a* from comment data source YYY includes an additional comment from author user "Andy Jones" 241*a* who also supplied comment 205*a* of FIG. 2A, although the metadata available to the GDP service from comment data source YYY does not include geographical location information or a source-specific identifier. Nonetheless, if the GDP service is able to identify the two users as the same person, such as by creating, maintaining and using a mapping between different identifiers for a particular user, the "Andy Jones" comment group 230*f* is modified to include this comment 245*a*, as shown in the modified comment group information 235 of FIG. 2B—alternatively, in some embodiments, such a comment would be added to the comment group without attempting to verify a common identity, such as based on the author name matching for both comments. Comment 245*a* is also added to the "#Obama" comment group 230*c* based on its inclusion of a #Obama hashtag in its comments.

Additional user comment 245*b* from comment data source ZZZ includes a photo and related supplementary text, and is added to the "Obama" comment group 230*b* (based on the term being included in the textual commentary) and the "Philadelphia" geographical location comment group 230*e* (based on geographical location information 243*b*) for the comment 245*b*. While not illustrated here, in some embodiments an analysis of data in a user comment may be performed to identify additional attributes that may be used to associate the user comment with one or more appropriate comment groups. For example, with respect to the example user comment 245*b*, an image recognition process and/or other analysis of the photo may be performed to identify additional metadata attributes (e.g., based on identified objects, people, locations, etc.) for the user comment—illustrative examples include the following: to recognize President Obama within the photo, and thus associate the user comment with comment group 230*b* even if the provided commentary was absent; to recognize Washington D.C. or the Capitol building from the photo, and associate the user comment with corresponding comment groups; to examine location and time metadata embedded in the photo or otherwise associated with the photo, and use the location data to associate the user comment with a corresponding comment group; etc. In some embodiments, a comment group 230*e* will include both comments that are supplied from the geographical location of Philadelphia and comments that include the term "Philadelphia" in the contents or other attributes of the comment, while in other embodiments the comment group 230*e* will only include comments that are supplied from the geographical location of Philadelphia. The modified comment group information 235 further illustrates an example of a data source comment group 230*g* in this example, which corresponds to comment data source XXX, although such a comment group 230*g* would not be modified in this supplemental operation in this example since the additional user comments are not from the comment data source XXX. In addition, if new topics or attributes are included in the additional user comments that were not present in the initially analyzed user comments (e.g., comments from author user "Jenny Smith" 241*b*), new comment groups may be created for such new topics or attributes in some embodiments, while in other embodiments such new comment groups will not be created.

FIG. 2C continues the examples of FIGS. 2A and 2B, and in particular illustrates determining information for a category of interest based in part on the user comments and created comment groups discussed in FIGS. 2A and 2B. In particular, definition information is first obtained for one or more categories of interest, and matching user comments are identified, as reflected in section 250 of FIG. 2C. In this example, a first "President Obama" category has been defined, which in this example includes terms "President", "Obama", and "White House" in its definition, and a second "NFL" category has been defined, which in this example includes terms "NFL" and "football". The various user comments for the time period of interest are searched, and any comments matching one or more of the definition terms is associated with the corresponding category. None of the example user comments is associated with the NFL category in this example, as none of the user comments included the terms "NFL" or "football" (although user comment 205*c* of FIG. 2A did have subject matter corresponding to a particular NFL football team). All of the example user comments have been associated with the President Obama category in this example, as each comment included at least one of the category definition terms (although the "president" term included in the football-related user comment 205*c* of FIG. 2A did not actually refer to President Obama). It will be appreciated that the matching of comments and categories may be performed in a variety of manners in various embodiments, including based on contents of the comments and/or based on metadata associated with the comments. For example, in some embodiments, a match between a term or attribute in a comment and a term or attribute for a category definition may be identified and used to associate the comment with the category, such as if measured by a vector inner product or other matching technique. Alternatively, a comment may be projected into a comment group subspace, with the comment group having a projection into a category. In addition, if a photo has been associated by one or more users with an "Obama" tag, the photo (and/or comment that contains the photo) may be associated with the President Obama category 250*a*, even if there is no other mention of "Obama" in the contents and/or other metadata for the photo/comment. Furthermore, rather than such tags being supplied by a user author of a comment and/or by other user reviewers of the comment, such tags may in some embodiments and situations be provided by a comment data source or other entity that provides information about and/or access to comments. Similarly, one possible source for category definition information in at least some embodiments includes such comment data sources or other entities that provide information about and/or access to comments.

After the matching user comments are associated with a category in section 250, all of the created comment groups to which those matching user comments belong are then identified, as shown in part in section 255 for the President Obama category. It will be appreciated that each user comment may be associated with multiple comment groups, and thus a large number of comment groups may be initially identified for a category. In the example of section 255, the identified comment groups are then analyzed to determine their relevance to the associated user comments shown in section 250. In particular, in this example, the frequency is determined for each identified comment group that the associated user comments in section 250 are included within that comment group. As an example, information 260 illustrates that 10,000 user comments have been identified as being associated with the "President Obama" category in section 250 (although only a small fraction are shown in section 250). Using the "The" comment group discussed in FIG. 2A as an example, of the 10,000 user comments that are associated with the "President Obama" category in section 250, almost all of those associated user comments include the term "the" and are thus included in the "The" comment group. In this example, the identified comment groups for the "President Obama" category are listed in section 255 in order of decreasing frequency, with the "The" comment group having the highest listed frequency, and a "Chip Kelly" comment group having a lowest listed frequency of 5 comments of the 10,000 associated user comments. For example, user comment 205*c* of FIG. 2A represents one of those 5 comments, since it includes the terms "Chip Kelly" and "president", causing it to be included in the associated user comments in section 250, but to have only 4 other comments in this time period that included both "Chip Kelly" and one of the category definition terms as topics or other attributes of those user comments.

Additional processing is then performed to select a subset of the identified comment groups as being associated with the "President Obama" category for this time period. In particular, as shown in information 260, an average frequency is determined for the identified comment groups, and frequency-based minimum and maximum inclusion thresholds are determined based in part on the average frequency. As one example, the standard deviation (not shown) may be further determined for the frequency values, and the minimum and maximum inclusion thresholds may be determined based in part on the standard deviation. In this example, the lines 255*a* and 255*b* in section 255 denote the lines for the maximum and minimum inclusion thresholds, respectively. Accordingly, a term such as "the" is excluded in this example as being too ubiquitous or general for the category, and a term such as "Chip Kelly" is excluded as being too rare or specific (or irrelevant) for the category. The topics or other attributes of the remaining identified comment groups may then be identified as topics that are relevant to the "President Obama" category for this time period, including topics such as "Obama," "President," "democrat," "inauguration," "debt limit," and "republican," as well as geographical location attributes "Washington D.C." and "Chicago"—while no author user attributes or comment data source attributes are illustrated in this example, it will be appreciated that such attributes may similarly be identified and included. It will further be appreciated that some of the identified topics for this category may be fairly constant over different time periods (e.g., "President" and "democrat"), while other identified topics may change over time to reflect subject matter that is or is not of sufficient current interest at a given time (e.g., such that "inauguration" and/or "debt limit" may not be included in this category during some time periods).

Figure 2D:

FIG. 2D continues the examples of FIGS. 2A-2C, and includes information about quantifying information about the user comments included in a comment group or about the user comments associated with a content category, and about using the quantified information to predict information about additional user comments that are expected to be received. In particular, FIG. 2D illustrates a histogram graph 260 that may be constructed to represent information about such user comments for a time window, with each time period of a defined length (e.g., 30 minutes) having a distinct value for the histogram. In this example the histogram is constructed using 30 prior time periods (for a time window of 15 hours), although in other embodiments a time window of other lengths may be used (e.g., 24 hours, 48 hours, 72 hours, etc.). If the histogram 260 corresponds to a particular comment group, such as the "inauguration" comment group that is one of the determined comment groups for the "President Obama" content category discussed in FIG. 2C, the shape of the histogram may reflect that interest in a distributed group discussion involving the inauguration topic has recently increased, but may recently be decreasing over the last 3 time periods. Such quantified information may provide various types of benefits to various entities, such as people planning for attendance at inauguration-related activities, companies that are offering products or services affected by inauguration-related activities, news organizations or other entities that track interest in political topics, etc., particularly if the quantified information is available in a real-time or near-real-time manner with respect to the underlying user comments (e.g., within minutes or hours).

While such quantified information may be of use to reflect recent events and status, such quantified information may further be used to predict information about additional user comments that are expected to be received, including changes with respect to topics that are part of a category, and/or changes with respect to how many, when, where and by whom that expected future user comments will be received for a particular comment group or content category. FIG. 2D further illustrates one example of how such prediction may be performed based on the histogram graph 260, which involves matching the histogram graph 260 to a defined prediction template 265. The prediction template 265 may, for example, be one of multiple defined prediction templates that are available to be used, with some or all such defined prediction templates being based at least in part on prior actual user comments have been received. In particular, in this example, a portion 260*a* of the histogram graph 260 is matched to a corresponding portion 265*a* of a prediction histogram that is part of the template 265—such matching may be performed in various manners, such as by measuring differences for values for corresponding time periods in the two histograms being compared, or more generally using techniques to compare two curves or other shapes. It will be appreciated that the matching of a histogram graph to a prediction template may be performed in a variety of manners in various embodiments. A non-exclusive list of techniques that may be used as part of the matching includes the following: root-mean-square ("RMS") error or deviation; vector inner product; absolute difference; information-theoretic measures (e.g., the Kullback-Leibler divergence); etc. In addition, in some embodiments, the prediction templates are selected in a manner that is not specific to particular categories and/or comment groups, such as to instead identify and use patterns over time that are repeatedly observed across comment groups and/or categories (e.g., by promoting and using the prediction templates that are successful over time, while decreasing and removing the use of prediction templates that are not successful). Furthermore, in some embodiments and situations, a histogram template of a given length of time (e.g., 72 hours) with data points for each time period of interest (e.g., 30 minutes) may consider one or more prediction templates with respect to each data point (e.g., with each such prediction template being for the same given length of time).

Based on the match to portion 265*a* of prediction template 265, some or all of the additional portion 265*b* of the prediction template 265 may be used to predict additional expected future comments that will be received for the comment group or category represented by histogram graph 260, such as after any appropriate scaling is performed. In particular, in this example, the additional portion 265*b* of the prediction template 265 may be used to predict that the quantity of user comments will continue to fall for five more time periods, and to then level off for about eight additional time periods, after which the quantity will rise again somewhat before gradually decreasing. It will be appreciated that a variety of types of shapes may be represented by prediction templates in a variety of manners, such as to reflect a variety of types of distributed group behavior related to an underlying discussion that is occurring.

By generating such quantified information for each determined comment group for a content category, and by predicting additional corresponding information for each such comment group, a variety of types of information may be determined for the content category. As one example, if the quantity of comments that are predicted to occur for a first comment group decreases sufficiently, while the comments that are predicted to occur for a second comment group increases, the increasing influence of the topic for the second comment group to the content category may be determined. In addition, the time at which a particular topic will stop and/or start being a sufficiently relevant topic for a content category may be predicted. Based on such information, the GDP service or a client that receives such information may be able to take various types of corresponding actions, such as to reduce or stop activities related to topics that are losing relevance, to increase or start activities to try to increase interest in a topic of importance that is otherwise losing relevance, to target additional activities related to topics that are increasing in relevance, etc. In addition, when such quantified information is generated for geographical location attributes, comment data source attributes, and/or author user attributes that are determined topics for a content category, and when additional corresponding expected future information is predicted for such attribute-based comment groups, a variety of additional types of information may be determined for the content category. For example, not only can relative differences be determined in the relevance of different topics to a category, but such differences can similarly be tracked and predicted across different geographical areas (e.g., this topic is increasing in relevance in location A, but remaining constant in location B), different comment data sources, and/or different author users. Differences across other types of attributes may similarly be tracked and predicted, and such information about attribute-based comment groups may similarly be used by the GDP service or a client that receives such information to take various types of corresponding actions.

Figure 2E:
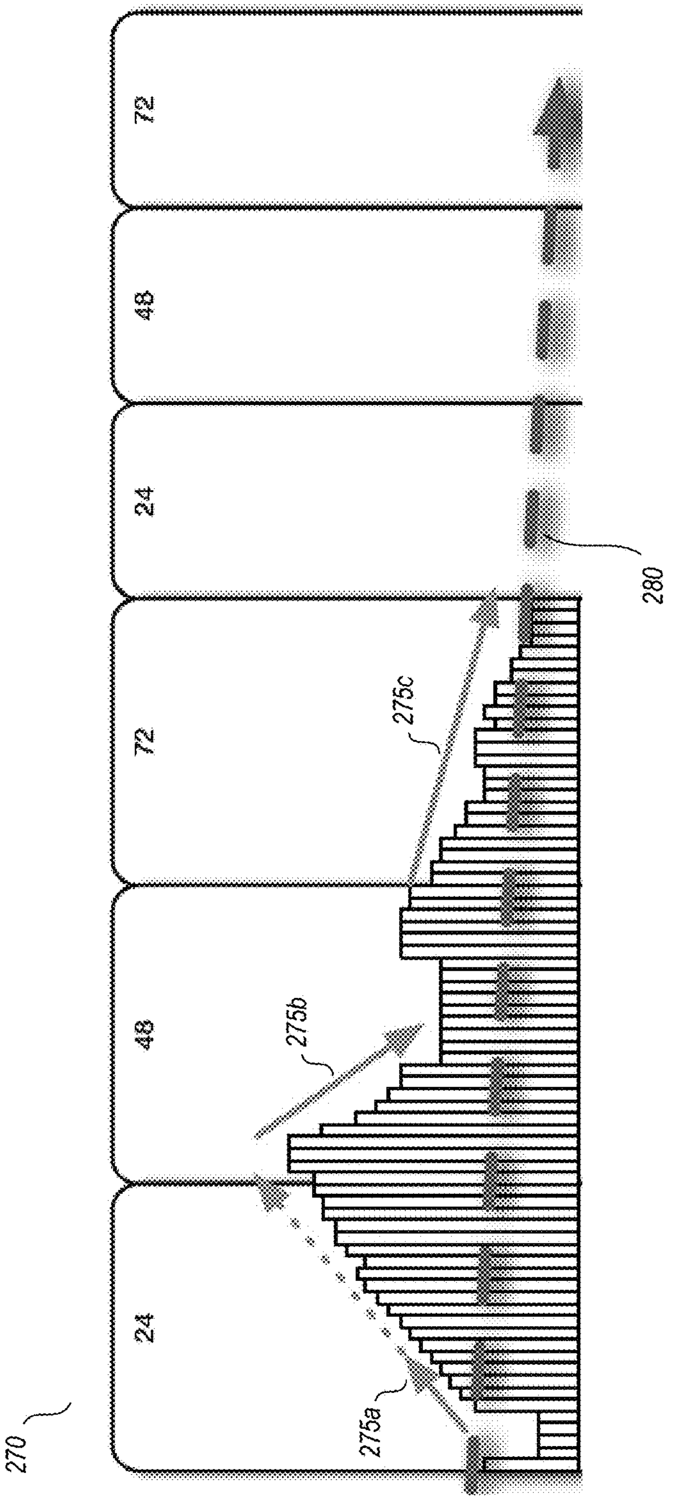

FIG. 2E continues the examples of FIGS. 2A-2D, and includes additional information about using quantified information to predict information about additional user comments that are expected to be received. In particular, FIG. 2D provided an example of performing prediction based on a defined prediction template that is determined to sufficiently match a generated histogram. In other embodiments or situations, such as when no such defined prediction templates exist or sufficiently match the generated histogram, prediction activities may be performed for a generated histogram in other manners, with FIG. 2E providing additional details about one such example of other prediction activities.

FIG. 2E illustrates a histogram graph 270 that is similar to graph 260 of FIG. 2D, but that includes data for additional time periods, and in particular corresponds to a 72-hour sliding time window of prior time periods. In order to predict additional future user comments that will be received based on the existing actual comments that have been received during the time window, a trend line 280 is determined from the existing data in the generated histogram, and is projected across one or more future time periods of interest (in this example over a future period of at least 24 hours). While particular future values are not individually illustrated, they can be easily determined for a particular future time period from such a prediction trend line. It will be appreciated that trend lines may be generated in various manners in various embodiments, and that a $2^{nd}$ degree polynomial least squares fit may be used in at least some embodiments to generate such a prediction trend line—in addition, while the trend lines illustrated in FIG. 2E are linear, in other embodiments and situations such trend lines that are generated and used may have a variety of other shapes (e.g., various types of curves, such as based on higher-order polynomials used with least squares fit, or otherwise based on exponential and/or weighted techniques). In addition, in some embodiments a minimum threshold may be established for having sufficient data to generate such trend line predictions, such as a minimum quantity in one or more time periods and/or a minimum number of time periods with quantified values, such that the trend line prediction may not be performed until the sufficient data threshold is reached.

In addition to using a trend line prediction to generate prediction information for future time periods, the same or similar types of trend line prediction information may be used to assist in generating new defined prediction templates. For example, considering the histogram graph 270, various portions of the histogram graph may be selected for additional analysis, such as the last 24 hours (the portion labeled "72" that includes histogram data), the last 48 hours (the portions labeled "48" and "72" that include histogram data), the first 24 hours (the portion labeled "24" that includes histogram data), the first 48 hours (the portions labeled "24" and "48" that include histogram data), etc. For each such portion of the histogram, a prediction trend line may be generated based on the data in that portion, and the subsequent portions of data about actual user comments may be used to determine if the prediction trend line accurately predicted information about those actual user comments. If the prediction trend line for a portion of the histogram does accurately predict such information, that portion of the histogram may be selected to be used or evaluated as a prediction template for performing future predictions, and/or that portion of the histogram plus the later actual matching predicted data may be selected for use as such a prediction template. In the example of FIG. 2E, a prediction trend line 275*a* has been generated to correspond to the portion of the histogram for the first 24 hours, a prediction trend line 275*b* has been generated to correspond to the portion of the histogram for the second 24 hours, and a prediction trend line 275*c* has been generated to correspond to the portion of the histogram for the third (or last) 24 hours, although neither of the prediction trend lines 275*a* and 275*b* appear to accurately predict data for the next 24 hour period in this example. When evaluating a prediction trend line that uses the most recent actual data (e.g., trend lines 275*c* or 280), the evaluation based on actual data may be deferred until a future time when that actual data is available, such as after an additional 24 hours have passed. It will be appreciated that such matching of a predicted trend line to actual user comment data may be performed in various manners, such as by measuring differences for values for one or more time periods between the predicted values and the actual values, or more generally using techniques to compare two curves or other shapes. It will also be appreciated that the matching of a trend line to a histogram graph may be performed in a variety of manners in various embodiments, including in some embodiments to use techniques similar to those previously described with respect to matching histogram graphs and prediction templates.

FIGS. 2F-2K continue the examples of 2A-2C, and illustrate alternative techniques for predicting future information about a comment group and/or an intersection of a comment group and a category (e.g., based on the content items that are part of the comment group and that are associated with the category). In particular, in the example embodiments of FIGS. 2F-2K, summary information is determined and aggregated for multiple content items (e.g., the content items of a comment group) at a time period, such as to correspond to multiple selected factors for the multiple content items, and is encoded to represent the summary information in a compact form. Additional information is similarly summarized and encoded for other time periods for related groups of multiple content items for those same selected factors (e.g., for the content items that are part of a single comment group during each of successive periods of time), and the encoded summary information for each of the time periods during a time window of interest is aggregated—such an aggregation may include, for example, a succession of the encoded summary information for the selected factors for each of multiple successive time periods during the time window. Such aggregated encoded summary information may then be used in various manners, including to predict future information for related future groups of content items (e.g., for future content items that will belong to the same single comment group), such as with respect to one or more of the selected factors. In at least some embodiments, such prediction may include matching such aggregated encoded summary information to a prediction template that similarly includes encoded summary information for multiple prior time periods for some or all of the same selected factors, and then using an additional portion of encoded summary information for that prediction template (e.g., for later time periods) to enable the prediction.

In particular, FIG. 2F illustrates an example of various types of information that may be quantified for an example comment group (or other group of related content items). An example table 1000 is illustrated in FIG. 2F, with each of the rows 1001*a*-1001*f* corresponding to a different successive time period (e.g., successive 30-minute time periods) and including various types of quantified information for the example comment group during that time period. In this example, the types of quantified information 1003 include a total quantity 1003*a* of content items, smaller quantities 1003*b*-1003*c* that represent a subset of the total quantity of content items at each of multiple different geographical locations of interest, other smaller quantities 1003*d*-1003*e* that represent a subset of the total quantity of content items supplied via each of multiple different data sources, other smaller quantities 1003*f*-1003*g* that represent a subset of the total quantity of content items supplied by each of multiple different author users, information 1003*h* to indicate an assessed aggregate sentiment for the comment group (e.g., using an automated sentiment analysis), and information 1003*i* to indicate an assessed most influential author for the comment group—it will be appreciated that various other types of information may be quantified in some embodiments, whether instead of or in addition to the illustrated types of quantified information.

A comparison or other analysis of the quantified information in the table 1000 provides various information about the changes of the quantified information over time, including the following non-exclusive examples: a change in total quantity of content items over successive time periods, such as may be measured in an absolute number or percentage change (e.g., to determine that the total quantity increases in amount by approximately the same quantity between each of the first four time periods, which are time period N through time period N+3 as shown in rows 1001*a*-1001*d*, but the increase slows in time period N+4); changes between different geographical locations over time (e.g., to reflect that location 1 initially has much larger quantities that location 2 but that the quantities for location 1 begin to decrease in time period N+2, while the quantities continue to grow for location 2 until time period N+3 and surpass the quantities for location 1 in time period N+2); changes between different data sources over time (e.g., to reflect that data source 1 initially has much larger quantities that data source 2 but that the quantities for data source 1 begin to decrease in time period N+2, while the quantities continue to grow for data source 2 until time period N+3 and surpass the quantities for data source 1 in time period N+3); changes between different author users over time (e.g., to reflect that author user 1 initially supplies larger quantities that author user 2 but that the quantities for author user 1 begin to decrease in time period N+2, while the quantities continue to grow for author user 2 until time period N+3 and surpass the quantities for author user 1 in time period N+3); changes in aggregate user sentiment, such as to reflect that user sentiment changes from positive (with value '3') to neutral (with value '2') in time period N+3 and to negative (with value '1') in time period N+5; changes in the most influential author user, such as to reflect that author user 1 continues to be the most influential in time period N+3 despite not supplying the most content items during that time period, and that author user 2 surpasses author user 1 as the most influential in time period N+4; etc. It will be appreciated that various other types of information may be determined in some embodiments from analyses of quantified information, whether instead of or in addition to the discussed types of information.

FIG. 2G continues the example of FIG. 2F, and illustrates how various types of summary information may be encoded for the example comment group, such as with respect to various types of selected factors of interest. In particular, FIG. 2G illustrates information 1100 to reflect 3 different types of encoding schemes that may be used to represent different types of selected factors and corresponding data summarizations, with each of the rows 1101*a*-1101*f* corresponding to the same successive time periods shown in rows 1001*a*-1001*f* of FIG. 2F. Each of the rows additionally shows an encoded summary value for the example comment group during that time period for each of the 3 example encoding schemes. In this example, the encoding scheme information 1103 include information 1103*a* for encoding scheme 1, information 1103*b* for encoding scheme 2, and information 1103*c* for encoding scheme.

FIG. 2G further illustrates information about the encoding scheme 1, which in this example represents 5 selected factors and data summarization types, as follows: a) total comment quantity information (based on column 1003*a* of FIG. 2F), with the corresponding encoding scheme value being encoded into one of four values 0-3 with corresponding indicated ranges of quantity values; b) percentage quantity change information relative to the prior time period, with the corresponding encoding scheme value being encoded into one of ten values 0-9 with corresponding ranges of percentage change values; c) aggregate sentiment information (based on column 1003*h* of FIG. 2F), with the corresponding encoding scheme value being the same values as shown in column 1003*h*; d) an indicator of the data source with the highest quantity for the time period (based on columns 1003*d*-1003*e* of FIG. 2F), with the corresponding encoding scheme value being an identifier with a value in the range of 0-63; and e) an indicator of the data source with the second highest quantity for the time period (based on columns 1003*d*-1003*e* of FIG. 2F), with the corresponding encoding scheme value being an identifier with a value in the range of 0-63.

FIG. 2G also illustrates information about the alternative encoding scheme 2, which in this example represents 4 selected factors and data summarization types—for example, the first factor for encoding scheme 2 represents total comment quantity information in a manner similar to factor (a) of encoding scheme 1, but with different encoding scheme values (in this example, with the quantity being encoded into one of ten values 0-9 with corresponding indicated ranges of quantity values that are different from those for encoding scheme 1); the second factor for encoding scheme 2 represents an indicator of the data source with the highest quantity for the time period like factor (d) of encoding scheme 1; and the third and fourth factors for encoding scheme 2 represent different types of information not represented in encoding scheme 1. While details about the alternative encoding scheme 3 are not shown, it also represents 5 selected factors and data summarization types but they differ from those of encoding scheme 1 in one or more manners. It will be appreciated that various other types of information may be encoded in various other manners in other embodiments, whether instead of or in addition to the illustrated types of encoded summary information.

FIG. 2H continues the examples of FIGS. 2F-2G, and illustrates an example of how the encoded summary information for the example comment group and a particular encoding scheme may be aggregated for multiple time periods of interest. In particular, in the example of FIG. 2H, an aggregation 1200 is shown corresponding to a time window of six time periods, which in this example includes the six time periods whose encoded summary information is shown in rows 1101*a*-1101*f* and column 1103*a* for encoding scheme 1 of FIG. 2G. In the example of FIG. 2H, the aggregation 1200 includes the six encoded summary values for the six time periods in succession, with spaces between the values for readability, but multiple such encoded summary values may be aggregated in other manners in other embodiments (e.g., as a string with no spaces between the successive values, by combining encoded summary values for a particular selected factor in other manners, etc.). In addition, while not shown in FIG. 2H, similar or other types of aggregations may be generated for one or more other encoding schemes, such as by using the encoded summary values in columns 1103*b* and/or 1103*c* of FIG. 2G for encoding schemes 2 and/or 3.

FIG. 2I continues the examples of FIGS. 2F-2H, and illustrates an example of how an aggregation of encoded summary information for the example comment group and a particular encoding scheme may be used to predict future values for one or more of the selected factors represented by the encoding scheme. In particular, in the example of FIG. 2I, the aggregation 1200 is shown again, along with several prediction templates 1301-1304 that also include encoded summary information. In this example, prediction template 1 (reference numeral 1301) and prediction template 2 (reference numeral 1302) are alternative prediction templates which both include summary information that is encoded using encoding scheme 1. In addition, prediction template 1 includes an initial portion 1301*a* that in this example represents six time periods, and an additional portion 1301*b* that represents six additional successive time periods—the other templates 1302-1304 similarly include initial portions and additional portions, with the additional portions being shown in bold in this example.

Furthermore, prediction template 3 (reference number 1303) illustrates that different prediction templates may include different amounts of data for the additional portions, such as if prediction templates 1 and 2 are used to predict future information for up to 6 future time periods, and prediction template 3 is used to predict future information for an additional number of future time periods (e.g., up to 24, up to 48, up to 72, up to 144, etc.)—in other embodiments, all of the prediction templates may include the same amounts of data for the additional portions, but different subsets of the additional portion data may be selected and used (e.g., if the additional portion includes data for 144 time periods, but at times only the next six time periods may be selected and used). In addition, prediction template 4 (reference number 1304) illustrates that different prediction templates may include summary data that is encoded using different encoding schemes, such as to include an initial portion and additional portion whose summary data is encoded using encoding scheme 2.

The initial portions of one or more of the prediction templates may be matched to the aggregation 1200 in various manners in various embodiments—in this example, matching information is illustrated for prediction templates 1 and 2, using a bitwise comparison with a binary yes or no determination of a match. Thus, in comparing the first encoded summary value "23313" of the aggregation 1200 to the first encoded summary value "23276" of the initial portion 1301*a* of prediction template 1, a matching value of "YY---" results, with 'Y' representing a binary yes and '-' representing a binary no, based on the initial '2' of each of the values matching, the next '3' of each of the values matching, the next '3' of the aggregation not matching the next '2' of the prediction template, the next '1' of the aggregation not matching the next '7' of the prediction template, and the next '3' of the aggregation not matching the next '6' of the prediction template. Similar matching values are shown for the remaining part of the initial portion of prediction template 1, as well as for the initial portion of prediction template 2. In other embodiments, a degree of match between two pieces of encoded summary information may be made in manners other than a binary yes or no (e.g., for a selected factor whose values are enumerated with multiple numerical values, to determine a numerical difference between two values).

Given multiple candidate prediction templates such as prediction templates 1 and 2, a best match to the aggregation 1200 may be determined in various manners in various embodiments. In some embodiments, the overall degree of match between the entire aggregation and the entire initial portion may be used, which in this example results in prediction template 2 being a better match to aggregation 1200 than prediction template 1—in particular, prediction template 2 has an 80% degree of overall match (24 matches out of 30 possible values), while prediction template 1 has only a 30% degree of overall match (9 matches out of 30 possible values). If prediction template 2 is selected (e.g., based on being the best match; based on having a degree of match above a defined threshold, such as 75%; etc.), some or all of the additional portion of prediction template 2 may be used to predict future information for one or more of the selected factors represented by encoding scheme 1, as discussed in greater detail with respect to FIG. 2J.

In other embodiments, the degree of match between a subset of the aggregation and a subset of a prediction template's initial portion may instead be assessed. For example, encoding scheme 1 includes information about 5 selected factors, but only 1 factor may currently be of interest, such as factor a) discussed in FIG. 2G corresponding to total quantity information. If so, only the subset of each encoded summary value that corresponds to that selected factor may be considered, which in this example is the first value encoded for each time period—using such a comparison in this example, prediction template 1 is a better match than prediction template 2, as prediction template 1 has a 100% degree of match for factor a) between the six time periods of the aggregation 1200 and of the initial portion 1301*a* of prediction template 1 (6 matches out of 6 possible), while prediction template 2 has only a 50% degree of match for factor a) (3 matches out of 6). If prediction template 1 is selected for use with respect to factor a), some or all of the additional portion of prediction template 1 that corresponds to factor a) may be used to predict future information for that selected factor, as is also discussed in greater detail with respect to FIG. 2J.

FIG. 2J continues the examples of FIGS. 2F-2I, and illustrates an example of how an additional portion of a matching prediction template may be used to predict future information for one or more selected factors represented in the encoding scheme being used. In particular, FIG. 2J illustrates information 1400 to reflect predicted information based on the encoding scheme 1 used for the aggregation 1200 and the prediction templates 1 and 2 discussed in FIG. 2I. In this example, each of the rows 1401*a*-1401*f* corresponding to the same successive time periods N through N+5 shown in rows 1001*a*-1001*f* of FIG. 2F and 1101*a*-1101*f* of FIG. 2G. Additional rows 1401*g*-1401*l* are shown that correspond to six successive time periods N+6 through N+11, and additional rows 1501*g*-1501*l* similarly correspond to those same six successive time periods but include alternative predicted information. In this example, the 5 selected factors of encoding scheme 1 are shown separately in columns 1403*a*-1403*e*, with column 1403*a* corresponding to factor a), column 1403*b* corresponding to factor b), column 1403*c* corresponding to factor c), column 1403*d* corresponding to factor d), and column 1403*e* corresponding to factor e).

Based on prediction template 2 of FIG. 2I being selected as the best overall match to the aggregation 1200, the columns 1401*g*-1401*l* illustrate the values from the encoded summary information shown for the additional portion of prediction template 2 for each of the six successive time periods. Thus, with respect to column 1403*a* corresponding to factor a), rows 1401*a*-1401*f* illustrate the encoded summary information for the total quantity information in time periods N through N+5 (corresponding to encoded versions of the quantification information in column 1003*a* and rows 1001*a*-1001*f* of FIG. 2F), and rows 1401*g*-1401*l* illustrate the encoded summary information for the total quantity information that is predicted for future time periods N+6 through N+11 based on the corresponding values in the additional portion of prediction template 2. Accordingly, the values in column 1403*a* for rows 1401*g*-1401*l* represent predictions for the total quantity of content items in the example comment group that will be supplied during each of the next six time periods. In a similar manner, the information in columns 1403*b*-1403*e* for rows 1401*g*-1401*l* illustrate predictions for the values corresponding to the other 4 selected factors represented in encoding scheme 1 for each of the next six time periods.

The information for column 1403*a* corresponding to factor a), and for rows 1501*g*-1501*i*, illustrate alternative predicted information that may be generated with respect to the next six time periods for the total quantity of content items in the example comment group. In particular, if prediction template 1 of FIG. 2I is selected as best match for this particular selected factor, the corresponding values for this factor from the additional portion of prediction template 1 may be extracted and used to generate predictions for this factor, whether instead of or in addition to the prediction information in rows 1401*g*-1401*i* for column 1403*a*. It will be appreciated that predicted information from prediction templates may be displayed and used in other manners in other embodiments.

FIG. 2K continues the examples of FIGS. 2F-2J, and illustrates an example of how values may be encoded to allow a single character to represent any of the possible values for the encoded summary information for a particular selected factor during a particular time period. In particular, FIG. 2K corresponds to a base64 variant of base32hex encoding, with 64 possible values each being matched to a unique alphanumeric character. In this example, the values 0-63 are shown in columns 1510, and the matching characters are shown to their left in columns 1505, such that value '0' is matched to character '0', value '11' is matched to character 'B', and value 37 is matched to character 'b'. It will be appreciated that various other types of value encodings may be used in other embodiments, including for different numbers of values, using different characters, etc.

It will be appreciated that the details discussed with respect to the examples of FIGS. 2A-2K are provided for illustrative purposes, and that the described techniques may be used with a variety of other types of user-supplied information and may be performed in a variety of other ways.

FIGS. 2L-2V illustrate examples of displaying or otherwise providing analyzed information and/or predicted information for one or more categories and/or comment groups and/or classifications of interest, to reflect corresponding constituent content items for one or more time periods—such information may, for example, be displayed or otherwise provided to users or other entities by an example embodiment of the GDP service, whether directly or via an intermediate affiliated or third-party system. While particular types of visual information and user-selectable controls are discussed with respect to particular example types of user comments, comment groups, categories and classifications, it will be appreciated that the details are provided for illustrative purposes, and that the described techniques may be used with a variety of other types of user-supplied information, and with a variety of other types of visual information and user-selectable controls.

Figure 2L:
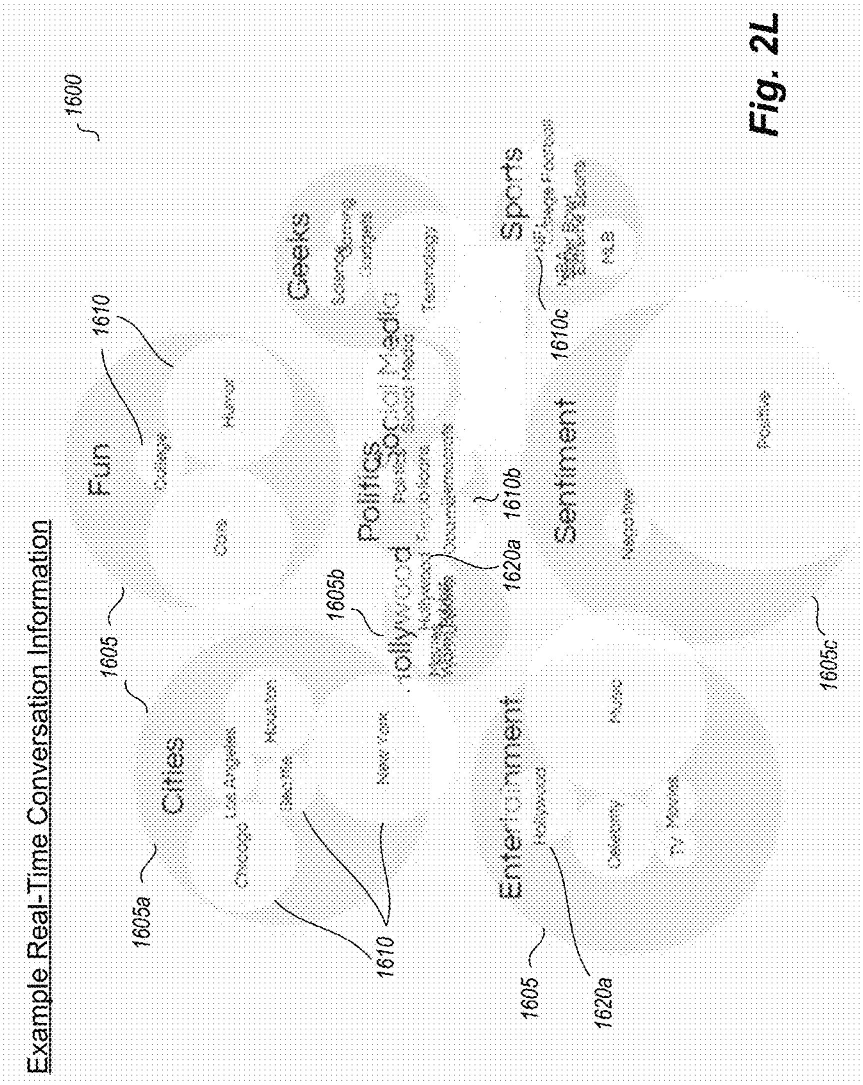
Figure 3:
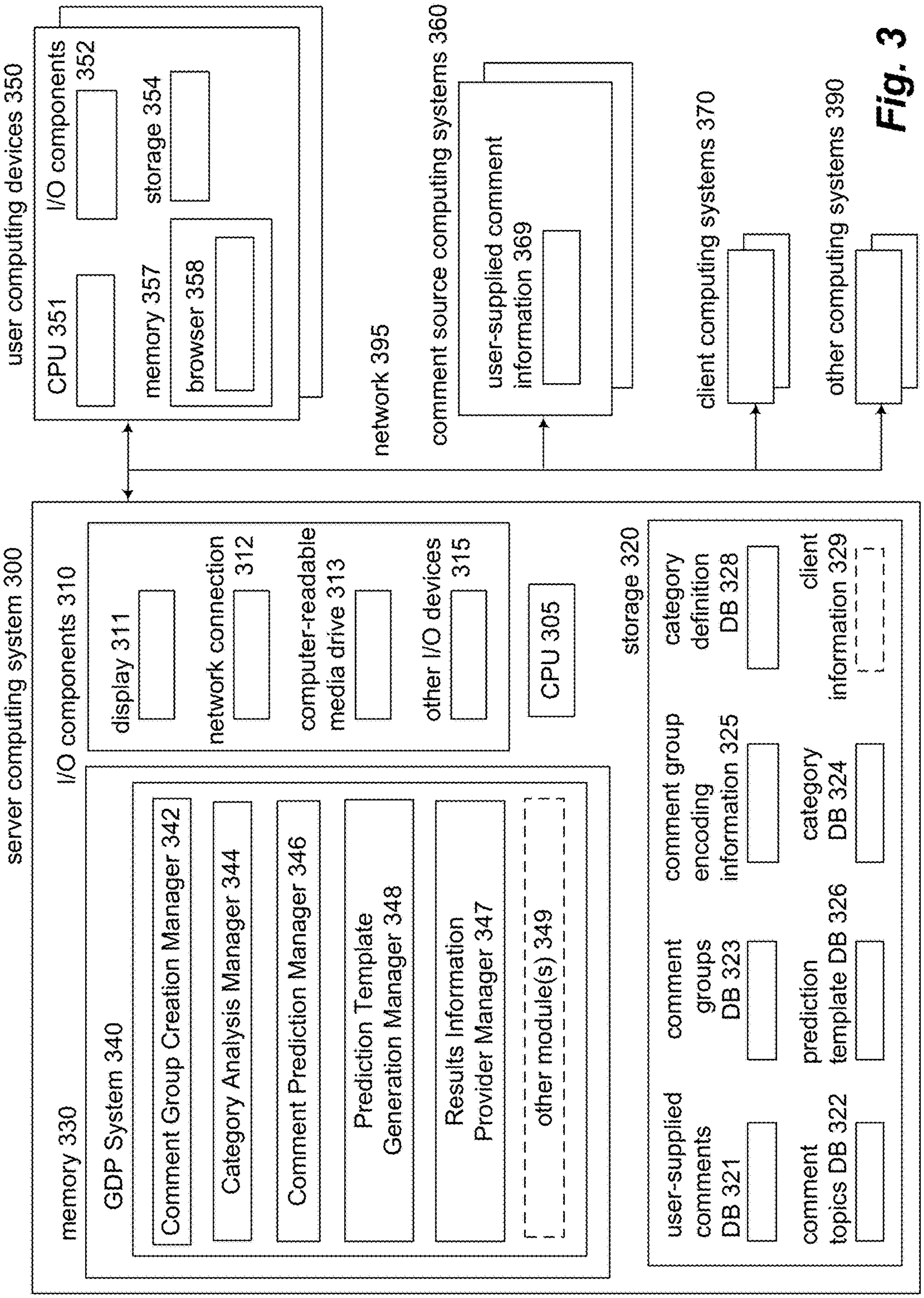
FIG. 3 is a block diagram illustrating a computing system suitable for executing embodiments of a described system for analyzing distributed group discussions and predicting further aspects of the discussions.

In particular, FIG. 2L illustrates an example of a GUI ("graphical user interface") 1600 that may be displayed to a user of the GDP Service, such as on a client computing device of a client 130 of FIG. 1, on a client computing system 370 of FIG. 3, or for another end-user of the GDP Service. In this example, the GUI 1600 illustrates various example real-time information about a variety of distributed group discussions that are occurring concurrently or recently—in other embodiments, information about other times (e.g., predicted future information, historical actual information, etc.) may be displayed, whether in addition to or instead of the real-time information. In particular, in the example of FIG. 2L, a classification-level view is displayed that includes information about several general classifications or areas 1605 of interest, such as to include information about "Cities," "Fun," "Geeks," "Politics," "Hollywood," "Entertainment," "Sentiment," "Sports," "Social Media," etc. Each of the general classifications 1605 may include information about various categories 1610 within that general classification. For example, the "Fun" general classification may include information about categories 1610 that include "Cars," "Humor," "College," etc. Similarly, the classification "Cities" 1605*a* may include information about various categories 1610 that include "Chicago," "New York," etc. The displayed information may include all or a subset of available classifications, and all or a subset of available categories, such as based on user preferences, user configuration, an amount of data available (e.g., to order information according to relevance in one or more manners, and only display a subset of the most relevant information, etc.). In addition, while the example GUI 1600 may include information for a single current time period (e.g., the most recently completed time period, a current partially completed time period, etc.), in other embodiments the determination of one or more time periods for which to display information may be made in other manners (e.g., may be selectable or configurable by the user).

While various GUI controls may be displayed in some embodiments, in the current example such GUI controls are not displayed, although some or all of the displayed indications of the classifications 1605 and/or categories 1610 may themselves be user-selectable controls, such as to enable a user to select a particular classification or category to obtain additional information about it. For example, the user may in some embodiments be able to click on, hover over or otherwise select the "Obama" category 1610*b* in the "Politics" classification, such as to obtain information about the corresponding category (e.g., in a manner similar to that of the "President Obama" category discussed with respect to FIG. 2C and elsewhere). Similarly, the user could select the "NFL" category 1610*c* in the "Sports" classification to obtain corresponding information about an NFL category, such as in a manner similar to that discussed with respect to FIG. 2C and elsewhere. It will be appreciated that some categories may be shared across multiple classifications, such as with respect to the "Hollywood" category 1620*a* that is part of the "Entertainment" classification and the "Hollywood" classification, and with "Hollywood" further representing both a category and a classification in this example. In a similar manner, particular comment groups (and associated topics or other attributes) may be shared across multiple categories and/or classifications, as discussed in greater detail elsewhere, including with respect to FIG. 2M. In addition, while information such as sentiment may be analyzed and provided with respect to particular classifications and/or categories and/or comment groups, the "Sentiment" classification 1605*c* in the illustrated embodiment further illustrates that sentiment information may similarly be analyzed and provided with respect to all distributed group discussions that are occurring, such as if the current overall sentiment is significantly more positive than negative. The "Sentiment" classification 1605*c* further illustrates that some classifications may include a defined enumerated number of possible categories (e.g., "Positive" and "Negative," or "Positive" and "Negative" and "Neutral"), while others may include categories that vary over time (e.g., based on distributed group discussions that occur).

In the example of FIG. 2L, the displayed information may use various visual aspects to convey corresponding information to the user, such as by using relative size of different classifications and/or categories to illustrate information about a selected factor of interest for those classifications and/or categories (e.g., a current real-time quantity of constituent content items). Thus, in this example, if such a size-based aspect is used, it can be easily determined that the overall current distributed group conversations within the "Fun" classification have a higher total quantity (or volume) than distributed group conversations in the "Politics" classification, based on the size of the "Fun" classification being larger than the size of the "Politics" classification. Similarly, it can be easily determined that the "Cars" category within the "Fun" classification currently has a larger quantity of constituent content item than that of the "College" category within the same classification based on their relative sizes. In a similar manner, other visual aspects that are displayed may be used to provide other types of information for classifications and/or categories, such as based on relative location within the overall display, movement in one or more directions, color, shape, etc., as discussed in greater detail with respect to FIG. 2P and elsewhere. Furthermore, in some embodiments, the display may be personalized to the current user and/or configurable by the current user in various manners, including to display information about classifications and/or categories that are of interest to the current user (e.g., based on prior explicit indications of the user, inferred interests based on past user activities or other information about the user, etc.).

Figure 2M:
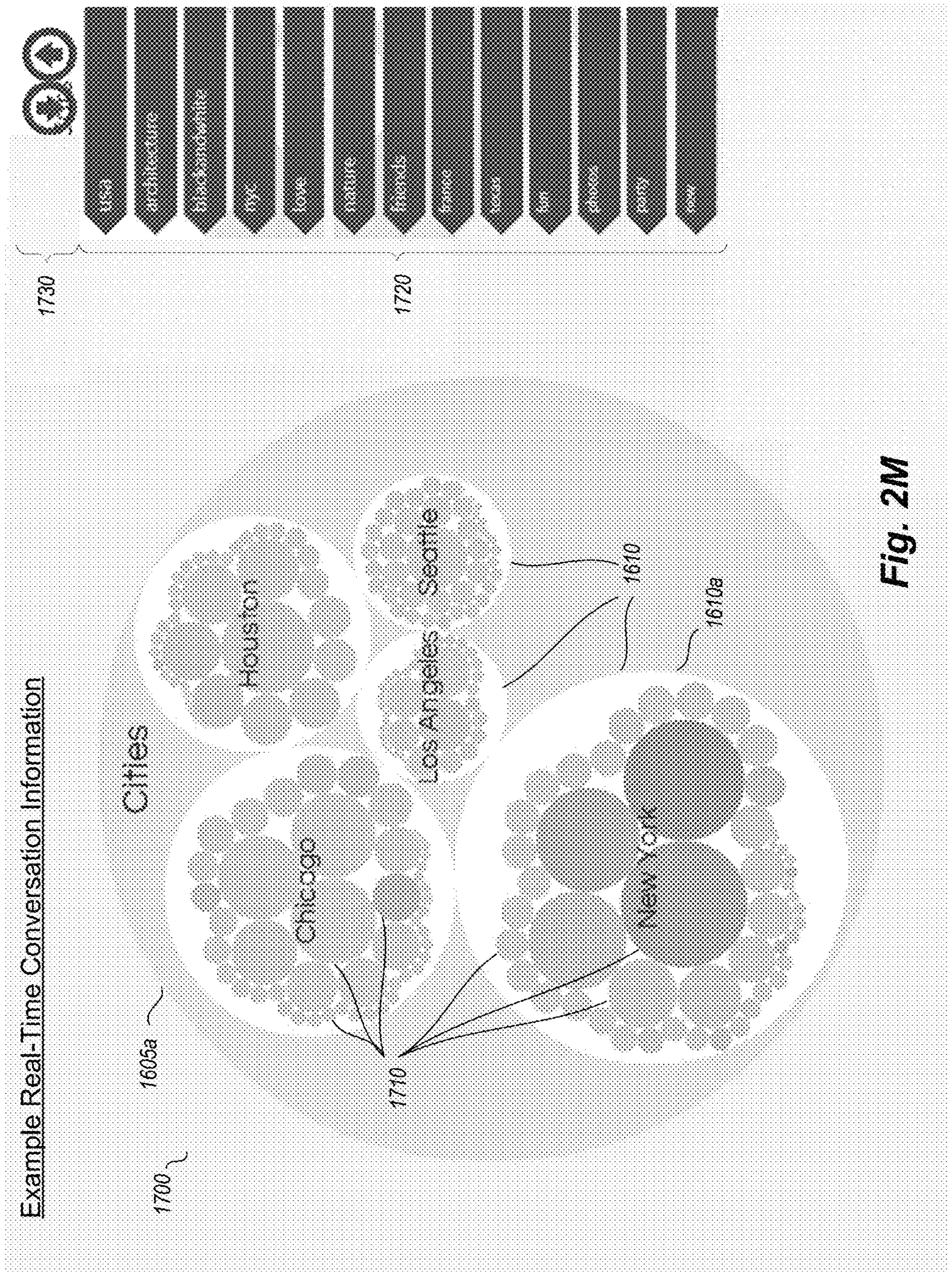

FIG. 2M continues the example of FIG. 2L, and in particular provides an example of an expanded view of a particular classification (in this example, the "Cities" classification 1605*a*, such as based on a user selection of that classification in the GUI 1600 of FIG. 2L, or instead based on another user manipulation of the GUI 1600 to zoom or expand a portion of the display). In particular, the example GUI 1700 of FIG. 2M is an expanded classification-level view that continues to include information about various categories 1610 within the classification 1605*a*, but additional information about various comment groups 1710 are now displayed within each of the categories. In a manner similar to that discussed with respect to FIG. 2L, various information within the GUI 1700 may be user-selectable, including particular categories 1610 and/or comment groups 1710, such as to enable the user to obtain additional information about the selected item. Furthermore, and in a manner similar to that illustrated with respect to FIG. 2L, the visual aspects of the different categories 1610 and/or comment groups 1710 that are displayed may be used to convey information to the user, such as with respect to relative size, location, colors, movement in one or more directions, etc., as discussed in greater detail with respect to FIG. 2P, and various other GUI controls may be displayed in some embodiments. In this example, color has been added with respect to some of the comment groups to display relative types of information between comment groups.

FIG. 2M further illustrates various example GUI controls 1720 and 1730 that may be displayed in at least some embodiments. In particular, in this example, the GUI controls 1720 include information about various topics or other attributes that are shared across multiple categories and/or classifications, with each such topic or other attribute being user-selectable in the current example. Thus, for example, if the user were to select the "Nature" control 1720, the display of information in the GUI 1700 may be updated to reflect one or more comment groups corresponding to the "Nature" topic across the current classification 1605*a* and categories 1610, such as by highlighting or otherwise emphasizing those comment groups while still displaying information about other comment groups, or instead by displaying information only about those comment groups and corresponding categories. Additional information for a selected shared topic or attribute may further be retrieved and displayed in some environments, such as to indicate changes in distributed group discussions involving the shared topic or other attribute, such as changes over time and/or between categories and/or between classifications. Furthermore, additional shared topics or other attributes may be available for display but not currently displayed, such as if the up and down arrow GUI controls 1730 may be used to scroll through other shared topics or attributes. For example, a subset of the shared topics or other attributes may be initially selected for display, such as based on ordering the shared topics or other attributes in one or more manners (e.g., to include topics or other attributes first that have a highest quantity or that are most relevant to the current categories and classifications displayed in the GUI, to include topics or other attributes that are of most interest to the current user, etc.). Additional information may also optionally be displayed for different shared topics/attributes, such as by using different font sizes and/or colors for different shared topic controls to illustrate relevant information.

Figure 2N:
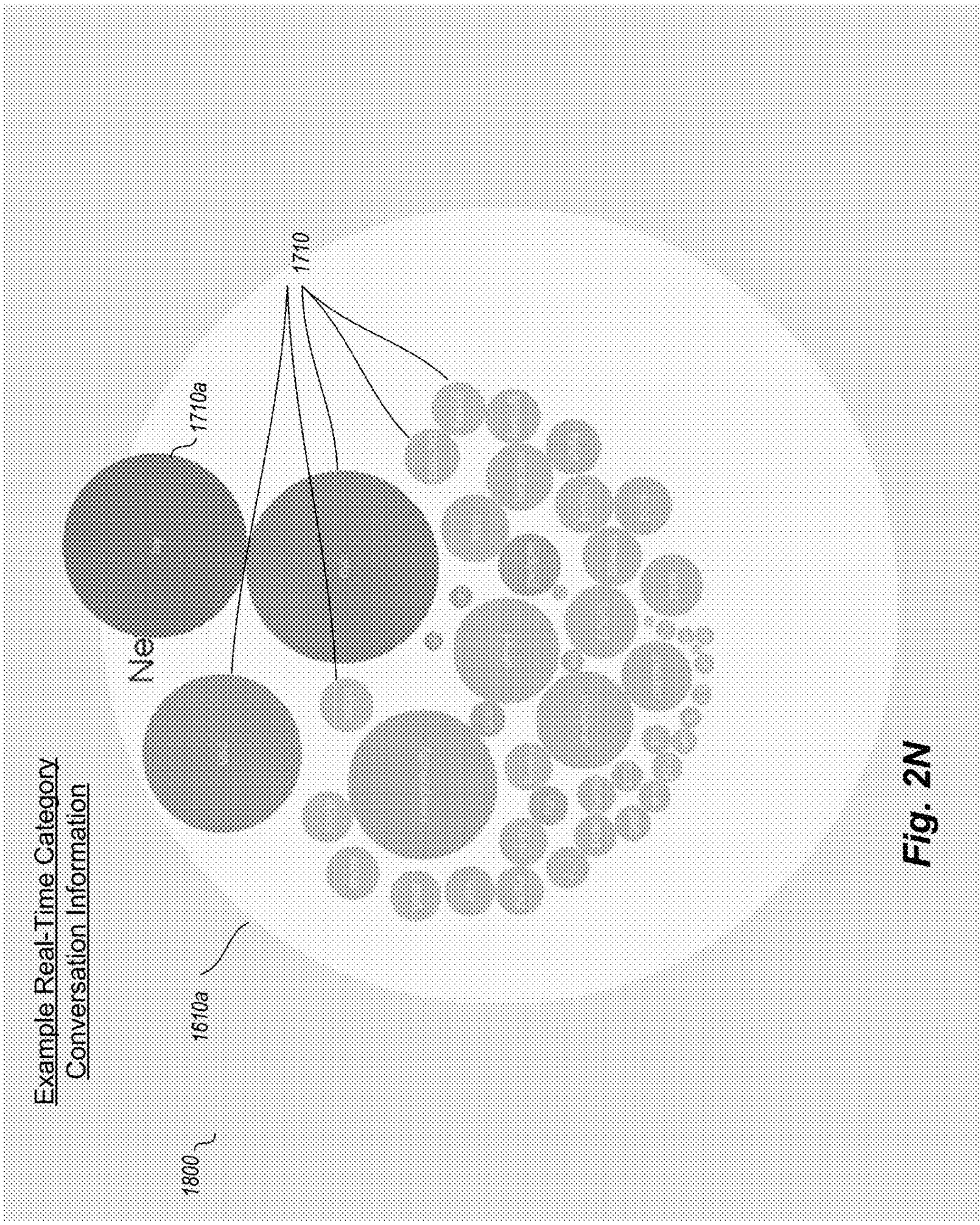

FIG. 2N continues the examples of FIGS. 2L-2M, and in particular illustrates a GUI 1800 that includes additional information about a particular category of interest (in this example, the "New York" category 1610*a*, such as based on selection of category 1610*a* in the GUI 1700 of FIG. 2M). In this example, a category-level view is displayed that illustrates additional information with respect to the comment groups 1710 within the category 1610*a* (relative to that displayed in FIG. 2M), including to indicate a name or other identifier for each of the displayed comment groups, and to further add additional color information. In a manner similar to that discussed with respect to FIGS. 2L and 2M, various information within the GUI may be user-selectable, including particular comment groups, and various other GUI controls may be displayed in some embodiments. Additional details are included elsewhere related to particular visual aspects of the display and corresponding information that may be conveyed to a user, including with respect to FIG. 2P.

FIG. 2C (shown as "2-O" to differentiate from the number "20") continues the examples of FIGS. 2L-2N, and in particular illustrates a GUI 1900 that displays a comment group-level view that includes additional information about a particular selected comment group (in this example, the "ny" comment group 1710*a*, such as based on selection of the comment group 1710*a* circle in the GUI 1800 of FIG. 2N). In this example, the comment group 1710*a* is displayed with additional information inside, such as a chart 1915 that shows information about one or more selected factors of interest over time (e.g., a quality of constituent content items over time, including in this example to include information from the last 72 hours up until the current time based on actual data, and to also include predicted future quantity information over a future 72-hour period). The display for the current example comment group 1710*a* further includes a graphical chart 1910 to provide additional information about the comment group, such as with respect to the same selected factor of interest as shown in the chart 1915 (e.g., an indication of change in sentiment over the past 72 hours based on actual data), or instead for a different selected factor.

As discussed in greater detail elsewhere, various of the types of information that are displayed may be personalized to the user and/or configurable to the user in various manners. In addition, in this example, various additional types of information and user-selectable controls 1902, 1920, 1925, and 1930 are displayed, such as to allow the user to obtain additional information of one or more types corresponding to the current comment group. For example, if the user selects control 1902, additional details about particular constituent content items of one or all types (e.g., photos) may be displayed in an updated GUI. Similarly, areas 1920, 1925, and 1930 may include information of various types to the user (although particular details are not currently shown in areas 1920 and 1925), such as details about some or all of the constituent content items, about particular author users (e.g., users who have high or low influence), about particular data sources from which the constituent content items are provided, about particular geographical areas with which the constituent content items are associated, etc. —in at least some embodiments, selection of one or more such user-selectable controls and information areas will provide expanded information to the user of that type. The GUI 1900 in this example further includes an additional user-selectable control 1904 to allow the user to modify the current display, such as to return to a previous page (e.g., the page of information displayed in the GUI 1800 of FIG. 2N), and similar maneuverability or other modification controls may be provided in other manners in other of the example GUI screens and in other embodiments.

Figure 2P:
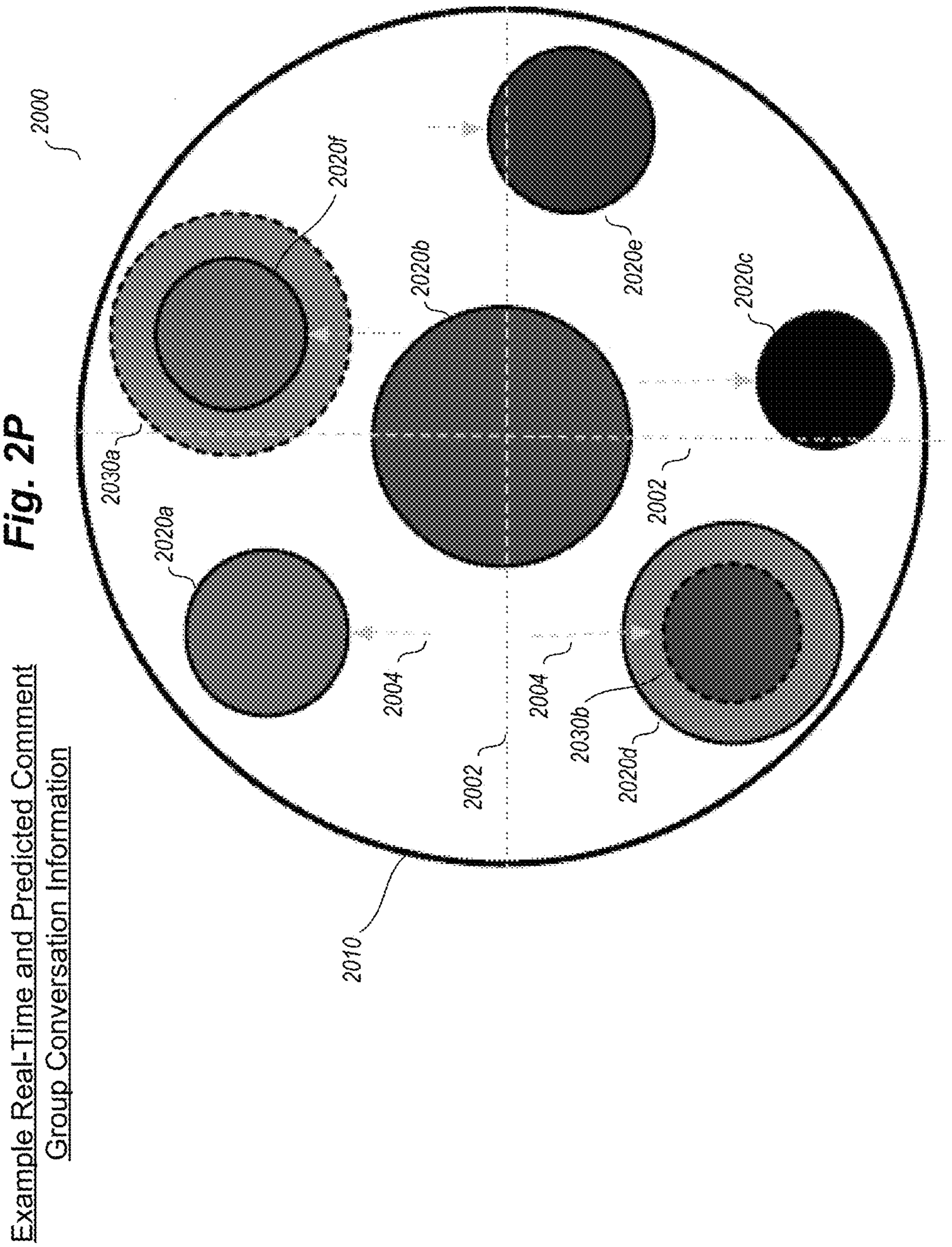

FIG. 2P continues the examples of FIGS. 2L-2O, and in particular illustrates an example GUI 2000 corresponding to an example item 2010 and several sub-items 2020 that are represented in an abstract manner, with various types of visual aspects that may be conveyed to a user using different types of information being illustrated. For example, item 2010 may correspond to a particular category 1610 (such as in a manner similar to FIG. 2N, with the sub-items corresponding to particular comment groups 1710), may correspond to a particular classification 1605 (such as in a manner similar to FIG. 2M, with the sub-items corresponding to particular categories 1610 and/or comment groups 1710), may correspond to a particular group of multiple classifications 1605 (such as in a manner similar to FIG. 2L, with the sub-items corresponding to particular classifications 1605 and/or categories 1610 and/or comment groups 1710), etc. For the purpose of illustration, item 2010 will be discussed in greater detail with respect to FIG. 2P as if it corresponds to a particular category, with sub-items within the larger overall item 2010 being discussed as if they represent particular comment groups within that category, in a manner similar to that of FIG. 2N. While the overall item 2010 is displayed as a circle in this example, it will further be appreciated that similar information may be displayed in other shapes and manners in other embodiments.

As one example of a visual aspect that may be conveyed in a display similar to that of FIG. 2P, the relative size of the overall item 2010 and/or the sub-items 2020 may provide information about current absolute or relative values with respect to a selected factor of interest, with the quantity of constituent content items being one example of such a selected factor. Thus, a visual inspection easily identifies that sub-item 2020*b* has a larger absolute or relative value for the selected factor of interest than does, for example, sub-items 2020*e* or 2020*c*. While not illustrated here, a legend or key could be further illustrated to identify the selected factor of interest that is currently associated with the size aspect, including to optionally provide a scale with respect to corresponding values for different sizes, and such information may further optionally be configurable in various manners in some embodiments.

Figure 2Q:
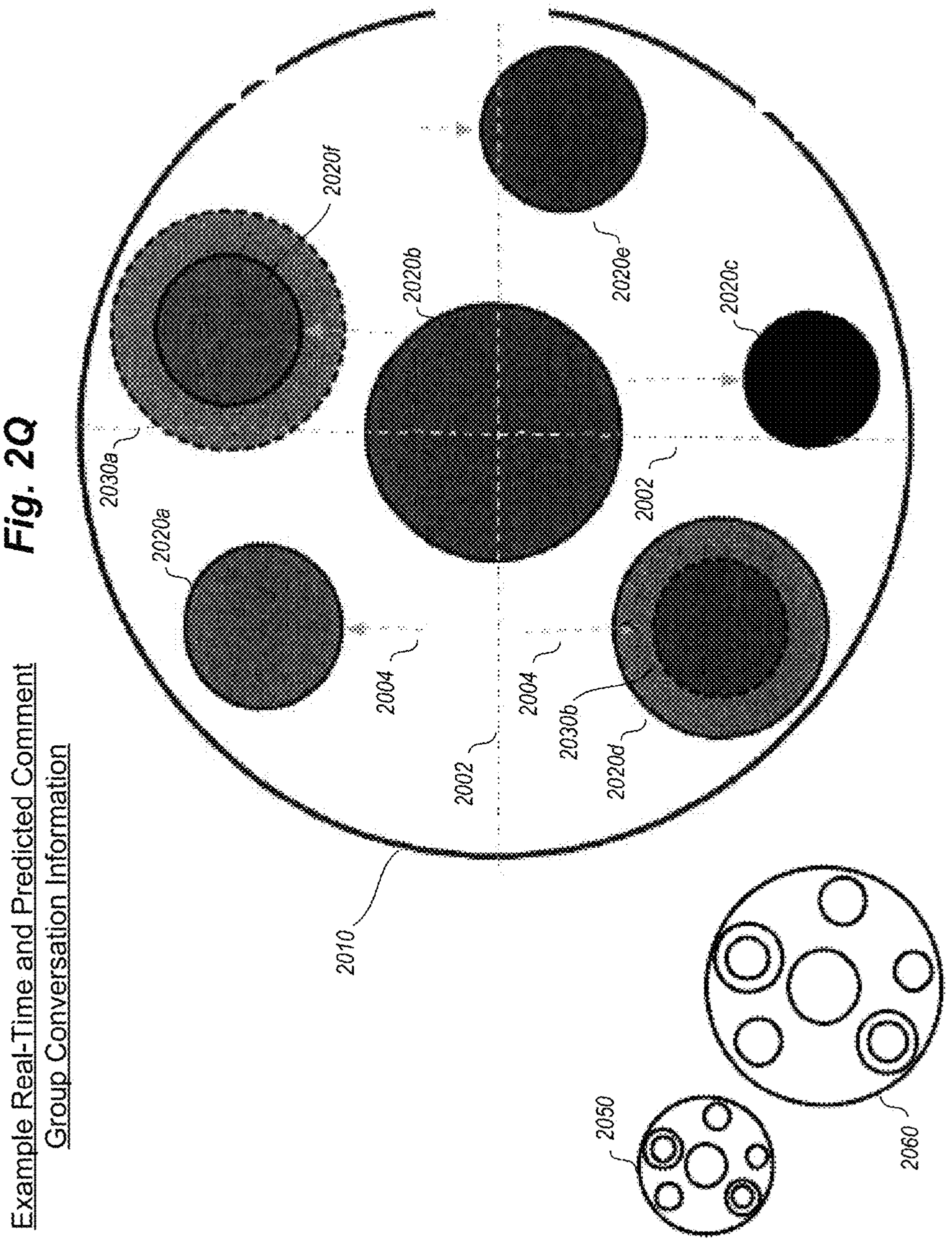

FIG. 2Q illustrates an additional example of multiple different relative sizes of an overall item, with alternative overall item 2060 (shown at a reduced scale relative to overall item 2010) illustrating how a particular example overall item with a larger value for the size-related selected factor of interest may be displayed, in contrast to alternative item 2050 (also shown at the reduced scale) in which the item and its sub-items have smaller absolute or relative values for the selected factor of interest. It will be appreciated that alternative items 2050 and 2060 of FIG. 2Q are displayed in a consistent scale with respect to each other in this example, but at a different scale than item 2010 shown in FIG. 2Q.

Returning to FIG. 2P, and in addition to the sizes of the overall item 2010 and/or the sub-items 2020, the locations of the sub-items 2020 may further provide additional information about one or more selected factors of interest, such as to differ from the selected factor represented by the size aspect. For example, in the example GUI 2000 of FIG. 2P, distinct selected factors are associated with each of the X and Y axes, which both differ from the quantity-related factor associated with the size visual aspect—the X and Y axes are represented by axes lines 2002 in this example, although such axes lines may not be illustrated in at least some embodiments. As one example, the X axis may be currently associated with a selected factor that corresponds to a degree of sentiment, with the horizontal center of the overall item 2010 representing a neutral sentiment in this example, such that a sub-item 2020 that is farther to the right has a larger positive sentiment value, while a sub-item 2020 that is farther to the left has a larger negative sentiment value (or alternatively a smaller positive sentiment value in other embodiments in which sentiment is measured only on a scale of more or less positive sentiment). Thus, for example, a visual inspection can readily identify that the sub-item 2020*e* has a greater positive sentiment than does, for example, sub-items 2020*d* or 2020*a*.

In addition, in this example, the Y axis is associated with a selected factor that corresponds to a rate of change (e.g., a percentage increase or decrease) in the quantity of constituent content items with respect to a prior time period, with the vertical center of the overall item 2010 representing a constant rate of change in quantity in this example—in other embodiments, the Y axis may instead correspond to an absolute amount of change in quantity of constituent content items with respect to a prior time period. In this example, a sub-item 2020 that is higher in the display than the x-axis has a progressively higher positive rate of change in quantity, while a sub-item 2020 that is lower in the display than the x-axis has a progressively higher rate of a negative change in quantity (i.e., a reduction in rate of change in quantity). Thus, a visual inspection can readily determine that sub-item 2020*f* has a higher growth rate in quantity of constituent content items than does, for example, sub-item 2020*b* (which has a zero rate of quantity change, or a constant quantity), and with sub-item 2020*b* having a higher growth rate in quantity than the negative growth rates for sub-items 2020*c* and 2020*d*.

In addition to the displayed vertical location, different colors are also mapped to different vertical locations in this example to emphasize different rates (or alternatively, amounts) of quantity change. In particular, the blue color of sub-item 2020*b* represents a mostly constant quantity (or zero rate, or amount, of quantity change) for the constituent content items, the purple color of sub-item 2020*f* represents a relatively high value for the rate (or amount) of quantity change (and with varying degrees of color between blue and purple indicating increasing positive values), and with the black of sub-item 2020*c* indicating a relatively large negative value for the rate (or amount) of quantity change (with corresponding degrees of darker blue and gray between the blue of sub-item 2020*b* and the black of sub-item 2020*c* indicating increasing negative values). By using both color and vertical location to illustrate a single selected factor in this example, corresponding information can be easily determined by a user in multiple visual manners, although in other embodiments color and vertical location may represent different types of information for different selected factors.

As with the size-related visual aspect, the visual aspects corresponding to vertical location, horizontal location and/or color may in some embodiments have associated legends, keys, and/or scales that are displayed to the user, and one or more of the vertical location, horizontal location and color visual aspects may be further configurable by the user in various manners in various embodiments (e.g., to allow the user to specify a different selected factor with respect to one or more of the visual aspects, etc., to change a scale with respect to a particular selected factor, etc.).

In addition to size, vertical location, horizontal location, and color, the example GUI 2000 could further use movement in the vertical and/or horizontal directions that is represented within a single time period (e.g., via animation) to represent further selected factors of interest in at least some embodiments, although such movement-based visual aspects within a single time period are not used in this example GUI (although changes in location for different time periods do reflect changes in corresponding information over those time periods). For example, a horizontal movement visual aspect within a single time period could be used to illustrate a rate of change in sentiment or other selected factor assigned to the X axis (e.g., for actual information over one or more prior time periods to the current time period, for predicted information from the current time period through one or more future time periods, etc.), or instead could be used to illustrate information for a selected factor other than the one assigned to the X axis. As an alternative to animation, visual arrow indicators 2004 could be displayed to reflect information about vertical movement, such as with the length of the arrow indicating an amount of movement. Similar types of horizontal movement visual aspect may also be displayed, whether in addition to or instead of the vertical movement information.

In addition to size, horizontal location, vertical location, and color, the illustrated example GUI 2000 further includes information not only about the current real-time information for one or more time periods of interest, but also predicted future information for one or more future time periods of interest. In particular, in this example, some of the sub-items 2020 have an associated halo 2030 (or alternatively, a shadow that does not fully encompass the sub-item) that corresponds to predicted future information for that sub-item, with the size and/or color of the halo providing additional information about the corresponding predicted future information. For example, with respect to sub-item 2020*f*, if the size of the sub-item corresponds to the quantity of constituent content items for that sub-item, then the size of the prediction halo 2030*a* for the sub-item may indicate that the quantity of constituent content items for that sub-item is predicted to increase over the one or more future time periods of interest, with the size of the prediction halo 2030*a* indicating the predicted quantity. As can be visually determined, the predicted future quantity for the sub-item 2020*f* is thus roughly the same amount as the current quantity for sub-item 2020*b*, as both are a similar size. In a similar manner, the prediction halo 2030*b* for sub-item 2020*d* indicates that the predicted quantity of constituent content items for the sub-item 2020*d* is expected to decrease over the one or more future time periods of interest, with the size of the prediction halo 2030*b* indicating that predicted smaller future quantity. The colors of the prediction halos may also convey various types of information, such as to be selected to be different from the color of the corresponding sub-items (e.g., to enable easy identification of the prediction halo, such as to use the color orange of the prediction halo 2030*a* for all prediction halos, or for prediction halos whose predicted future quantity is larger than the current actual quantity of the corresponding sub-item), or to further use different colors for a given prediction halo to display additional information about the predicted future quantities (e.g., to use different colors for a prediction halo to indicate a predicted future rate of change). As with other aspects discussed, additional legend, key, and scale information may be displayed corresponding to the prediction halos, and some or all of the aspects of the prediction halo display may be configurable by the user in at least some embodiments.

Thus, given a variety of different visual aspects, a visual inspection of the example GUI 2000 of FIG. 2P illustrates a variety of information about the different sub-items. For example, if sub-item 2020*b* corresponds to a first comment group of interest for a category represented by overall item 2010, the visual information about that first comment group 2020*b* quickly identifies various information, as follows: the large size of the first comment group 2020*b* indicates a relatively large quantity of constituent content items; the absence of a prediction halo indicates that a change in quantity is not predicted for the one or more future time periods of interest; the centered horizontal location indicates that a neutral sentiment currently exists for the first comment group; and the centered vertical location as well as color indicates that the rate of change in quantity since one or more prior time periods of interest is near zero, with the quantity remaining essentially constant. Conversely, the visual information about a second comment group corresponding to sub-item 2020*a* identifies various information, as follows: the second comment group 2020*a* has a lower current quantity of constituent content items compared to the first comment group due to its smaller size; the lack of a prediction halo indicates that the quantity of constituent content items for the second comment group is not predicted to change over the one or more future time periods of interest; the horizontal position on the left side of overall category item 2010 indicates that the current sentiment for the second comment group is relatively negative; and the vertical location above the x-axis as well as the color indicate that the rate of change in quantity for the second comment group is a relatively high positive value (and is higher than that of the first comment group). As another example, the visual information about a third comment group corresponding to sub-item 2020*c* identifies various information, as follows: the third comment group 2020*c* has a smaller current quantity of constituent content items than do the first and second comment groups, based on its smaller size; the lack of a prediction halo indicates that the quantity of constituent content items for the third comment group is not predicted to change in quantity over the one or more future time periods of interest; the horizontal position that is slightly to the right side of center of the overall category item 2010 indicates that the current sentiment for the third comment group is slightly positive; and the vertical location below the x-axis as well as the color indicate that the rate of change in quantity for the third comment group is a relatively large negative value (and is lower than that of the first comment group). Similar information can be easily determined visually for the other example sub-items 2020*d*, 2020*e*, and 2020*f*.

While various example visual aspects and corresponding selected factors and information are illustrated with respect to FIG. 2P, it will be appreciated that a variety of types of modifications can be made to these aspects, that various additional visual aspects may be used, and that one or more of the existing visual aspects may not be used in other embodiments. As one example, and as previously noted, selected factors that are used for particular visual aspects may be user configurable in at least some embodiments.

In addition, in some embodiments, different shapes may be used rather than circles to convey additional types of information for a corresponding sub-item based on the corresponding shape. As one example, the shapes used may not be symmetrical in both the X and Y axes, such as to use the different X and Y vales to convey additional information. For example, a circle may be replaced with an oval, such as an oval that is longer along the X axis than the Y axis, or that is instead longer along the Y axis than the X axis. If so, the length along the X axis could illustrate additional information about the selected factor for the X axis (e.g., a rate of change in sentiment), while the position along the X axis continues to indicate a current sentiment value, and while the distance along the Y axis could continue to be used to indicate a quantity size for constituent content items. In a similar manner, other types of shapes could be used that differ in the X and Y dimensions, such as diamonds, triangles, etc. Furthermore, a different shape that is not symmetrical could be used to optionally illustrate information over time. For example, a teardrop shape could be used to represent changes over time of a particular factor of interest. Consider, for example, a teardrop shape whose central axis runs left to right, such that the shape at the left end (whether the teardrop point or the teardrop bulb) corresponds to a past period of time and the shape at the right end of the teardrop corresponds to a current or future time, such that the length of the teardrop along the x-axis represents a length of time, and with the width of the teardrop in the y-axis direction at a given point indicating a value in sentiment or some other selected factor at a corresponding time—in this manner, the overall teardrop shape may be used to indicate changes in the sentiment value over the length of time corresponding to the teardrop length. It will be appreciated that other types of shapes can similarly be used in other manners and other embodiments.

Figure 2R:
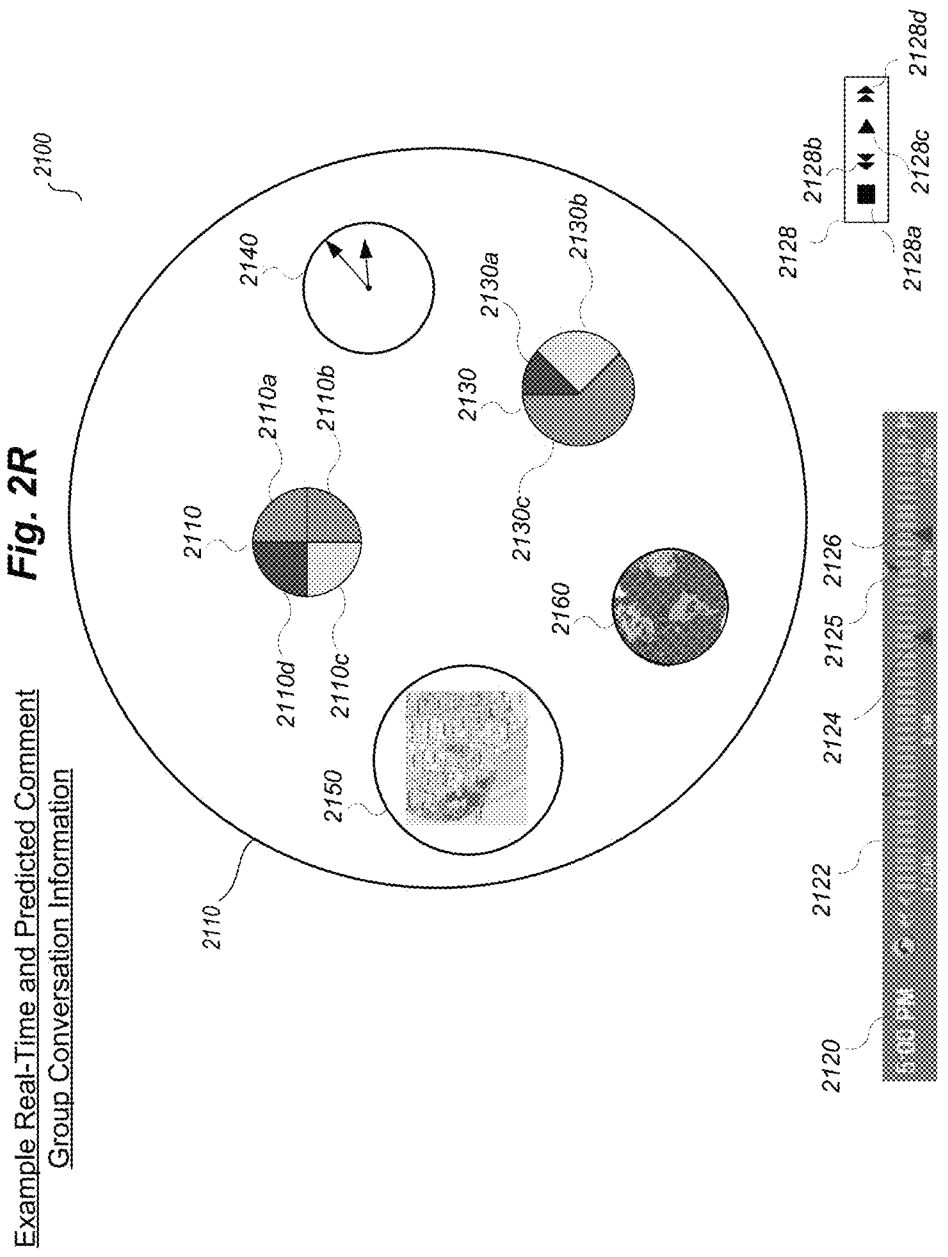

In addition to shapes of individual sub-items, the information that is displayed within particular sub-items may further provide an additional visual aspect that conveys additional information, with the examples of FIG. 2R illustrating examples of such additional information. In particular, FIG. 2R continues the examples of FIG. 2L-2Q, and illustrates a GUI 2100 with an overall item 2110 similar to item 2010 of FIG. 2P, but with particular sub-items 2110, 2130, 2140, 2150 and 2160 being modified to include additional types of information.

As one example, sub-item 2130 illustrates displaying pie chart information within the sub-item to illustrate additional information about different subsets of the constituent content items for the sub-item. Thus, for example, the pie chart could correspond to an additional selected factor, with the different pie slices 2130*a*-2130*c* indicating the relative size of different subsets of the constituent content items corresponding to different values for that selected factor (e.g., with different pie slices representing different geographical locations associated with the constituent content items, different author users associated with the different constituent content items, different data sources associated with the different constituent content items, etc.). As with other visual aspects discussed, additional legend, key, and/or scale information could further be illustrated for such a visual aspect.

Sub-item 2110 illustrates an alternative type of information that could be displayed within the sub-item, and in particular illustrates timing-related information to show information for the constituent content items over time. As one example, the upper right quadrant 2110*a* could represent information about a current time for a selected factor, while the additional slices 2110*b*-2110*d* could illustrate the same type of information but for successive predicted future periods of time, or instead the different quadrants (or other divisions of the circle) could correspond to other combinations of two or more past and/or future time periods. Accordingly, each quadrant or other slice could indicate a particular value for a corresponding selected factor for a corresponding time period, such as to indicate an identifier of a highest data source or highest geographical location or highest author user during that time period, to indicate an actual or predicted rate of change for the corresponding time period, etc.

Sub-item 2140 illustrates yet another alternative type of information that could be displayed within a sub-item, and in particular illustrates a different type of timing-related information to show information for the constituent content items at a particular indicated time. For example, the illustrated information may be used to represent a clock and to indicate a particular time that a corresponding value of interest has occurred or is predicted to occur for a selected factor, such as a time at which a maximum or minimum value occurs for the selected factor, a time at which a change is expected to occur between two indicated values, etc. It will be appreciated that a variety of other types of information could similarly be displayed within a sub-item, including bar charts, line charts, textual information, etc.

Sub-items 2150 and 2160 illustrate other alternative types of information that could be displayed within a sub-item, and in particular illustrate two types of map-related information that may be used to show information for the constituent content items at a particular indicated time. For example, location-related information may be displayed within the sub-item corresponding to the constituent content items for the sub-item, such as to use coloring, shading, location indicators, etc. within the map to indicate different geographical locations that correspond to the constituent content items (e.g., to show relative quantities of constituent items in different geographical locations, or to instead show other types of location-related information).

FIG. 2R further illustrates additional example user-manipulatable time-related controls 2120-2128 that a user may be provided with in at least some embodiments, such as to control the display of information over multiple periods of time using one or more visual aspects. In this example, the time-related controls include an indicator 2120 of a current time to which the current displayed information corresponds, as well as a time slider control 2122 that illustrates a range of times. In this example, time period indicator control 2124 may be manipulated by a user to select an earliest time for which the user wishes to view actual and/or predicted information as part of an animation, and time period indicator control 2126 may be manipulated by the user to select a latest time of interest for which the user wishes to view such information as part of the animation. Additionally, the time indicator control 2125 visually indicates the currently selected time within the time slider control, which may be inside or outside the time span set by the controls 2124 and 2126. The illustrated time-related controls further include time sequence manipulation playback controls 2128, which in this example include four user-selectable controls to allow manipulation of the display of corresponding information over a sequence of multiple selected time periods. In this example, those controls include a “Play” control 2128*c*, a “Fast-Forward” control 2128*d*, a “Rewind” control 2128*b*, and a “Stop” control 2128*a*. Various other related controls may be provided in some embodiments, such as a “Pause” control and/or controls to jump forward and/or backward by a predefined amount of time (e.g., 15 minutes, an hour, a day, a particular number of time periods, etc.). In this example, the “Play” control 2128*c* allows a user to animate information for one or more sub-items between the time span indicated by the indicators 2124 and 2126. As the corresponding time progresses in the animation, the displayed GUI for the overall item and/or one or more sub-items may be updated to display information for the corresponding time. It will be appreciated that a variety of other types of time-related controls may be provided and used in other manners in other embodiments.

While the illustrated GUI 2000 of FIG. 2P and GUI 2100 of FIG. 2R are displayed along two dimensions, in other embodiments the display may be altered to have a single dimension (e.g., a slider or ruler along the X or Y axes), to have three dimensions (e.g., to add a depth, or Z, dimension to that illustrated in FIG. 2P), to use animation to reflect changing values at different times, to use animation to reflect changing values over different possible subsets of the constituent content items for a selected factor (e.g., different geographical locations associated with the constituent content items, different author users associated with the different constituent content items, different data sources associated with the different constituent content items, etc.), etc.

Figure 2S:
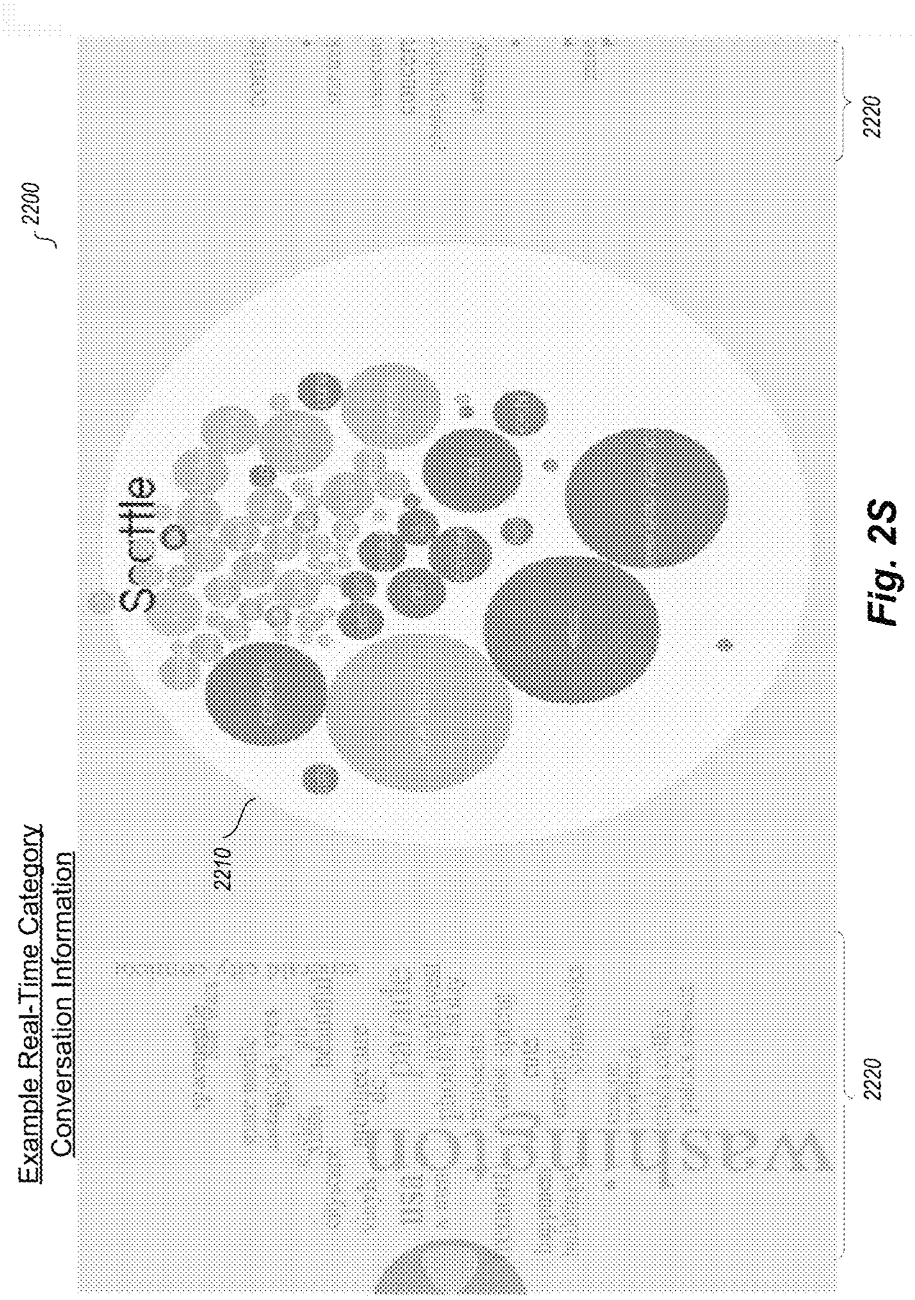

FIG. 2S continues the examples of FIGS. 2L-2R, and in particular illustrates an example GUI 2200 corresponding to a category-level view with an example category item 2210 that includes a number of sub-items corresponding to particular comment groups within the category, such as in a manner similar to that illustrated in FIG. 2N. The example GUI 2200 further includes various textual information 2220, such as on the right and/or left sides of the item 2210. In this example, the textual information identifies names of some or all of the comment groups within the category (e.g., all comment groups in the category, regardless of whether a corresponding sub-item is currently displayed; for comment groups having a displayed sub-item, which in some cases may be a subset of all comment groups for the category; etc.). Such textual information enables easier identification of comment groups with small sizes, and in embodiments in which the terms in the textual information are user-selectable, enable a user selection of a textual term to highlight or otherwise emphasize the corresponding comment group sub-item. It will be appreciated that such additional techniques may similarly be used with other information views, including classification-level views, comment group-level views, etc.

Figure 2T:
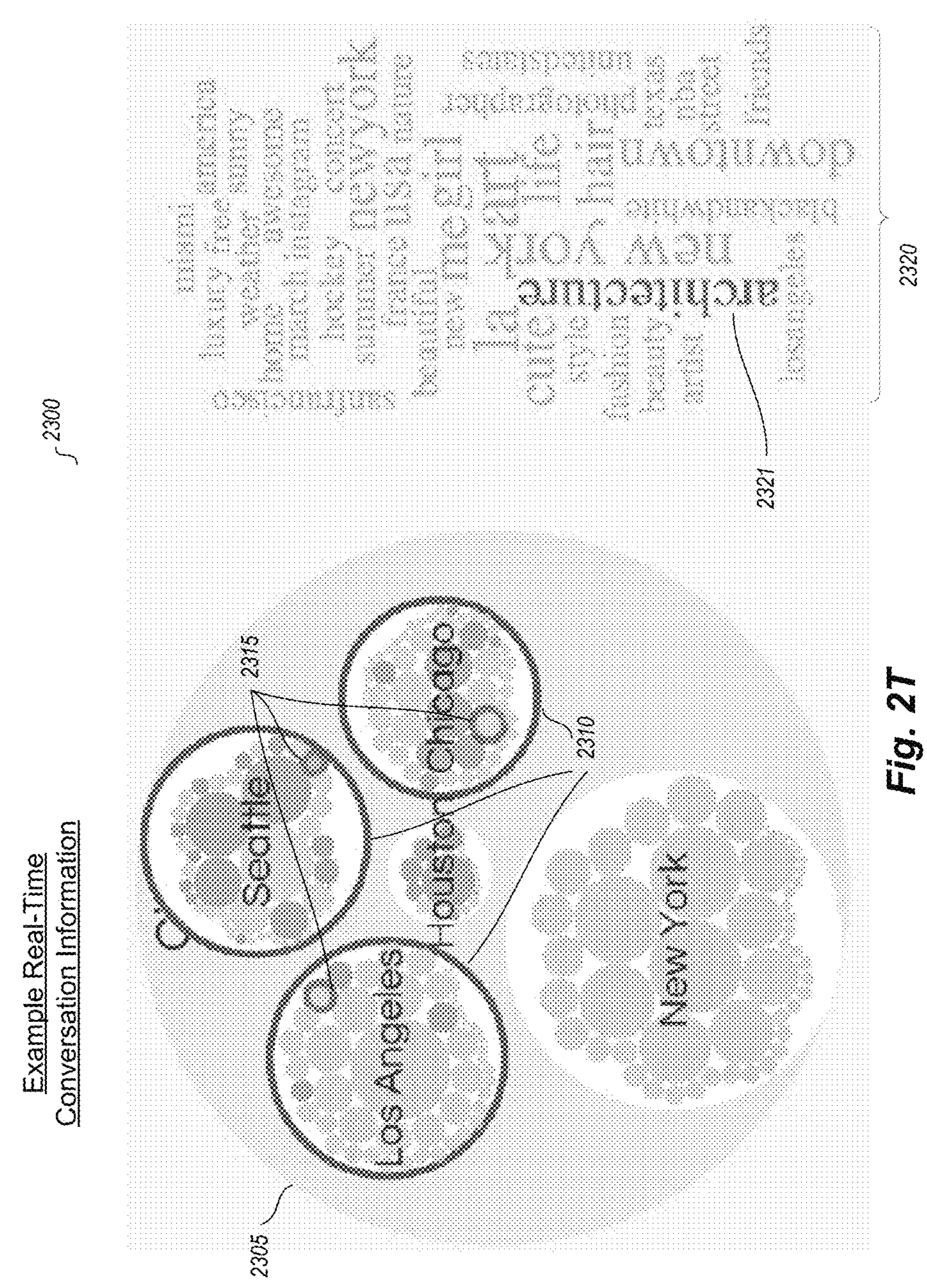

FIG. 2T continues the examples of FIGS. 2L-2S, and in particular illustrates an example GUI 2300 corresponding to a classification-level view with an example category item 2305 that includes a number of sub-items corresponding to particular categories within the classification, and with those category sub-items including further sub-items corresponding to particular comment groups within those categories, such as in a manner similar to that illustrated in FIG. 2M. The example GUI 2300 further includes various textual information 2320, which in this example represent shared topics or attribute information, in a manner similar to information controls 1720 of FIG. 2M. In this example, the terms in the textual information are user-selectable, such that a user selection of a textual term such as term 2321 causes it to highlighted or otherwise emphasized within the information 2320, and further causes sub-items for a particular comment group corresponding to the selected term (e.g., sub-items 2315) to be highlighted or other emphasized (in this example, to be shown with a bolded green enclosing circle), and similarly causes sub-items for particular categories (e.g., sub-items 2310) including that comment group to be similarly highlighted or otherwise emphasized. It will be appreciated that such additional techniques may similarly be used with other information views, including category-level views, comment group-level views, etc.

Figure 2U:
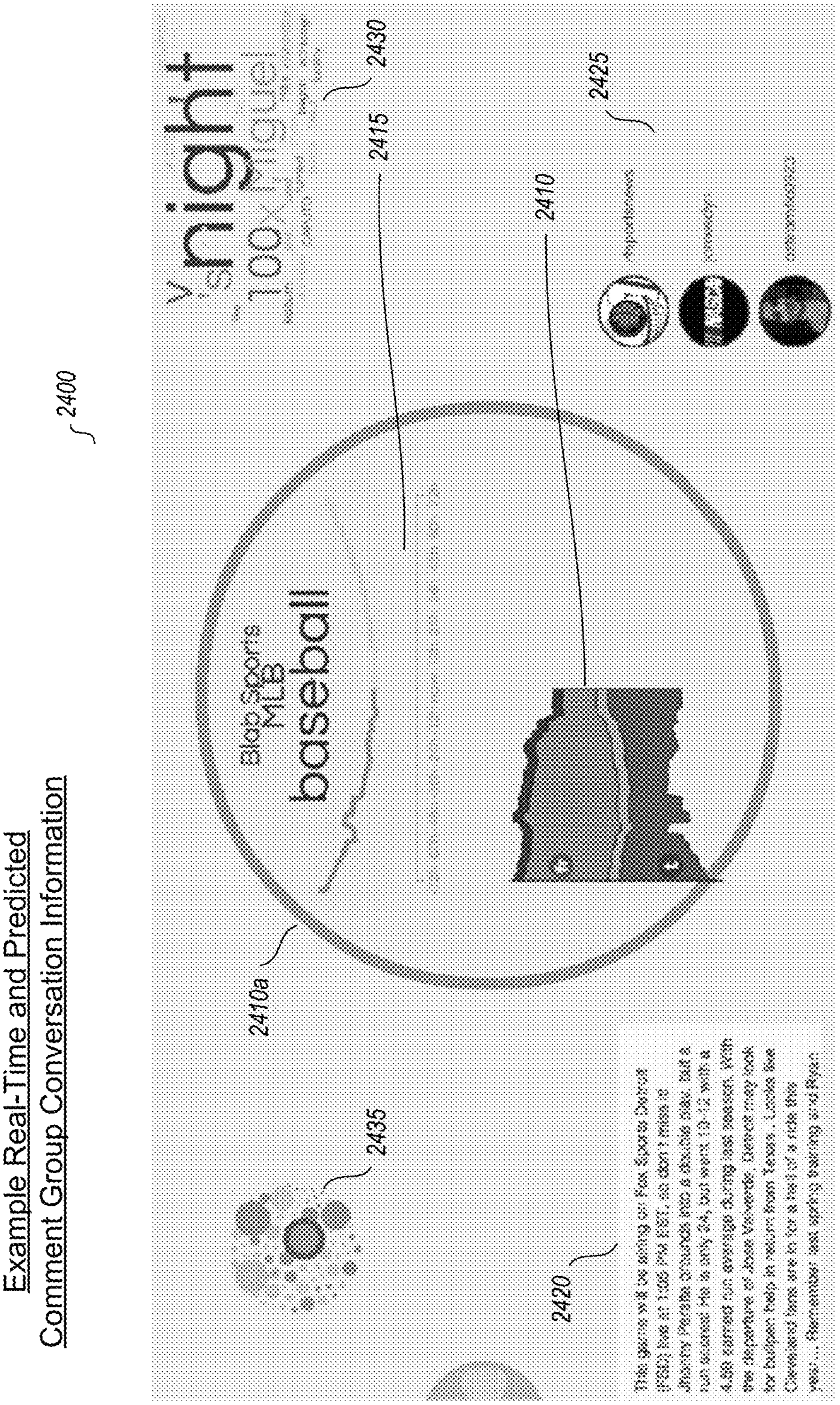

FIG. 2U continues the examples of FIGS. 2L-2T, and in particular illustrates an example GUI 2400 corresponding to a comment group-level view with an example comment group item 2410*a* that includes various information corresponding to particular constituent content items within the comment group, such as in a manner similar to that illustrated in FIG. 2-O. The displayed elements 2410*a*, 2415, 2410, 2420, 2425 and 2430 are similar to the displayed elements 1710*a*, 1915, 1910, 1920, 1925 and 1930 of FIG. 2-O, respectively. For example, article information 2420 illustrates the textual contents of a particular one of the constituent content items, influencer information 2425 identifies particular current high influencer users for the comment group, and terms information 2430 identifies particular frequently occurring terms within the constituent content items. In addition, the timeline chart 2415 similarly shows actual data (including real-time current data) and predicted future data for total quantity of constituent content items within the comment group during a time window, and the graphical chart 2410 illustrates the contributions from different data sources (e.g., Tumblr, Facebook, etc.) to the total quantity information for the actual data—while predicted data source contribution information is not shown for the predicted future data in this example within the chart 2410, in other embodiments such predicted information could further be added. The example GUI 2400 further includes additional information 2435 relative to FIG. 2-O, which in this example is an overall item corresponding to a category-level view for a category that includes the current comment group, with the current group being highlighted within the overall category item, and with the overall item shown at a reduced scale relative to overall item 2410*a*.

Figure 2V:
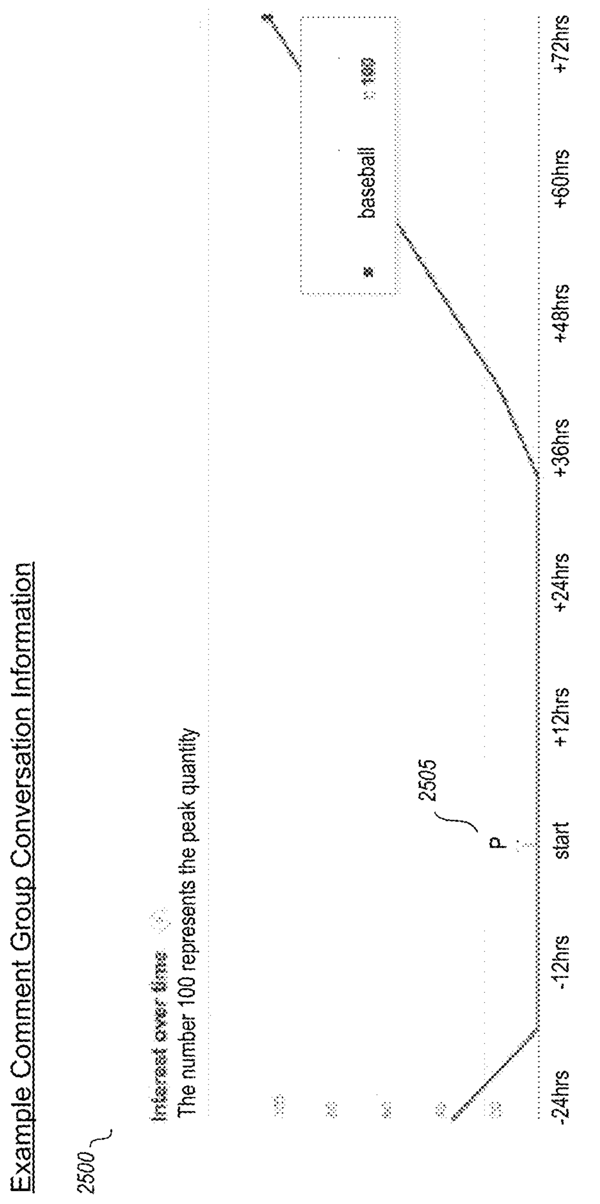

FIG. 2V continues the examples of FIGS. 2L-2U, and in particular illustrates an example GUI 2500 that shows actual total quantity information for constituent content items with a comment group over a time window, such as to enable a determination of how well a prediction at a particular time corresponds to the actual future information that occurs at future times. For example, as is shown in the timeline chart 2415 of FIG. 2U, the actual quantity information for a comment group over a prior time window may show decreasing quantity, such that a trend curve analysis would predict a continued decrease in quantity during future time periods (or at best, a low constant quantity over such future time periods). However, in the example of FIG. 2U, the use of a prediction template (not shown) enables a prediction of a future change in quantity in which the quantity is predicted to begin increasing in approximately 24 hours—such a prediction template may be based on a variety of types of data and selected factors other than merely quantity information (e.g., while the total quantity has been decreasing, a change is noted in which one or more particular data sources and/or one or more particular geographical locations and/or one or more particular author users are beginning to increase the quantity of their corresponding subset, and past data has shown that such a change typically results in increasing overall quantity within approximately 24 hours). The actual results data timeline chart 2500 of FIG. 2V is generated at least 72 hours after the current time of the timeline chart 2415 of FIG. 2U, with that current time being indicated as the prediction time 2505 in timeline chart 2500. As is illustrated, the actual results data for the following 72 hours after the prediction may illustrate that the predictions shown in FIG. 2U were correct in this case, with the actual quantity data being to increase substantially between 24 and 36 hours after the prediction. It will be appreciated that such actual results data may be used in various manners in various embodiments, including to be displayed to users, used for an automated comparison to previously made predictions, etc.

It will be appreciated that the details discussed with respect to the examples of FIGS. 2L-2V are provided for illustrative purposes, and that the described techniques may be used with a variety of other types of user-supplied information and may be performed in a variety of other ways.

FIG. 3 is a block diagram illustrating an embodiment of a server computing system 300 that is suitable for performing at least some of the described techniques, such as by executing an embodiment of a Group Discussion Prediction ("GDP") system 340 that provides a group discussion prediction service. The example server computing system 300 includes one or more hardware central processing unit ("CPU") processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.).

The user computing devices 350 are similarly illustrated as each having one or more CPU processors 351, one or more I/O components 352, memory 357, and storage 354, although particular I/O components and stored information is not illustrated. The other computing systems 360, 370 and 390 may similarly include some or all of the same types of components as the server computing system 300, but such components are not illustrated in this example for the sake of brevity. The server computing system 300, the GDP system 340 and the system 340 modules may also communicate with such other computing devices and systems in various manners, including via one or more networks 395 (e.g., the Internet, one or more cellular telephone networks, etc.).

In the illustrated embodiment, the GDP system 340 is executing in memory 330, and in this example includes several modules, including a Comment Group Creation Manager module 342, a Category Analysis Manager module 344, a Comment Prediction Manager module 346, a Prediction Template Generation Manager module 348, a Results Information Provider Manager module 347, and optionally one or more other modules 349. The system 340 and/or the system modules may in some embodiments include software instructions that, when executed, program or otherwise configure the processor(s) 305 and the server computing system(s) 300 to perform automated operations that implement at least some of the described techniques.

The GDP system 340 and its modules may obtain and use various information as part of its automated operations, such as to obtain user-supplied textual comments or other user-supplied content items from information 369 on one or more comment source computing systems 360 (e.g., computing systems that support one or more social networking sites or other available sites with user-supplied information) and/or from other computing systems (e.g., directly from computing devices 350 of users who supply the information, from other external computing systems 390, etc.), and may store such obtained information in a comment information database 321 on storage 320. The content items supplied to the computing systems 360 and/or 390 may originate from, for example, human users interacting with their user client computing devices 350, such as via a Web browser 358 executing in memory 357 of the client device, or via other software applications (not shown) executing on the client device.

In addition, the GDP system 340 may optionally obtain various types of client-related information from users or other entities that act as clients of the GDP system 340, such as by interacting with corresponding client computing systems 370 (e.g., via a corresponding optional module 349 that enables clients to register with the system 340 and/or to provide other types of client-specific information), and may store some or all such information in optional client information database 329 on storage 320. In at least some embodiments, some or all of the category definition information in database 328 may similarly be received from clients, such as to analyze information about a particular specified content category on behalf of a client who specifies a definition and/or other information about the content category. When such clients exist, the GDP system 340 may further provide various types of information to the clients (e.g., by sending the information to the client computing systems 370), and/or take various other types of automated actions on behalf of such clients, such as in accordance with specified client instructions or other specified criteria. While not illustrated here, in other embodiments some or all of the GDP system 340 may execute on behalf of a single client or a single entity (e.g., an organization with multiple employees or other members).

The Comment Group Creation Manager module 342 may perform automated operations to analyze various user-supplied textual comments or other user-supplied content items that have been supplied for one or more time periods (e.g., as may be stored in database 321 on storage 320 or in one or more other locations), such as to group content items based on common topics in their contents or based on other comment attributes that they share, and to optionally store corresponding comment topic information in database 322 on storage 320 and comment group information in database 323 on storage 320. In some embodiments, quantified comment group information that is stored in database 323 may including, for one or more of the comment groups, encoded summary information about constituent content items in the comment group for each of one or more time periods, such as with respect to one or more encodings specified in comment group encoding information 325 on storage 320.

The Category Analysis Manager module 344 may perform automated operations to determine topics or other attributes that are associated with a specified content category for one or more time periods, such as by identifying particular comment groups that are relevant for the specified content category for one or more time periods based on user-supplied comments or other content items included in those comment groups. In doing so, the module 344 may use information stored in comment information database 321, comment group database 323, comment topic database 322, and category definition database 328 stored on storage 320, and may store corresponding determined category information in category information database 324 stored on storage 320. In some embodiments, quantified category information that is stored in database 324 may including, for one or more of the categories, encoded summary information about constituent content items in the category (e.g., for all content items in the category, for content items in an intersection of the category and a particular constituent comment group, etc.) for each of one or more time periods, such as with respect to one or more encodings specified in comment group encoding information 325 on storage 320.

The Comment Prediction Manager module 346 may perform automated operations to quantify user-supplied comments or other content items that are associated with particular comment groups and categories, and to use such quantified information for a category or comment group to predict information about additional user-supplied comments or other content items that are expected to be supplied for the category and/or comment group. In some situations, the predictions are performed by generating prediction trends, and in other situations the predictions are performed using previously generated prediction templates. In doing so, the module 346 may use information stored in comment group database 323, category information database 324 and/or prediction template database 326 stored on storage 320, and may store quantified information about content items associated with particular comment groups and categories in comment group database 323 and/or category information database 324, and may store corresponding generated prediction information in comment group database 323 and category information database 324 (or instead in one or more other prediction information databases, not shown, in other embodiments). In some embodiments, the prediction template information may include encoded summary information for constituent content items that are part of a comment group and/or category for each of multiple time periods (e.g., consecutive time periods during a time window of interest), such as to be matched to encoded summary information from the comment group information in database 323 and/or the category information in database 324.

The Prediction Template Generation Manager module 348 may use quantified information about supplied comments or other content items associated with a category and/or with comment groups, and/or may use predicted information about additional user-supplied comments or other content items that are expected to be supplied for the category and/or comment groups, such as to identify or generate a histogram or other template of information that accurately reflects comments or other content items actually supplied for a category and/or comment groups, and that may be used as a template to predict information about additional user-supplied comments or other content items that are expected to be supplied for the category and/or comment groups. In doing so, the module 348 may use information stored in comments database 321, comment group database 323, and/or category information database 324, stored on storage 320, and may store corresponding new prediction templates in prediction template database 326.

The Results Information Provider Manager module 347 may retrieve analyzed information and/or predicted information for one or more categories and/or comment groups and/or classifications, such as to reflect constituent content items that are associated with those categories, comment groups and/or classifications for one or more time periods, and may then initiate the display of such information or otherwise provide such information to one or more entities. For example, such entities may include one or more of the following: a client (e.g., for display to a user representative of the client), such as via a Web browser or other application (e.g., a client-side app or module provided by the GDP system 340, such as one of the other modules 349), not shown, that is executing on a corresponding client computing system or device 370; other end-users of the GDP system, such as to publicly provide at least a subset of the analyzed information and/or predicted information to users via computing devices 350 and/or other computing systems 390; other affiliated or third-party systems (not shown), such as for further analysis or manipulation by those other systems and/or for those other systems to display or otherwise provide to the other systems' users at least a subset that is made available by the GDP system to the other systems of the analyzed information and/or predicted information; etc. In at least some such embodiments, the information display or other providing by the GDP system may occur in a real-time or near-real-time manner with respect to corresponding events or activities to which the information corresponds, such as the supplying of corresponding constituent content items (e.g., within seconds, minutes or hours of such events or activities). In addition, in at least some embodiments, the module 347 may display or otherwise provide information to an entity in a manner that is personalized to the entity (e.g., such as based on explicit or implicit preferences previously specified or determined for the entity), and may further optionally allow at least some such entities to configure various types of information to be displayed or otherwise provided, as discussed in greater detail elsewhere, including with respect to FIGS. 2L-2V. In performing its automated operations, the module 347 may, for example, use information stored in comments database 321, comment group database 323, category information database 324, and/or client information 329, and may store corresponding new information (e.g., client preference information) in client information 329.

It will be appreciated that the illustrated computing systems are merely illustrative and are not intended to limit the scope of the present invention. For example, computing system 300 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate intercommunication capabilities. For example, the illustrated system 340 and/or its modules may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

Thus, in at least some embodiments, the illustrated modules and/or systems are software-based modules/systems including software instructions that, when executed by the CPU(s) 305 or other processor means, program the processor(s) to automatically perform the described operations for that module/system. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
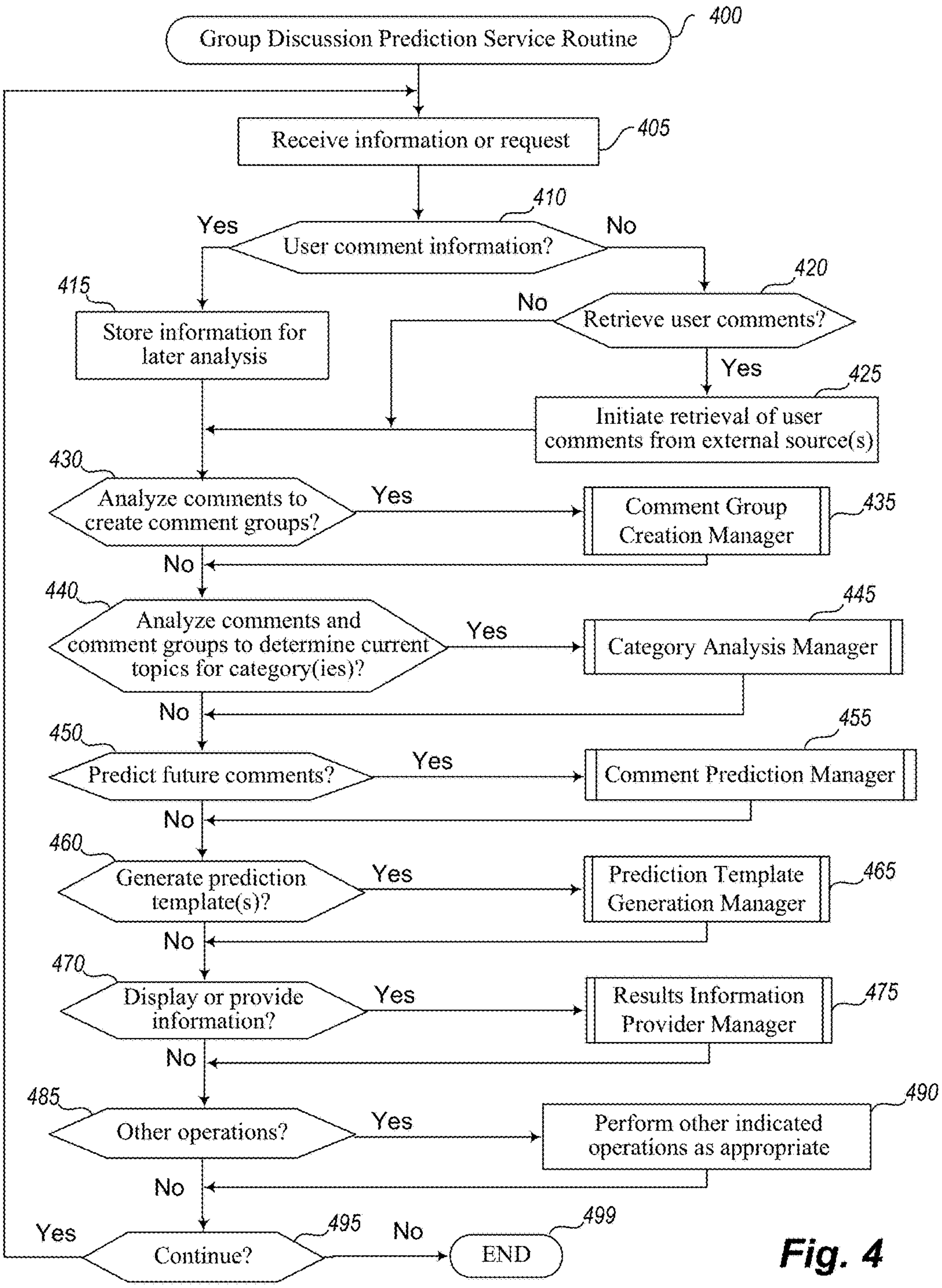
FIG. 4 is an example flow diagram of an illustrated embodiment of a Group Discussion Prediction Service routine.

FIG. 4 is an example flow diagram of an illustrated embodiment of a Group Discussion Prediction Service routine 400. The routine may be provided by, for example, execution of an embodiment of the Group Discussion Prediction Service 150 of FIG. 1, the group discussion prediction service discussed with respect to FIGS. 2A-2V and/or the Group Discussion Prediction ("GDP") system 340 of FIG. 3, such as to analyze distributed group discussions and to predict future characteristics of such discussions. While the illustrated embodiment of the routine may analyze particular aspects of distributed group discussions with respect to particular metrics, such as a quantity of user comments received with respect to a particular topic or category, it will be appreciated that other aspects and/or metrics may be used in other embodiments. In addition, while the illustrated embodiment of the routine discusses obtaining and analyzing user comments, it will be appreciated that other types of user-supplied content items may be obtained and analyzed in other embodiments, whether instead of or in addition to user comments.

The routine begins at block 405, where information or a request is received. The routine continues to block 410 to determine if information has been received about one or more user comments (or other user-supplied content items), such as for user comments that have recently or concurrently been supplied to one or more comment sources and sent to the routine 400 by the comment source(s) (e.g., in response to one or more previous requests from the routine 400, such as with respect to blocks 425 or 490). If so, the routine continues to block 415 to store some or all of the received information for later analysis. If it is instead determined in block 410 that the received information or request of block 405 is not user comment information, the routine continues instead to block 420 to determine to retrieve user comments (or other user-supplied content items) from one or more external comment sources, such as to do so on a periodic basis or when the information is needed for a corresponding analysis. If so, the routine continues to block 425 to initiate the retrieval of user comments (or other user-supplied content items) from one or more external comment sources, such as one or more social networking services or other publicly accessible sites at which users may supply information. In the illustrated embodiment, the retrieval of the user comments in block 425 is performed in an asynchronous manner, by initiating requests to those external comment sources and later receiving corresponding responses, although in other embodiments the routine may instead complete the retrieval of particular user comments from particular comment sources in block 425 before continuing.

After blocks 415 or 425, or if it is instead determined in block 420 that the information or request received in block 405 is not to retrieve user comments, the routine continues to block 430. In block 430, the routine determines whether the information or request received in block 405 is to analyze user comments (or other user-supplied content items) to create corresponding comment groups, such as for information just received with respect to block 415 (e.g., for a current time period), or instead for a prior time period of a specified length (e.g., 30 minutes). If so, the routine continues to block 435 to execute a Comment Group Creation Manager routine to perform the analysis and creation of the comment groups, with one example of such a routine being described in greater detail with respect to FIG. 5.

After block 435, or if it is instead determined in block 430 that the information or request received in block 405 is not to analyze comments, the routine continues to block 440 to determine whether the information or request received in block 405 is to analyze user comments (or other user-supplied content items) and comment groups to determine current topics for one or more categories and one or more time periods, optionally with respect to comment groups that were just created in block 435 and/or for user comments just received in block 415. If so, the routine continues to block 445 to execute a Category Analysis Manager routine to determine the current topics for the category(ies) for the one or more time periods, with one example of such a routine being described in greater detail with respect to FIG. 6.

After block 445, or if it is instead determined in block 440 that the information or request received in block 405 is not to determine current topics for one or more categories, the routine continues instead to block 450 to determine whether the information or request received in block 405 is to predict information about future user comments (or other user-supplied content items) that are expected to be received for one or more comment groups and/or categories, such as for one or more future time periods, and optionally based on comment groups that were just created in block 435 and/or for user comments just received in block 415 and/or for category information that was just determined in block 445. If so, the routine continues to block 455 to execute a Comment Prediction Manager routine to quantify one or more aspects of the user comments (or other user-supplied content items) for the comment groups and/or the category(ies), and to generate corresponding predictions based on such quantified information, with one example of such a routine being described in greater detail with respect to FIGS. 7A-7C.

After block 455, or if is instead determined in block 450 that the information or request received in block 405 is not to predict information about future user comments, the routine continues instead to block 460 to determine whether the information or request received in block 405 is to generate one or more prediction templates based on prior distributed group discussions and corresponding analyses. Such generation of one or more prediction templates may be performed, for example, with respect to information about actual user comments (or other user-supplied content items), comment groups and categories determined in blocks 435 and/or 445, and/or with respect to information about future comments (or other user-supplied content items) that are predicted in block 455. If so, the routine continues to block 465 to execute a Prediction Template Generation Manager routine to generate one or more such prediction templates, with one example of such a routine being described in greater detail with respect to FIGS. 8A and 8B.

After block 465, or if it is instead determined in block 460 that the information or request received in block 405 is not to generate prediction templates, the routine continues to block 470 to determine whether the information or request received in block 405 is to display or otherwise provide information to a user or other entity. Such a request or information may include, for example, a request from the user or other entity for the information, an automated determination that information is available to provide in response to a prior request (e.g., a request to push information to the user or other entity periodically or upon other indicated criteria being satisfied), an automated determination that a predetermined time has been reached or that other indicated criteria are currently satisfied (e.g., based on receipt or determination of current real-time or near-real-time data of one or more types, based on current prediction of future information of one or more types, etc.), etc. If so, the routine continues to block 475 to execute a Results Information Provider Manager routine to display or otherwise provide such information, with one example of such a routine being described in greater detail with respect to FIG. 9.

After block 475, or if it is instead determined in block 470 that the information or request received in block 405 is not to display or otherwise provide information, the routine continues instead to block 485 to determine whether a request corresponding to one or more other operations has been received. If so, the routine continues to block 490 to perform one or more other indicated operations as appropriate. Such other indicated operations may include, for example, one or more of the following non-exclusive list: receiving and storing definitions and other information about categories of interest; receiving and storing information about particular comment sources of interest (e.g., how to obtain comments or other user-supplied content items from them, timing for obtaining comments or other user-supplied content items from them, types of comments or other user-supplied content items available from them, etc.); receiving and storing information about clients of the service (e.g., categories of interest to the client, criteria under which to notify the client of discussion predictions and/or current discussion information of interest, types of automated actions to take under specified circumstances with respect to one or more categories of interest, etc.); etc.

After block 490, or if it is instead determined in block 485 that the information or request received in block 405 is not to perform other indicated operations, the routine continues instead to block 495 to determine whether to continue, such as until an explicit indication to terminate is received. If it is determined to continue, the routine returns to block 405, and otherwise continues to block 499 and ends. In at least some embodiments, the routine may execute in a continuous or near-continuous manner, such as to gather and store information about comments (or other user-supplied content items) as they become available, and to analyze such user comment information during each time period of an indicated length (e.g., every 30 minutes).

Figure 5:
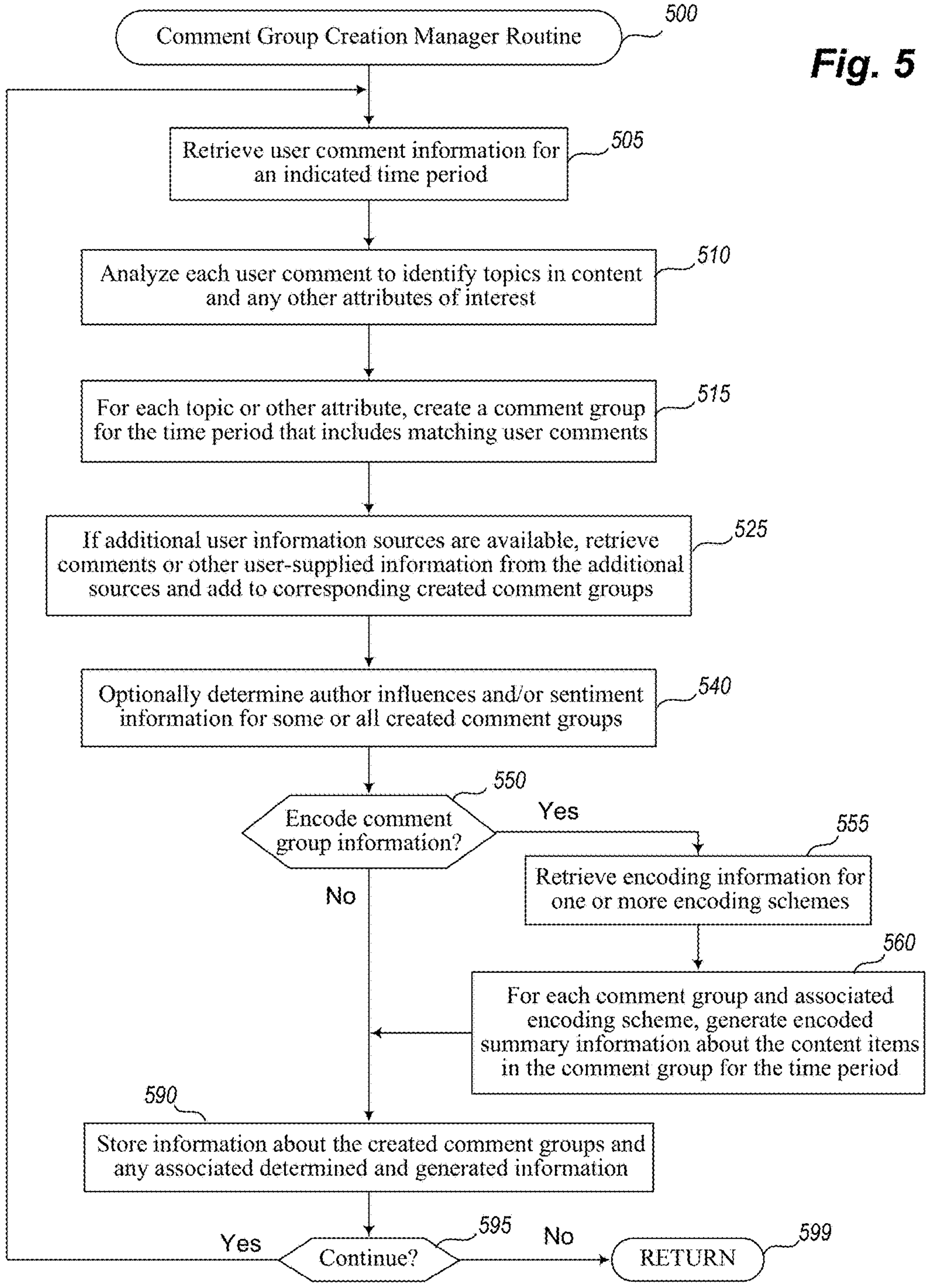
FIG. 5 is an example flow diagram of an illustrated embodiment of a Comment Group Creation Manager routine.

FIG. 5 is an example flow diagram of an illustrated embodiment of a Comment Group Creation Manager routine 500. The routine may be performed by, for example, execution of the Comment Group Creation Manager module 342 of FIG. 3, the group discussion prediction service discussed with respect to FIGS. 2A-2V and/or the Group Discussion Prediction Service 150 of FIG. 1, such as to analyze user comment information that has been received for a particular time period in order to create corresponding comment groups. The routine may be invoked in various manners in various embodiments and situations, including with respect to block 435 of FIG. 4. In addition, while the illustrated embodiment of the routine discusses obtaining and analyzing user comments, it will be appreciated that other types of user-supplied content items may be obtained and analyzed in other embodiments, whether instead of or in addition to user comments.

The illustrated embodiment of the routine begins at block 505, where user comment information for an indicated time period is retrieved, such as for information received and stored with respect to block 415 of FIG. 4. The routine then continues to block 510 to analyze each user comment to identify any topics of interest in the content and/or any other attributes of interest corresponding to the comment, such as a location of where the comment was submitted from, an author user who generated or otherwise supplied the user comment, a comment data source from which the user comment was obtained, any n-grams in the contents of the user comment (including any hashtags), etc.

After block 510, the routine continues to block 515 to, for each topic or other attribute that is identified in any of the user comments, create a corresponding comment group for the indicated time period that includes user comments matching that topic or other attribute for that time period. The routine then continues to block 525 to, if additional user information sources are available, retrieve additional comments or other user-supplied information from the additional sources that correspond to the topic or other attribute for each created comment group, and to add any such additional retrieved user-supplied information to the corresponding created comment groups.

In some embodiments, the routine may further perform additional optional activities with respect to block 540, to determine additional information about some or all of the created comment groups, such as to analyze the user comments included in some or all comment groups to determine particular author users who have high or low influence for the comment group (e.g., relative to other author users for the same comment group and/or for other comment groups), to analyze the user comments included in some or all comment groups to enable performance of a sentiment analysis with respect to contents of the comments, etc. Information generated by such optional additional activities may be stored and/or used in various manners, including to provide some or all of the generated information to clients, to take additional automated actions based on the generated information, to use some or all of the generated information as part of other analyses and determinations performed by the group discussion prediction service, etc. Additional details related to such additional optional activities are discussed in greater detail elsewhere.

After block 540, the routine continues to block 550 to determine whether to encode summary quantified information for one or more of the created content groups. If so, the routine continues to block 555 to retrieve information about one or more encoding schemes that are available to use, and optionally to indicate particular comments groups that are associated with particular encoding schemes. After block 555, the routine in block 560 further, for each encoding scheme and any associated comments groups (or in some embodiments for each comment group), uses the encoding scheme to generate encoded summary information that quantifies information about constituent content items of the comment group for the time period.

After block 560, or if it was instead determined in block 550 not to generate any encoded summary information, the routine continues to block 590 to store information about the created comment groups for later use, along with any associated determined and/or generated information for such comment groups, such as for information generated in blocks 515 and 525, block 540 and block 560.

After block 590, the routine continues to block 595 to determine whether to continue, such as until an explicit indication to terminate is received. If it is determined to continue, the routine returns to block 505, such as to wait until the next time period of an indicated length is completed, or until corresponding user comment information for such a next time period is available. If it is determined in block 595 to not continue, the routine continues to block 599 and returns, such as to return to block 435 of FIG. 4.

Figure 6:
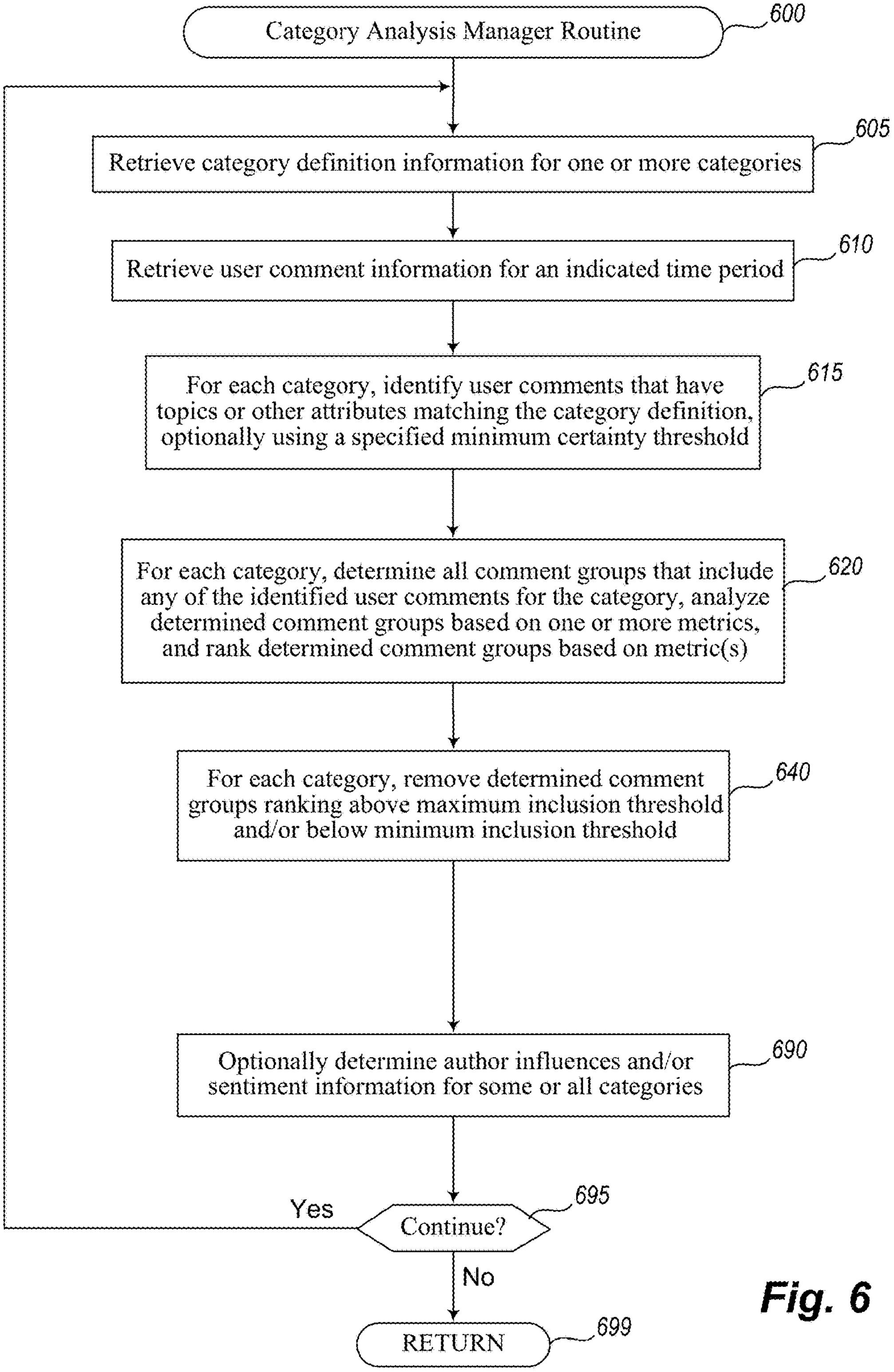
FIG. 6 is an example flow diagram of an illustrated embodiment of a Category Analysis Manager routine.

FIG. 6 is an example flow diagram of an illustrated embodiment of a Category Analysis Manager routine 600. The routine may be performed by, for example, execution of the Category Analysis Manager module 344 of FIG. 3, the group discussion prediction service discussed with respect to FIGS. 2A-2V and/or the Group Discussion Prediction Service 150 of FIG. 1, such as to analyze information about comments received during an indicated time period in order to identify current topics that are most relevant for the category during the time period. The routine may be invoked in various manners in various embodiments and situations, including with respect to block 445 of FIG. 4. In addition, while the illustrated embodiment of the routine discusses analyzing user comments, it will be appreciated that other types of user-supplied content items may be obtained and analyzed in other embodiments, whether instead of or in addition to user comments.

The illustrated embodiment of the routine begins at block 605, where category definition information is retrieved for one or more categories of interest. In block 610, the routine then retrieves user comment information for an indicated time period. In block 615, the routine then, for each category of interest, identifies user comments that have topics or other attributes matching the definition for the category, optionally using a specified minimum certainty threshold. As one example, in some embodiments a category definition may include one or a small number (e.g., four) of definition terms, and a user comment is identified as satisfying the category definition if it includes at least one of those definition terms, while in other embodiments the user comment may need to include all of the indicated definition terms or a specified minimum number of the definition terms to satisfy the minimum certainty threshold with respect to the category.

After block 615, the routine continues to block 620 to, for each category of interest, determine all the comment groups that include any of the user comments that were identified for the category, and to then analyze those determined comment groups based on one or more metrics. After the analysis, the determined comment groups are ranked with respect to the one or more metrics. As one example, the metrics may include the frequency in which comments of each determined comment group appear in the identified user comments for the category, such as to assess a relevance of each comment group to the category. The analysis of the determined comment groups based on the metric(s) may further include, in at least some embodiments, determining an average and a standard deviation with respect to the frequencies for the determined comment groups.

After block 620, the routine continues to block 640 to determine information about a maximum inclusion threshold and/or a minimum inclusion threshold for each category, such as in some embodiments to be based on the information about the determined average frequency for determined comment groups of the category and standard deviation information (e.g., to have the maximum inclusion threshold be one-half of the standard deviation above the average, and/or to have the minimum inclusion threshold be one-half of the standard deviation below the average frequency). After the maximum inclusion threshold and/or minimum inclusion threshold are determined, the determined comment groups for each category that are above the maximum or below the minimum inclusion thresholds are removed from the category, with the remaining determined comment groups reflecting current topics and other attributes that are currently most relevant for the category. Information about the determined comment groups for the category is then stored for later use. In some embodiments, only one of a maximum inclusion threshold and a minimum inclusion threshold may be used.

In some embodiments, the routine may further perform additional optional activities with respect to block 690, to determine additional information about some or all of the categories, such as to analyze the user comments associated with the category to determine particular author users who have high or low influence for the category (e.g., relative to other author users for the same category and/or for other categories), to analyze the user comments associated with the category to enable performance of a sentiment analysis with respect to contents of the user comments, etc. Information generated by such optional additional activities may be stored and/or used in various manners, including to provide some or all of the generated information to clients, to take additional automated actions based on the generated information, to use some or all of the generated information as part of other analyses and determinations performed by the group discussion prediction service, etc. Additional details related to such additional optional activities are discussed in greater detail elsewhere.

After block 690, the routine continues to block 695 to determine whether to continue, such as until an explicit indication to terminate is received. If it is determined to continue, the routine returns to block 605, such as to wait until the next time period of an indicated length is completed, or until corresponding comment group information for such a next time period is available. If it is determined in block 695 to not continue, the routine instead continues to block 699 and returns, such as to return to block 445 of FIG. 4.

Figure 7A:
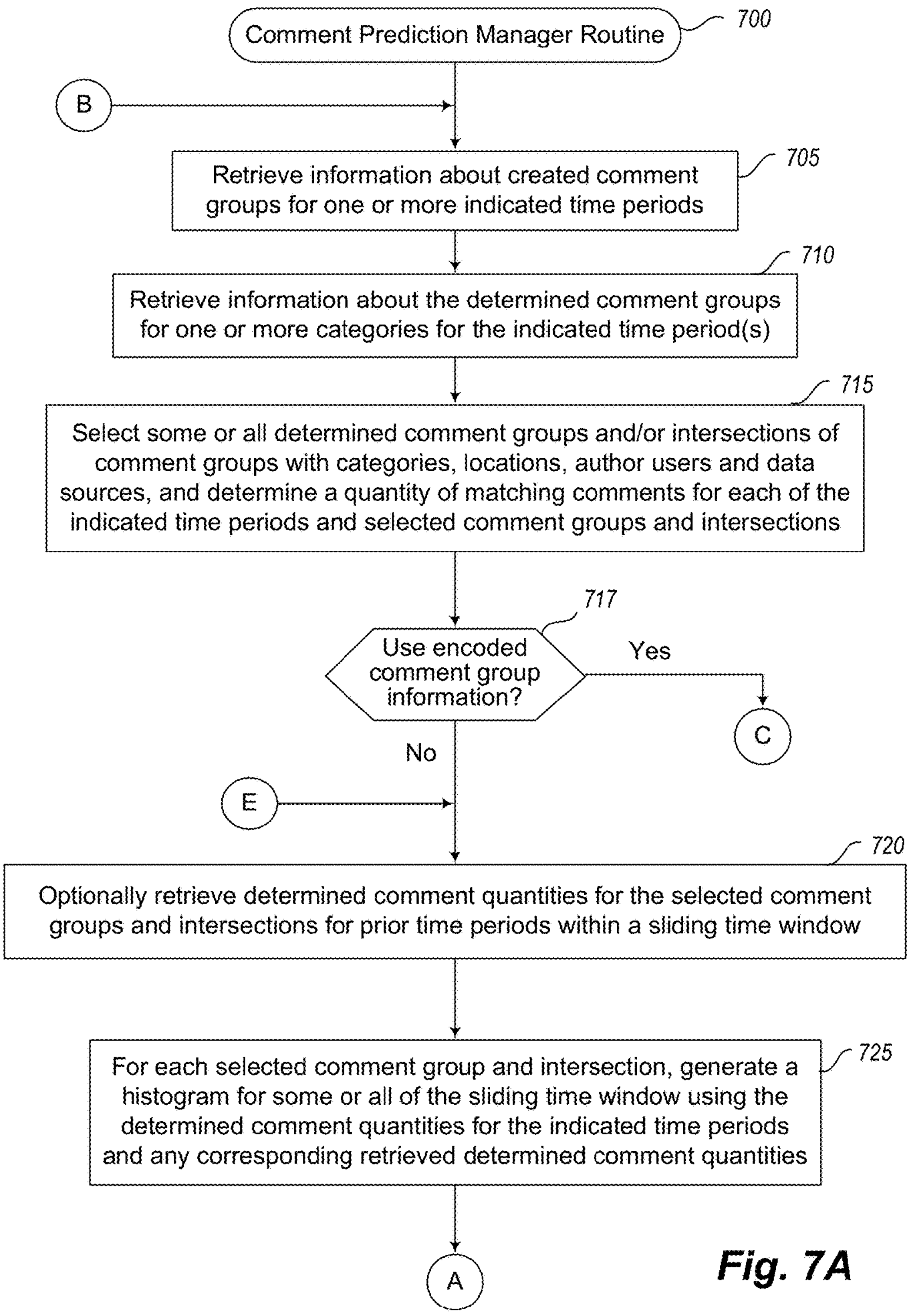
FIGS. 7A-7C are an example flow diagram of an illustrated embodiment of a Comment Prediction Manager routine.
Figure 7B:
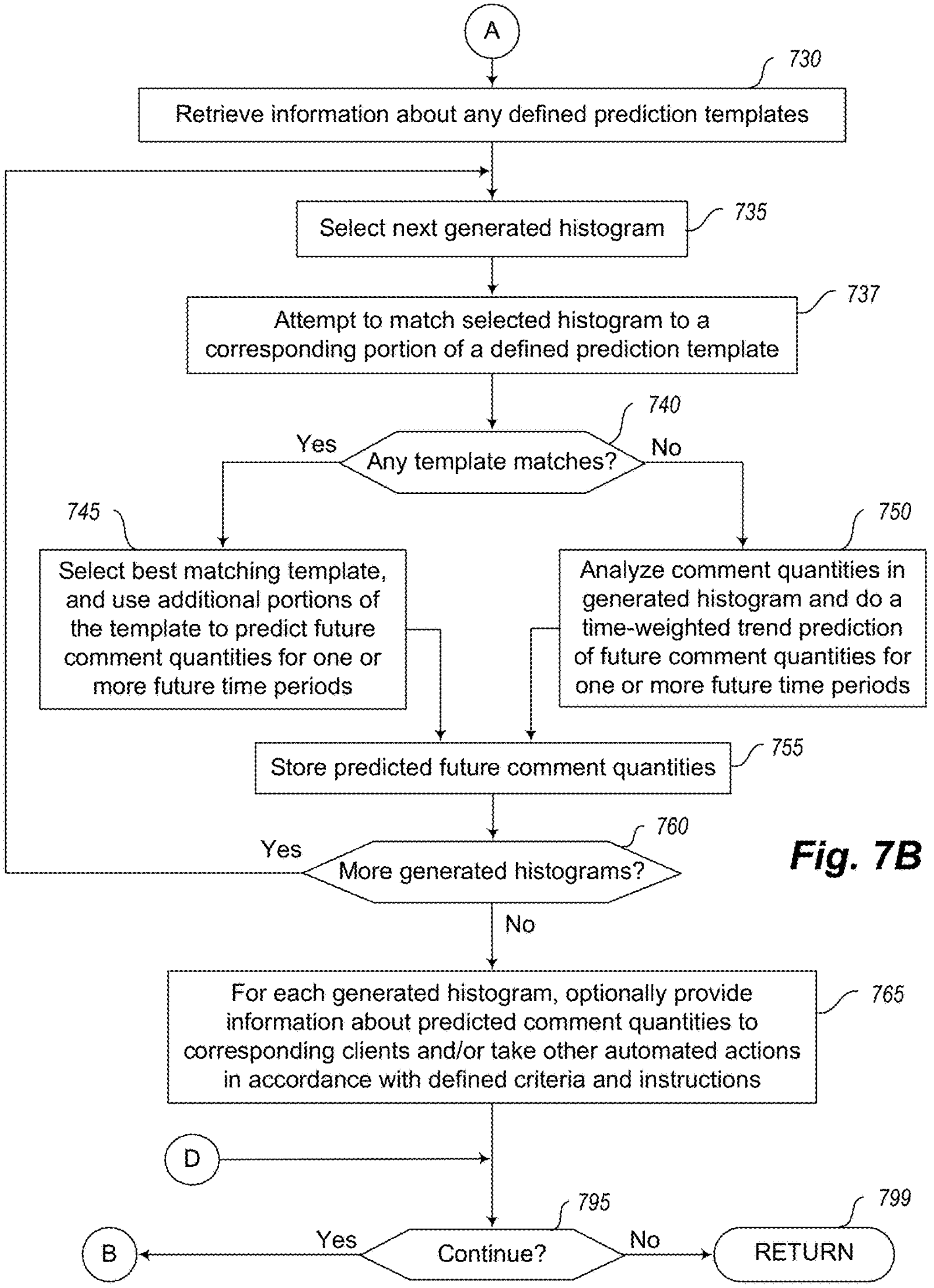
Figure 7C:
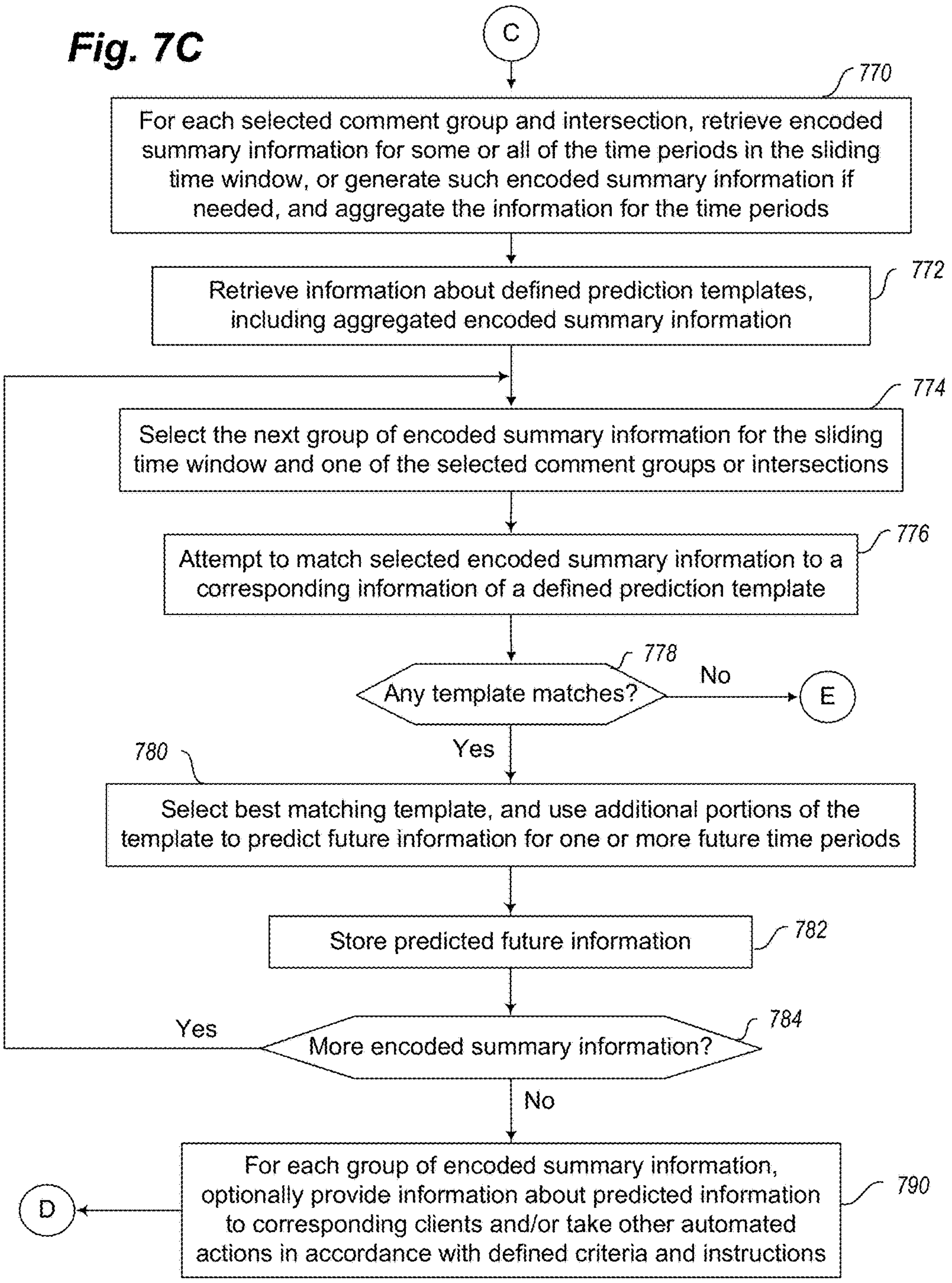

FIG. 7A-7C are an example flow diagram of an illustrated embodiment of a Comment Prediction Manager routine 700. The routine may be performed by, for example, execution of the Comment Prediction Manager module 346 of FIG. 3, the group discussion prediction service discussed with respect to FIGS. 2A-2V and/or the Group Discussion Prediction Service 150 of FIG. 1, such as to predict information about future user comments that will be received with respect to one or more comment groups and/or categories for one or more future time periods based at least in part on comment information for those comment groups and/or categories that have already been received. The routine may be invoked in various manners in various embodiments and situations, including with respect to block 455 of FIG. 4. In addition, while the illustrated embodiment of the routine discusses analyzing user comments, it will be appreciated that other types of user-supplied content items may be obtained and analyzed in other embodiments, whether instead of or in addition to user comments.

The illustrated embodiment of the routine begins at block 705, where information is retrieved about created comment groups for one or more indicated time periods. In block 710, information is then retrieved about the comment groups that have been determined to be relevant for one or more categories for the indicated time periods. After block 710, the routine continues to block 715 to select some or all of the determined comment groups for further analysis, including in some embodiments to select some or all intersections of the determined comment groups with corresponding categories, locations, author users, and/or data sources. For each selected comment group and/or intersection, the routine in block 715 then quantifies information about the associated user-supplied comments for the selected comment group and/or intersection, such as by determining a quantity of matching comments for each of the indicated time periods of interest.

After block 715, the routine continues to block 717 to determine whether to use encoded summary comment group information for the selected comment groups and/or intersections to predict future information for those selected comment groups and/or intersections, such as if such encoded summary information is available for those selected comment groups and/or intersections (e.g., with respect to block 560 of FIG. 5), and if the available prediction template information includes encoded summary information to use for matching purposes. If so, the routine continues to block 770. Otherwise, or if it is instead determined in block 778 that there are no template matches, the routine continues to block 720 to predict future information for those selected comment groups and/or intersections by generating and using histogram information for those selected comment groups and/or intersections.

In particular, in block 720, the routine continues to optionally retrieve additional determined comment quantity information for the selected comment groups and/or intersections, such as for prior time periods within a sliding time window (e.g., the last 72 hours). In block 725, the routine then, for each selected comment group and intersection, generates a histogram for some or all of the sliding time window using the determined comment quantities for the indicated time periods and any corresponding retrieved determined comment quantities for prior time periods, such as to have a separate value in the histogram for each time period of an indicated length during the sliding time window (and optionally removing any information from a previous histogram for time periods that are no longer part of the sliding time window).

After block 725, the routine continues to block 730 to retrieve information about any defined prediction templates that are available for use in performing predictions. The routine then continues to block 735 to select the next generated histogram, beginning with the first. In block 737, the routine then attempts to match the selected generated histogram to one or more of the defined prediction templates. In block 740, it is determined if any of the prediction templates had a sufficient match for the selected histogram, and if so, the routine then continues to block 745 to select the best matching prediction template, and to use additional portions of the prediction template to predict future comment quantities for one or more future time periods corresponding to the selected histogram. If it is instead determined in block 740 that there were not any matching prediction templates (or no prediction templates were available to attempt to match), the routine continues instead to block 750 to perform a time-weighted trend prediction of future comment quantities for one or more future time periods based on the comment quantities in the generated histogram. It will be appreciated that the matching of a histogram to a prediction template, the use of an additional portion of a matching template to predict future quantities, and the time-weighted trend prediction may each be performed in various manners in various embodiments, as discussed in greater detail elsewhere.

After blocks 745 or 750, the routine continues to block 755 to store the predicted future comment quantity information for subsequent use. In block 760, it is then determined if any additional histograms generated in block 725 remain to be analyzed, and if so returns to block 735 to select a next such generated histogram. Otherwise, the routine continues to block 765 to optionally perform one or more additional activities. Such additional activities may, in at least some embodiments, include providing information about predicted comment quantities and/or about determined current quantities for a generated histogram to one or more corresponding clients or other information sources that previously requested such information, optionally in accordance with any specified criteria by such clients or other information sources. In addition, in at least some embodiments, the routine may, in block 765, further take one or more other automated actions for a generated histogram in accordance with defined criteria and client instructions based at least in part on predicted comment quantities and/or on determined current comment quantities, such as to initiate and add one or more comments to one or more comment sources that include information relevant to a discussion for a category or a comment group associated with the generated histogram (e.g., to provide additional information corresponding to the category or to the topic of the comment group, or to otherwise influence a direction in which the discussion may take place in the future).

If it is determined in block 717 to use encoded summary comment group information for the selected comment groups and/or intersections to predict future information for those selected comment groups and/or intersections, the routine continues to block 770. In block 770, the routine retrieves encoded summary information for the selected comment groups and/or intersections for prior time periods within a sliding time window (e.g., the last 72 hours), such as for information generated in block 560 of FIG. 5. If any of the selected comment groups and/or intersections lack stored encoded summary information, the routine further retrieves, for each such selected comment groups and/or intersection, information about the constituent content items for the selected comment group or intersection for the time periods of the time window, and generates encoded summary information for the time window using each of one or more encoding schemes, such as in a manner similar to that described with respect to blocks 555 and 560 of FIG. 5. For example, with respect to an intersection of a comment group with a category, content items that are part of the comment group and are associated with the category may be identified, and encoded summary information may be quantified for an aggregation of those constituent content items. The routine then, for each of the selected comment groups and/or intersections, aggregates the encoded summary information for the prior time periods during the time window in block 770, such as by included the encoded summary information for each time period in succession in the aggregation.

After block 770, the routine continues to block 772 to retrieve information about any defined prediction templates that are available for use in performing predictions and that include aggregated encoded summary information for multiple time periods corresponding to at least a portion of the time window. For example, if the summary information for a comment group and/or intersection is encoded to represent information about five types of attributes for the constituent content items of the comment group and/or intersection during each of multiple prior time periods, the aggregated group of summary information for the retrieved matching prediction template similarly encodes information about those five types of attributes in at least some embodiments. The routine then continues to block 774 to select the next aggregated group of encoded summary information for one of the selected comment groups and/or intersections, beginning with the first. In block 776, the routine then attempts to match the selected aggregated group of encoded summary information to one or more of the defined prediction templates. In block 778, it is determined if any of the prediction templates had a sufficient match for the selected aggregated group of encoded summary information, and if so, the routine then continues to block 780 to select the best matching prediction template, and to use additional encoded summary information from the prediction template to predict future information for one or more future time periods corresponding to the selected aggregated group of encoded summary information. For example, if the summary information for a comment group and/or intersection is encoded to represent information about five types of attributes for the constituent content items of the comment group and/or intersection during each of multiple prior time periods, and the aggregated group of summary information for a matching prediction template similarly encodes information about those five types of attributes, the additional information from the matching prediction template is used to predict future information about one or more of those five types of attributes. If it is instead determined in block 778 that there were not any matching prediction templates, the routine continues instead to block 720. It will be appreciated that the matching of an aggregated group of encoded summary information to a prediction template, the use of additional encoded summary information of a matching prediction template to predict future information may each be performed in various manners in various embodiments, as discussed in greater detail elsewhere, with the examples discussed with respect to FIGS. 2F-2K providing one example of such prediction.

After block 780, the routine continues to block 782 to store the predicted future information for subsequent use. In block 784, it is then determined if any additional aggregated groups of encoded summary information generated in block 770 remain to be analyzed, and if so returns to block 774 to select a next such generated aggregated group of encoded summary information. Otherwise, the routine continues to block 790 to optionally perform one or more additional activities, including to provide information about predicted future information to one or more clients or other information sources and/or to further take one or more other automated actions in accordance with defined criteria and client instructions, such as in a manner previously described with respect to block 765.

After blocks 765 or 790, the routine continues to block 795 to determine whether to continue, such as until an explicit indication to terminate is received. If it is determined to continue, the routine returns to block 705, such as to wait until the next time period of an indicated length is completed, or until corresponding to wait until additional information about created comment groups and/or about determined comment groups for categories for such a next time period is available. If it is instead determined in block 795 not to continue, the routine instead continues to block 799 and returns, such as to return to block 455 of FIG. 4.

Figure 8A:
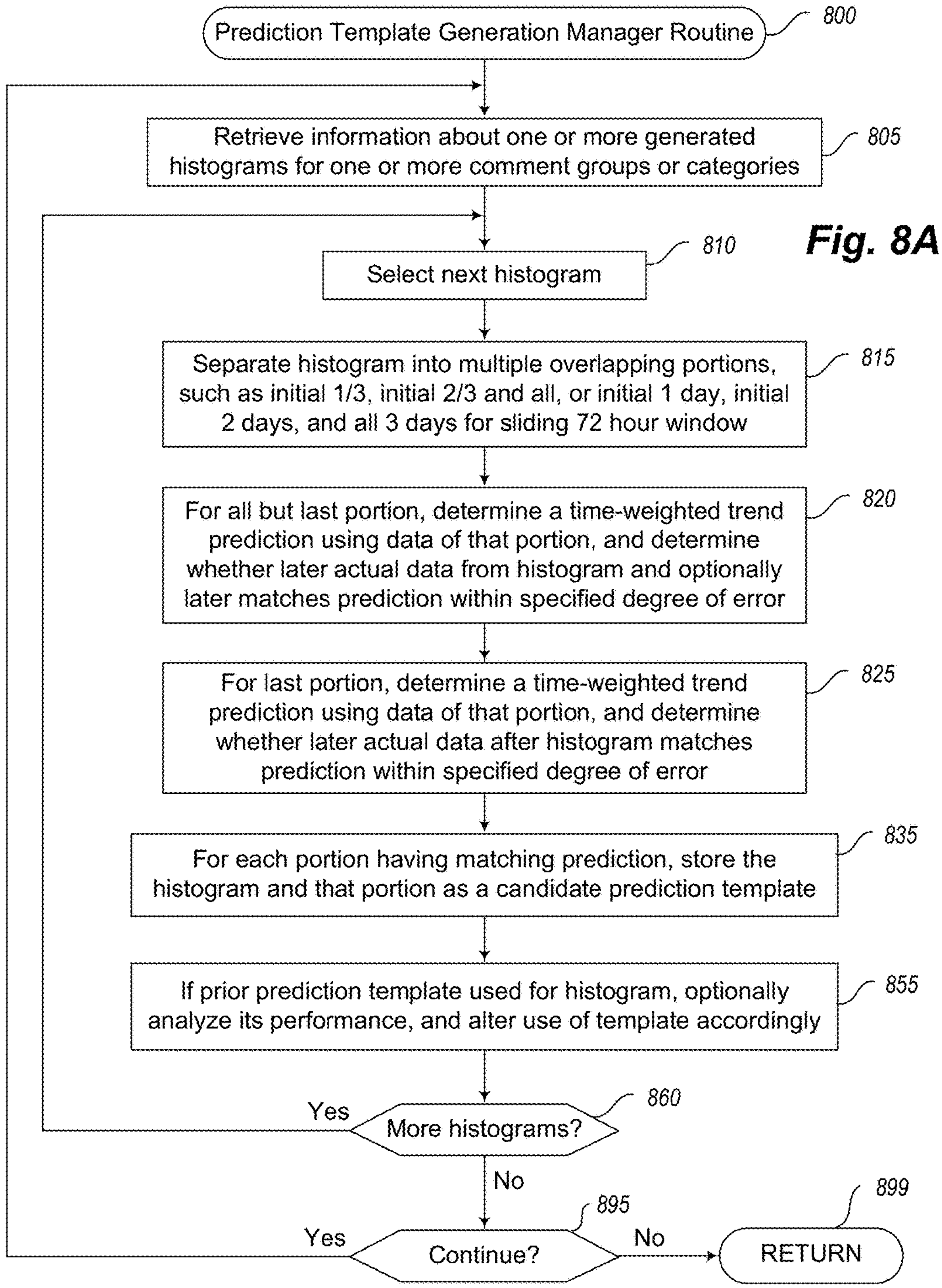
FIGS. 8A and 8B are example flow diagrams of illustrated embodiments of a Prediction Template Generation Manager routine.
Figure 8B:
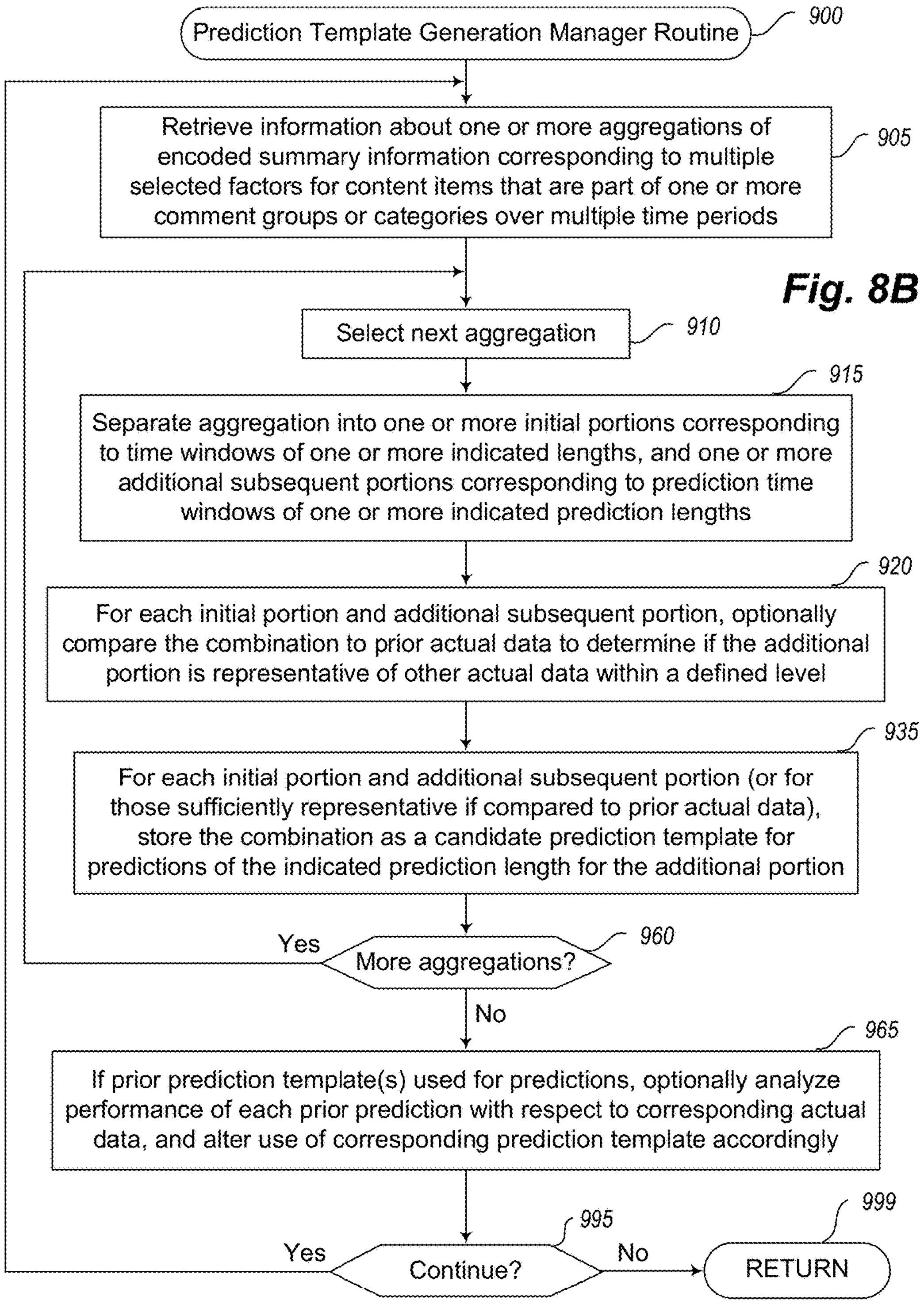

FIGS. 8A and 8B illustrate example flow diagrams of alternative embodiments of a Prediction Template Generation Manager routine. The routines of FIGS. 8A and 8B may each be performed by, for example, execution of the Prediction Template Generation Manager module 348 of FIG. 3, the group discussion prediction service discussed with respect to FIGS. 2A-2V and/or the Group Discussion Prediction Service 150 of FIG. 1, such as to generate new prediction templates based on prior actual comments associated with a comment group or a category and/or based on predicted future comments for a comment group or a category. The routines may be invoked in various manners in various embodiments and situations, including with respect to block 465 of FIG. 4. In addition, while the illustrated embodiment of the routine discusses analyzing user comments, it will be appreciated that other types of user-supplied content items may be obtained and analyzed in other embodiments, whether instead of or in addition to user comments.

In particular, FIG. 8A illustrates an example flow diagram of an embodiment of a Prediction Template Generation Manager routine 800 that uses histograms and associated trend curves to predict future information and to assess the accuracy of such predictions. The illustrated embodiment of the routine 800 begins at block 805, where information is retrieved about one or more generated histograms for one or more comment groups or categories, such as for histograms generated in block 725 of routine 700. The routine then continues to block 810 to select the next generated histogram, beginning with the first. In block 815, the routine then separates the generated histogram into multiple overlapping portions, such as the initial ⅓ portion of the generated histogram, the initial ⅔ portion of the generated histogram, and the entire portion of the generated histogram—thus, if the histogram covers, for example, a sliding time window of 72 hours (or 3 days), the multiple overlapping portions may correspond to the first day, the first and second days, and all 3 days. In other embodiments and situations, other types of histogram portions and time lengths may be used.

In blocks 820 and 825, each of the histogram portions is analyzed to determine whether the information in that histogram portion is able to accurately predict additional user comments that will be received, such as if the user comment information represented in that histogram portion represents a typical or otherwise repeated pattern of user comments. In particular, in block 820, for all but the last of the histogram portions, a time-weighted trend prediction is performed using the information in the histogram portion, and additional information about actual user comments received (e.g., from other later portions of the generated histogram) is used to determine whether that trend prediction is consistent with that actual user comment information. In block 825, for the last of the histogram portions, a time-weighted trend prediction is performed using the information in the histogram portion, and additional information about actual user comments received (e.g., from one or more time periods after the sliding time window corresponding to the generated histogram) is used to determine whether that trend prediction is consistent with that actual user comment information—in some situations, such as if the selected histogram was just completed and represents the most current comment information that is available, the performance of the analysis of block 825 may be deferred until additional user comment information is received and analyzed. The time-weighted trend predictions performed in blocks 820 and 825 may, for example, be similar to or the same as that performed in block 750 of routine 700, and the determination of whether the trend prediction is consistent may be performed with respect to a specified degree of error.

After block 825, the routine continues to block 835 to, for each histogram portion having a prediction that is consistent with actual information, store information about the histogram portion (and optionally the subsequent additional information used to verify the prediction) as a candidate histogram template for later use in generating other predictions, such as with respect to block 745 of routine 700.

In some embodiments, the routine may further perform additional optional activities with respect to block 855, to assess whether one or more prior predictions made from use of a prediction template for the histogram were accurate, such as with respect to block 745 of routine 700, and to corresponding alter use of the prediction template. For example, if the prior use of a prediction template was accurate, an accuracy rate for that prediction template may be increased accordingly, and the prediction template may continue to be used, optionally with an increased confidence in its accuracy based on the increased accuracy rate. Conversely, if the prior use of a prediction template was not accurate, an accuracy rate for that prediction template may be decreased accordingly, optionally with a corresponding decreased confidence in its accuracy based on the increased accuracy rate, and the prediction template may be taken out of use if its accuracy rate is too low. The prior use of a prediction template that may be assessed may in some situations include waiting until later actual information is available about user comments that are received, for comparison to the prior prediction made for the histogram. After block 855, the routine continues to block 860 to determine whether more generated histograms are available, and if so returns to block 810 to select a next such histogram.

If it is instead determined in block 860 that no more histograms are available, the routine continues to block 895 to determine whether to continue, such as until an explicit indication to terminate is received. If it is determined to continue, the routine returns to block 805, such as to wait until additional information about generated histograms and/or corresponding actual comment information corresponding to predictions are available. If it is instead determined in block 895 not to continue, the routine instead continues to block 899 and returns, such as to return to block 465 of FIG. 4.

FIG. 8B illustrates an example flow diagram of an embodiment of a Prediction Template Generation Manager routine 900 that uses aggregations of encoded summary information for selected factors of interest to predict future information, such as for one or more of the selected factors, and to assess the accuracy of such predictions. The illustrated embodiment of the routine 900 begins at block 905, where information is retrieved about one or more generated aggregations of encoded summary information corresponding to multiple selected factors for constituent content items of one or more comment groups or categories, such as for aggregations generated in block 770 of routine 700. The routine then continues to block 910 to select the next generated aggregation, beginning with the first.

In block 915, the routine then separates the generated aggregation into one or more initial portions that each correspond to a time window having a time length of one or more indicated lengths, including to optionally have multiple initial overlapping portions, such as an initial 6 hours of the aggregation, an initial 24 hours of the aggregation, an initial 48 hours of the aggregation, and an initial 72 hours of the aggregation—thus, if the aggregation includes, for example, a sliding time window of at least 72 hours (or 3 days), the multiple overlapping portions may correspond to the first day, the first and second days, and all 3 days. In other embodiments and situations, other types of aggregation portions and time lengths may be used. The routine further identifies one or more additional subsequent portions of the aggregation for each of the initial portions, with each additional subsequent portion having a time length of one or more indicated prediction lengths, such as a next 6 hours of the aggregation, a next 24 hours of the aggregation, a next 48 hours of the aggregation, and a next 72 hours of the aggregation. Thus, as one example, the initial portion may be for 72 hours, and the additional subsequent portion may be for the subsequent 72 hours, such as if at least 144 hours of encoded summary information are available in the aggregation. Other non-exclusive examples include the following: the initial portion is for 72 hours, and the additional subsequent portion is for the subsequent 24 hours; the initial portion is for 24 hours, and the additional subsequent portion is for the subsequent 24 hours (thus, the additional subsequent portion in this example may be part of the initial portion in the prior example in which the initial portion is for 72 hours); the initial portion is for 24 hours, and the additional subsequent portion is for the subsequent 6 hours; the initial portion is for 24 hours, and the additional subsequent portion is for the subsequent 72 hours; etc.

In block 920, each of the initial portion and additional subsequent portion combinations is optionally analyzed to determine whether the information in that additional portion is able to accurately predict additional user content items that will be received after data matching the initial portion has occurred, such as by comparing that combination to other prior actual data having a matching initial portion to see if the additional portion of the combination matches subsequent actual data from that prior actual data—such a comparison may show, for example, whether the combination being considered represents a typical or otherwise repeated pattern of user comments or other content items. The degree of match between corresponding initial portions and/or corresponding additional portions of a current candidate combination and prior actual data may be performed in various manners, as discussed in greater detail elsewhere—if the comparison of block 920 is performed, a current candidate combination may be retained as a candidate only if it sufficiently matches a specified quantity (e.g., one, more than one, etc.) of prior sets of actual data, such as with respect to a specified degree of error.

After block 920, the routine continues to block 935 to, for each combination of an initial portion and an additional subsequent portion that is determined in block 920 to be sufficiently representative, or for each combination of an initial portion and an additional subsequent portion determined in block 915 if the comparison in block 920 is not performed, store information about the combination of aggregated encoded summary information for use as part of a candidate prediction template for later use in generating other predictions, such as with respect to block 780 of routine 700. After block 935, the routine continues to block 960 to determine whether more generated aggregations are available, and if so returns to block 910 to select a next such aggregation.

In some embodiments, the routine may further perform additional optional activities with respect to block 965 if no more aggregations are determined in block 960 to be available, in order to assess whether one or more prior predictions made from use of a prediction template using aggregated encoded summary information were accurate, such as with respect to block 780 of routine 700, and to corresponding alter use of that prediction template. For example, if the prior use of a prediction template was accurate, an accuracy rate for that prediction template may be increased accordingly, and the prediction template may continue to be used, optionally with an increased confidence in its accuracy based on the increased accuracy rate. Conversely, if the prior use of a prediction template was not accurate, an accuracy rate for that prediction template may be decreased accordingly, optionally with a corresponding decreased confidence in its accuracy based on the increased accuracy rate, and the prediction template may be taken out of use as a candidate if its accuracy rate is too low.

After block 965, the routine continues to block 995 to determine whether to continue, such as until an explicit indication to terminate is received. If it is determined to continue, the routine returns to block 905, such as to wait until additional information about generated aggregations and/or corresponding actual comment information corresponding to predictions are available. If it is instead determined in block 995 not to continue, the routine instead continues to block 999 and returns, such as to return to block 465 of FIG. 4.

Figure 9:
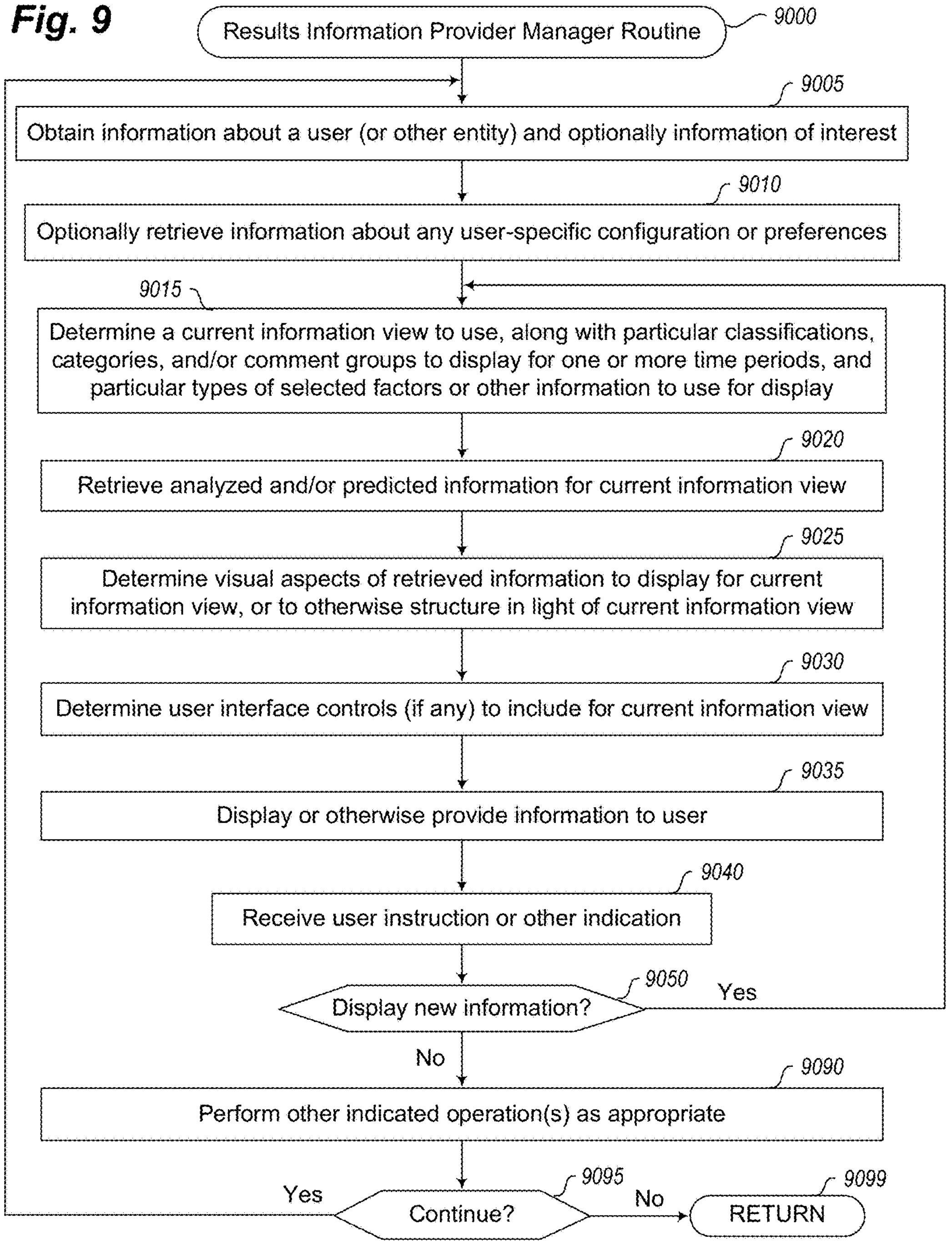
FIG. 9 is an example flow diagram of an illustrated embodiment of a Results Information Provider routine.

FIG. 9 is an example flow diagram of an illustrated embodiment of a Results Information Provider Manager routine 9000. The routine may be performed by, for example, execution of the Results Information Provider Manager module 347 of FIG. 3, the group discussion prediction service discussed with respect to FIGS. 2A-2V and/or the Group Discussion Prediction Service 150 of FIG. 1, such as to display or otherwise provide analyzed information and/or predicted information for one or more categories and/or comment groups and/or classifications of interest, to reflect corresponding constituent content items for one or more time periods. The routine may be invoked in various manners in various embodiments and situations, including with respect to block 475 of FIG. 4. In addition, while the illustrated embodiment of the routine discusses displaying information of specific types in specific manners, it will be appreciated that other types of information may be displayed in smaller manners in other embodiments, including information that is not related to distributed group discussions or conversations.

The routine begins at block 9005, where information is obtained about a user or other entity to whom to display or otherwise provide information, optionally including one or more indications of interest. Such obtained information may, for example, be based on a request received from the user or other entity (such as to optionally indicate one or more time periods of interest, a type of information view of interest, one or more classifications and/or categories and/or comment groups of interest, etc.), or instead may be determined based on expiration of a time associated with providing such information, an automated determination to provide such information (e.g., a determination that information of one or more indicated types is available to push to the user or other entity, such as based on a prior request; a determination that one or more other types of indicated criteria are currently satisfied, such as based on receipt or determination of current real-time or near-real-time data of one or more types, based on current prediction of future information of one or more types; etc.), etc.

After block 9005, the routine continues to block 9010 to optionally retrieve information about any configurations previously specified by the user or other entity, and/or any preferences previously determined for the user or other entity (e.g., based on explicit indications of preferences; based on inferred indications of preferences from prior actions of the user or other entity; etc.). For example, a first user may specify that he/she is interested in beginning interactions with a classification-level view that includes information about one or more indicated classifications of interest, while a second user may specify that he/she is interested in beginning interactions with a category-level view that includes information about one or more indicated categories of interest, while a third user may specify that he/she is interested in beginning interactions with a comment group-level view that includes information about one or more indicated comment groups of interest, etc. User or entity configurations or preferences may further include particular selected factors whose information is to be displayed in particular manners, as well as other information about types of information to expose or hide at particular times (e.g., legends, keys, scale information, tags and other visual indicators, user-selectable controls, etc.), as discussed in greater detail elsewhere.

After block 9010, the routine continues to block 9015 to determine particular types of information to display or otherwise provide at the current time, including a current information view, one or more current, past and/or future time periods for which to display information, particular classifications and/or categories and/or comment groups, particular types of selected factors to use, etc. In some embodiments, some or all such information may be user-configurable or otherwise personalized to a particular user or other entity, and in some embodiments, some or all such information may be predefined (e.g., defaults that can be overridden by the user or other entity, fixed information that cannot be overridden by the user of other entity, etc.)—as discussed with respect to blocks 9005 and 9010, at least some of the determined types of information may be obtained by operations performed with respect to those blocks. In block 9020, the routine then retrieves analyzed and/or predicted information of the types determined in block 9015, whether by accessing previously generated and stored information, interacting with one or more other modules 342-348 to cause the modules to dynamically generate and/or provide such information, etc.

In block 9025, the routine then prepares the retrieved information for display or other providing, such as to determine and generate information for particular visual aspects to be included for display to the user, to determine and generate tags or other structured data to be included in information being programmatically provided to another automated system, etc. The routine then continues to block 9030 to determine user-selectable and user-manipulatable controls, if any, to include in a display of the current information view, such as in a manner based on previous configuration and/or preferences of the user or other entity, based on predefined defaults or fixed controls, based on the current information view, etc. In block 9035, the routine then displays or otherwise provides the information to the user or other entity, such as by sending the information to a client device of the user or other entity for display using a browser or other client-side application executing on the client device. As discussed in greater detail elsewhere, a variety of visual aspects and selected factors may be used as part of the display. As one illustrative non-limiting example, the information displayed may be a category-level view that includes information about a particular category and about particular comment groups within that category, by displaying information for each of the comment groups based on that comment group's constituent content items for a current time period and a next future time period, and with the visual aspects and the corresponding selected factors that are used as follows: 5 visual aspects that include size, horizontal location, vertical location, color, and an associated halo; and 5 selected factors for those 5 visual aspects of current total quantity of constituent content items, current aggregate sentiment, current rate of change in total quantity, current rate of change in total quantity, and predicted total quantity of constituent content items for the future time period, respectively (i.e., size represents current total quantity, horizontal location represents aggregate sentiment, vertical location and color each represent current rate of change in total quantity, and halo represents predicted total quantity). As another illustrative non-limiting example, the information displayed may be a classification-level view that includes information about one or more classifications and about particular categories within each such classification (and optionally about particular comments groups within one or more such categories), by displaying information for each of the categories (and possibly comment groups) based on that category's (and possibly comment group's) constituent content items for a current time period and a next future time period, and with the visual aspects and the corresponding selected factors that are used as follows: 5 visual aspects that include size, horizontal location, vertical location, color, and an associated halo; and 5 selected factors for those 5 visual aspects of current total quantity of constituent content items, current aggregate sentiment, current rate of change in total quantity, current rate of change in total quantity, and predicted total quantity of constituent content items for the future time period, respectively (i.e., size represents current total quantity, horizontal location represents aggregate sentiment, vertical location and color each represent current rate of change in total quantity, and halo represents predicted total quantity).

In the illustrated embodiment, the routine then waits in block 9040 until a user instruction or other indication is received, and then continues to block 9050 to determine whether the instruction or indication results in the display of new information, and if so returns to block 9015 to initiate that display. For example, a user instruction may be received that selects a particular information view, classification, category, comment group and/or content item for which additional information is to be retrieved or displayed, or alternatively a user instruction may be received that modifies information being currently displayed in one or more other manners (e.g., to indicate a new selected factor for which visual aspects are to be provided, to indicate to advance to a previous or next page, etc.). Alternatively, the indication received in block 9040 may be initiated in other manners, such as an indication that new analyzed and/or predicted information corresponding to the current display is available for display, an indication that a timer has expired (e.g., if the display is updated periodically, such as every time period, every 5 minutes, every minute, every second, etc.), an indication from the GDP system or service (e.g., from another module of the GDP system) to update the display, etc.

If it is instead determined in block 9050 that the instruction or indication received in block 9040 does not result in the display of new information, the routine continues instead to block 9090 to optionally perform one or more other indicated operations as appropriate, and to then continue to block 9095. For example, if a user or other entity indicates that the current information display session is complete (e.g., based on a user logout, inactivity for a predetermined amount of time, etc.), the routine may continue to block 9095 and then to block 9099. Alternatively, the user or other entity may provide information to be stored for later use, indicate a change in a current user or other entity, etc.

After block 9090, the routine continues to block 9095 to determine whether to continue, such as until an explicit indication to terminate is received. If it is determined to continue, the routine returns to block 9005, such as to wait until a next request or other indication is received. If it is instead determined in block 9095 not to continue, the routine instead continues to block 9099 and returns, such as to return to block 475 of FIG. 4.

As discussed in greater detail elsewhere, in at least some such embodiments, the information display or other providing of routine 9000 may occur in a real-time or near-real-time manner with respect to corresponding events or activities to which the information corresponds (e.g., within seconds, minutes or hours of such events or activities), such as the receipt of constituent content items on based the displayed information is based at least in part. A display of information may, for example, indicate multiple categories, and visually indicate information about relative or absolute values for respective categories based on each of multiple selected factors, such as based on use of one or more of the following information for a displayed representation of a category: size, horizontal location, vertical location, color, an associated halo, horizontal movement, vertical movement, displayed tags or other visual indicators, etc. —as one example, such information may be provided for a current time period and/or next future time period and for selected factors that include total quantity of constituent content items, rate of change in total quantity, and aggregate sentiment. A display of information may, for example, indicate multiple comment groups that each represents an associated topic or other attribute of constituent content items in the comment group (whether instead of or in addition to one or more category indicators), and visually indicate information about relative or absolute values for respective comment groups based on each of multiple selected factors, such as based on use of one or more of the following information for a displayed representation of a category: size, horizontal location, vertical location, color, an associated halo, horizontal movement, vertical movement, displayed tags or other visual indicators, etc. —as one example, such information may be provided for a current time period and/or next future time period and for selected factors that include total quantity of constituent content items, rate of change in total quantity, and aggregate sentiment. Additional details related to such display of information about analyzed aspects of distributed group discussions and/or about further predicted aspects of the discussions is included herein, including with respect to FIGS. 2L-2V.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

Non-exclusive example embodiments described herein are further described in the following clauses.

A. A computer-implemented method comprising:

obtaining, by one or more configured computing systems, information about one or more distributed group discussions having a plurality of content items, wherein the plurality of content items include multiple content items for each of one or more time periods, and wherein the obtained information includes, for each time period, information about one or more categories that correspond to the distributed group discussions and/or about one or more attributes of the multiple content items for the time period;

determining, by the one or more configured computing systems, multiple selected factors of the obtained information to display to one or more users, and determining multiple visual aspects to use to display the multiple selected factors;

generating, by the one or more configured computing systems, information for display to the one or more users, the generated information including, for each of the multiple selected factors, a subset of the obtained information that corresponds to the selected factor and that is represented using at least one of the multiple visual aspects; and providing, by the one or more configured computing systems, the generated information for display to the one or more users.

B. The method of clause A wherein the one or more time periods include at least one current or recent time period and at least one future time period.

C. The method of clause A wherein the one or more time periods are part of a time window having multiple prior time periods.

D. The method of clause A wherein the one or more time periods are part of a time window having multiple future time periods.

E. The method of any of clauses A-D wherein the one or more configured computing systems are part of a group discussion prediction service.

F. The method of any of clauses A-E wherein the plurality of content items include a plurality of comments supplied by a plurality of users in a plurality of geographical locations to a plurality of social networking sites, the plurality of comments being at least some of the distributed group discussions.

G. The method of any of clauses A-F wherein the plurality of content items are supplied by a plurality of users to a plurality of data sources, the plurality of content items being at least some of the distributed group discussions.

H. The method of any of clauses A-G wherein the obtained information includes information about multiple attributes, and wherein at least some of the multiple attributes are conversation topics.

I. The method of any of clauses A-H wherein the obtained information includes information about multiple attributes, and wherein at least some of the multiple attributes are terms supplied by users within the plurality of content items.

J. The method of any of clauses A-I wherein the obtained information includes information about multiple attributes, and wherein at least some of the multiple attributes are from metadata associated with the plurality of content items.

K. The method of any of clauses A-J wherein the obtained information includes information about multiple categories.

L. The method of any of clauses A-K wherein the multiple selected factors include at least one of a group including total quantity of content items during a time period that are associated with a comment group representing at least one of the one or more attributes, rate of change in total quantity of content items between two or more time periods that are associated with a comment group representing at least one of the one or more attributes, aggregate sentiment of content items during a time period that are associated with a comment group representing at least one of the one or more attributes, total quantity of content items during a time period that are associated with at least one of the one or more categories, rate of change in total quantity of content items between two or more time periods that are associated with at least one of the one or more categories, and aggregate sentiment of content items during a time period that are associated with at least one of the one or more categories.

M. The method of any of clauses A-L wherein the multiple selected factors include total quantity of content items during a time period that are associated with a comment group representing at least one of the one or more attributes, rate of change in total quantity of content items between two or more time periods that are associated with a comment group representing at least one of the one or more attributes, and aggregate sentiment of content items during a time period that are associated with a comment group representing at least one of the one or more attributes.

N. The method of any of clauses A-M wherein the multiple selected factors include total quantity of content items during a time period that are associated with at least one of the one or more categories, rate of change in total quantity of content items between two or more time periods that are associated with at least one of the one or more categories, and aggregate sentiment of content items during a time period that are associated with at least one of the one or more categories.

O. The method of any of clauses A-N wherein the multiple visual aspects include at least one of a group including absolute size of a displayed item, relative size between two or more displayed items, absolute vertical location of a displayed item, relative vertical location of a displayed item to at least one other location, absolute horizontal location of a displayed item, relative horizontal location of a displayed item to at least one other location, absolute vertical movement of a displayed item, relative vertical movement of a displayed item to at least one location, absolute horizontal movement of a displayed item, relative horizontal movement of a displayed item to at least one location, a halo associated with a displayed item, a shadow associated with a displayed item, color of a displayed item, highlighting of a displayed item, bolding of a displayed item, italicizing of a displayed item, underlining of a displayed item, displayed textual content, and displayed graphical content.

P. The method of any of clauses A-O wherein the multiple visual aspects include absolute size of a displayed item, absolute vertical location of a displayed item, absolute horizontal location of a displayed item, a halo associated with a displayed item, and color of a displayed item.

Q. The method of any of clauses A-P wherein the multiple visual aspects include relative size between two or more displayed items, relative vertical location of a displayed item to at least one other location, relative horizontal location of a displayed item to at least one other location, a halo associated with a displayed item, and color of a displayed item.

R. The method of any of clauses A-Q wherein each of the multiple selected factors is associated with one of the multiple visual aspects.

S. The method of any of clauses A-R wherein one or more of the multiple selected factors is configurable by at least one of the one or more users.

T. The method of any of clauses A-S wherein one or more of the multiple visual aspects is configurable by at least one of the one or more users.

U. The method of any of clauses A-T wherein one or more of the multiple selected factors is automatically personalized for at least one of the one or more users.

V. The method of any of clauses A-U wherein one or more of the multiple visual aspects is automatically personalized for at least one of the one or more users.

W. The method of any of clauses A-V wherein the multiple selected factors include total quantity of content items during a time period that are associated with at least one of the one or more categories, rate of change in total quantity of content items between two or more time periods that are associated with at least one of the one or more categories, and aggregate sentiment of content items during a time period that are associated with at least one of the one or more categories, wherein the multiple visual aspects include relative size between two or more displayed items, relative vertical location of a displayed item to at least one other location, relative horizontal location of a displayed item to at least one other location, a halo associated with a displayed item, and color of a displayed item, wherein the total quantity for a current or past time period having actual data is represented using the relative size, wherein the total quantity for a future time period having predicted data is represented using the halo, wherein the rate of change of quantity is represented using at least one of the vertical location and the color, and wherein the aggregate sentiment is represented using the relative horizontal location.

X. The method of any of clauses A-W wherein the providing of the generated information includes initiating the display of the generated information to the one or more users on one or more client devices of the one or more users.

Y. A computer-implemented method comprising:

receiving, by a configured client device of a user, information generated by one or more configured computing systems, wherein the received information is about one or more distributed group discussions having a plurality of content items for one or more time periods, wherein the received information reflects information about one or more categories that correspond to the distributed group discussions and/or about one or more attributes of at least some of the plurality of content items, and wherein the generated information is based on multiple selected factors and multiple visual aspects such that the generated information includes, for each of the multiple selected factors, a subset of the obtained information that corresponds to the selected factor and that is represented using at least one of the multiple visual aspects; and initiating, by the configured client device, display of the received information to the user.

Z. The method of clause Y combined with any of clauses A-X.

AA. A configured system comprising:

one or more hardware processors of one or more computing systems; and one or more modules that are configured to, when executed by at least one of the one or more hardware processors, perform the method of any of clauses A-Z.

BB. A non-transitory computer-readable medium having stored contents that, when executed, configure a computing system to perform the method of any of clauses A-Z.

From the foregoing it will be appreciated that, although specific embodiments have been described herein for purposes of illustration, various modifications may be made without deviating from the spirit and scope of the invention. Accordingly, the invention is not limited except as by specified claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

obtaining, by one or more configured computing systems of a group discussion prediction service, information about a distributed group discussion involving a plurality of users, wherein the obtained information includes first information about a plurality of content items already submitted by the plurality of users during one or more time periods and includes second information about one or more predictions by the group discussion prediction service regarding future content items that will be submitted by users for the distributed group discussion during one or more future time periods;

selecting, by the one or more configured computing systems, multiple factors to use in summarizing the obtained information for each of multiple time periods that include the one or more time periods and the one or more future time periods, wherein the multiple selected factors include a total quantity of content items supplied during each of the multiple time periods and include a rate of change in total quantity of content items supplied between two or more of the multiple time periods;

determining, by the one or more configured computing systems, multiple visual aspects to use to display information about the multiple selected factors to one or more users, wherein each of the multiple selected factors is associated with one of the multiple visual aspects, and wherein the multiple visual aspects include sizes of displayed items, vertical locations or movements of displayed items, halos or shadows associated with displayed items, and colors of displayed item;

generating, by the one or more configured computing systems, information for display that is based on at least some of the first information and on at least some of the second information, the generated information including, for each of the multiple selected factors, a summarization that is represented using the associated one visual aspect for the selected factor and that is based on a subset of the obtained information that corresponds to the selected factor; and initiating, by the one or more configured computing systems and before the one or more future time periods, display of the generated information to the one or more users.

2. The method of claim 1 wherein the plurality of content items includes textual user comments supplied by the plurality of users related to multiple categories, and wherein the multiple selected factors further include, for each of the multiple categories, a total quantity of content items supplied during each of the multiple time periods that are associated with the category and include a rate of change in total quantity of content items supplied between two or more of the multiple time periods that are associated with the category.

3. The method of claim 2 wherein the display of the generated information occurs on a client device of each of the one or more users and includes multiple displayed items such that each of the multiple categories has at least one associated displayed item, and wherein the multiple visual aspects include a size of each of the multiple displayed items, a vertical location or movement of each of the multiple displayed items, a halo or shadow associated with each of the multiple displayed items, and a color of each of the multiple displayed items.

4. The method of claim 1 wherein the plurality of content items includes textual user comments supplied by the plurality of users related to multiple topics within a category, and wherein the multiple selected factors include, for each of the multiple topics, a total quantity of content items during each of the multiple time periods that are associated with the topic, a rate of change in total quantity of content items supplied between two or more of the multiple time periods that are associated with the topic, and an aggregate sentiment of content items during at least one of the multiple time periods for the topic.

5. The method of claim 4 wherein the display of the generated information occurs on a client device of each of the one or more users and includes multiple displayed items such that each of the multiple topics has an associated displayed item that represents a comment group for the topic, and wherein the multiple visual aspects include a size of each of the multiple displayed items, a vertical location or movement of each of the multiple displayed items, a halo or shadow associated with each of the multiple displayed items, and a color of each of the multiple displayed items.

6. A computer-implemented method comprising:

obtaining, by one or more configured computing systems of a group discussion prediction service, information about a distributed group discussion that involves a plurality of users submitting a plurality of content items for the distributed group discussion, the obtained information including information about one or more predictions by the group discussion prediction service regarding future content items that will be submitted for the distributed group discussion;

selecting, by the one or more configured computing systems, multiple factors to use in summarizing information about the distributed group discussion;

determining, by the one or more configured computing systems, multiple visual aspects to use to display information about the multiple selected factors, wherein the multiple visual aspects include sizes of displayed items and vertical locations of displayed items, and wherein each of the multiple selected factors is associated with at least one of the multiple visual aspects;

generating, by the one or more configured computing systems, information for display to one or more users that is based at least in part on the one or more predictions, the generated information including, for each of the multiple selected factors, a summarization that is represented using the at least one visual aspect associated with the selected factor and that is based on at least some of the obtained information corresponding to the selected factor; and providing, by the one or more configured computing systems, the generated information for display to the one or more users.

7. The method of claim 6 wherein the providing of the generated information includes initiating the display of the generated information on one or more client devices of the one or more users.

8. The method of claim 6 wherein the plurality of content items are separated into multiple comment groups each corresponding to one of multiple attributes for a category of information, and wherein the multiple selected factors include at least one of a group of factors including a total quantity of supplied content items for each of at least one of the multiple comment groups, an aggregate sentiment of supplied content items for each of at least one of the multiple comment groups, and a rate of change in total quantity of content items supplied between two or more time periods for each of at least one of the multiple comment groups.

9. The method of claim 8 wherein display of the generated information includes at least one displayed item for each of the multiple comment groups, and wherein the multiple visual aspects include at least one of a group of visual aspects including absolute size of a displayed item, relative size between two or more displayed items, absolute vertical location of a displayed item, relative vertical location of a displayed item to at least one other location, and a halo associated with a displayed item.

10. The method of claim 8 wherein the multiple visual aspects include absolute size of a displayed item, absolute vertical location of a displayed item, a halo associated with a displayed item, and a color of a displayed item.

11. The method of claim 8 wherein the multiple visual aspects include relative size between two or more displayed items and relative vertical location of a displayed item to at least one other location.

12. The method of claim 8 wherein the generated information includes information about multiple time periods, wherein the total quantity of supplied content items for each of the at least one comment groups is further determined for each of at least one of the time periods, and wherein the aggregate sentiment of supplied content items for each of the at least one comment groups is further determined for each of at least one of the time periods.

13. The method of claim 8 wherein the generated information includes information about multiple time periods that include one or more time periods for which users have already supplied content items and one or more future time periods that have not yet occurred, and wherein the multiple selected factors include the total quantity of content items for each of the at least one comment groups that are supplied during each of the multiple time periods.

14. The method of claim 8 wherein the multiple selected factors include the total quantity of supplied content items for each of the multiple comment groups, the rate of change in total quantity of content items supplied between the two or more time periods for each of at least one of the multiple comment groups, and the aggregate sentiment of supplied content items for each of at least one of the multiple comment groups.

15. The method of claim 8 wherein the multiple attributes include multiple distinct topics within the category of information.

16. The method of claim 8 wherein the multiple attributes include multiple distinct users of the plurality of users.

17. The method of claim 8 wherein the multiple attributes include multiple distinct user identifiers.

18. The method of claim 8 wherein the multiple attributes include multiple distinct geographical locations from which content items are supplied.

19. The method of claim 8 wherein the multiple attributes include multiple distinct comment data sources to which users supply content items.

20. The method of claim 6 wherein the plurality of content items are separated into multiple categories of information, and wherein the multiple selected factors include at least one of a group of factors that includes a total quantity of supplied content items for each of the multiple categories, an aggregate sentiment of supplied content items for each of the multiple categories, and a rate of change in total quantity of content items supplied between two or more time periods for each of the multiple categories.

21. The method of claim 20 wherein display of the generated information includes at least one displayed item for each of the multiple categories, and wherein the multiple visual aspects include at least one of a group including size of a displayed item, vertical location of a displayed item, horizontal location of a displayed item, and a halo associated with a displayed item.

22. The method of claim 20 wherein the generated information includes information about multiple time periods, wherein the total quantity of supplied content items for each of the multiple categories is further determined for each of at least one of the time periods, and wherein the aggregate sentiment of supplied content items for each of the multiple categories is further determined for each of at least one of the time periods.

23. The method of claim 20 wherein the generated information includes information about multiple time periods that include one or more time periods for which users have already supplied content items and one or more future time periods that have not yet occurred, and wherein the multiple selected factors include the total quantity of content items for each of at least one of the multiple categories that are supplied during each of the multiple time periods.

24. The method of claim 6 wherein display of the generated information includes at least one displayed item for each of the multiple selected factors, and wherein the multiple visual aspects include multiple of a group of visual aspects including absolute size of a displayed item, relative size between two or more displayed items, absolute vertical location of a displayed item, relative vertical location of a displayed item to at least one other location, absolute horizontal location of a displayed item, relative horizontal location of a displayed item to at least one other location, absolute vertical movement of a displayed item, relative vertical movement of a displayed item to at least one location, absolute horizontal movement of a displayed item, relative horizontal movement of a displayed item to at least one location, a halo associated with a displayed item, a shadow associated with a displayed item, color of a displayed item, highlighting of a displayed item, bolding of a displayed item, italicizing of a displayed item, underlining of a displayed item, displayed textual content, and displayed graphical content.

25. The method of claim 6 wherein display of the generated information includes multiple displayed items corresponding to the multiple selected factors, and includes a larger displayed item that encompasses the multiple displayed items and that represents some or all of the distributed group discussion.

26. The method of claim 6 wherein one or more of the multiple selected factors is configurable by at least one of the one or more users.

27. The method of claim 6 wherein one or more of the multiple visual aspects is configurable by at least one of the one or more users.

28. The method of claim 6 wherein one or more of the multiple selected factors is automatically personalized for at least one of the one or more users.

29. The method of claim 6 wherein one or more of the multiple visual aspects is automatically personalized for at least one of the one or more users.

30. The method of claim 6 wherein the plurality of content items further includes multiple content items supplied during each of one or more current or past time periods, and wherein the information about the one or more predictions indicates predictions of future content items that will be submitted during each of one or more future time periods that occur after the providing of the generated information for display.

31. The method of claim 6 wherein the plurality of content items include a plurality of comments supplied from a plurality of geographical locations to a plurality of online social networking sites.

32. The method of claim 8 wherein the plurality of content items includes textual user comments supplied to each of multiple comment data sources.

33. A non-transitory computer-readable medium having stored contents that, when executed, configure a computing system to perform a method, the method comprising:

obtaining, by the configured computing system, information about a distributed group discussion having a plurality of content items submitted by a plurality of users related to multiple topics;

determining, by the configured computing system, multiple visual aspects to use to display information to one or more users about the multiple topics, including at least one sizes of displayed items or vertical locations of displayed items;

generating, by the configured computing system, information for display to the one or more users, the generated information including, for each of the multiple topics, at least one summarization that is based on a subset of the obtained information corresponding to the topic and that is represented using at least one of the multiple visual aspects; and providing, by the configured computing system, the generated information for display to the one or more users.

34. The non-transitory computer-readable medium of claim 33 wherein the obtained information further includes information about one or more predictions regarding future content items that will be submitted for the distributed group discussion for one or more future time periods, wherein the generated information includes information based on the one or more predictions, and wherein the providing of the generated information is performed before the one or more future time periods.

35. The non-transitory computer-readable medium of claim 33 wherein the multiple topics are part of multiple comment groups within an information category, and wherein the generated information illustrates comparative information for the multiple comment groups within the information category.

36. The non-transitory computer-readable medium of claim 33 wherein the multiple topics are part of multiple categories of information, and wherein the generated information illustrates comparative information for the multiple categories of information.

37. The non-transitory computer-readable medium of claim 33 wherein the configured computing system is part of a group discussion prediction service, wherein the at least one summarization includes multiple summarizations corresponding to multiple selected factors for use in summarizing information about the distributed group discussion, wherein the multiple summarizations are each associated with one of the determined multiple visual aspects, and wherein the stored contents include software instructions that, when executed, program the configured computing system to perform the method.

38. A configured system comprising:

one or more hardware processors of one or more computing systems; and one or more modules that are configured to, when executed by at least one of the one or more hardware processors, initiate display of summarized information about a distributed group discussion having a plurality of content items submitted by a plurality of users, by:

obtaining information about one or more predictions regarding future content items that will be submitted for the distributed group discussion;

determining multiple visual aspects to use to display information to one or more users about multiple topics indicated in the plurality of content items;

generating information for display to the one or more users that is based at least in part on the one or more predictions, the generated information including, for each of the multiple topics, at least one summarization that is based on content items of the distributed group discussion corresponding to the topic and that is represented using at least one of the multiple visual aspects; and providing the generated information for display to the one or more users.

39. The system of claim 38 wherein the multiple topics are part of multiple comment groups within an information category, and wherein the generated information illustrates comparative information for the multiple comment groups within the information category.

40. The system of claim 38 wherein the multiple topics are part of multiple categories of information, and wherein the generated information illustrates comparative information for the multiple categories of information.

41. The system of claim 38 wherein the at least one summarization includes multiple summarizations corresponding to multiple selected factors for use in summarizing information about the distributed group discussion, wherein the multiple summarizations are each associated with one of the determined multiple visual aspects, and wherein the one or more modules are part of a group discussion prediction service and include software instructions that, when executed, program the at least one hardware processors to perform the initiating of the display of the summarized information about the distributed group discussion.

42. The system of claim 38 wherein the one or more modules consist of one or more means for performing the initiating of the display of the summarized information about the distributed group discussion.

* * * * *